(12) United States Patent
Akutsu et al.

(10) Patent No.: US 8,183,722 B2
(45) Date of Patent: May 22, 2012

(54) ACCESSORY DRIVE SYSTEM CONNECTED TO AN INTERNAL COMBUSTION ENGINE

(75) Inventors: Shigemitsu Akutsu, Saitama-ken (JP); Satoyoshi Oya, Saitama-ken (JP); Kota Kasaoka, Saitama-ken (JP); Noriyuki Abe, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 292 days.

(21) Appl. No.: 12/542,128

(22) Filed: Aug. 17, 2009

(65) Prior Publication Data

US 2010/0052438 A1  Mar. 4, 2010

(30) Foreign Application Priority Data

Aug. 29, 2008  (JP) ................................. 2008-222880
Dec. 4, 2008  (JP) ................................. 2008-309582

(51) Int. Cl.
*H02K 37/00* (2006.01)
*H02K 15/00* (2006.01)
*H02K 16/02* (2006.01)

(52) U.S. Cl. ........... 310/46; 310/103; 310/112; 310/114

(58) Field of Classification Search .................... 310/46, 310/103, 112, 114
See application file for complete search history.

(56) References Cited

U.S. PATENT DOCUMENTS

2008/0211335 A1 * 9/2008 Abe et al. ...................... 310/103

FOREIGN PATENT DOCUMENTS

| JP | 2001-136606 A | 5/2001 |
| JP | 2008-043138 | 2/2008 |
| JP | 2009-112101 | 5/2009 |
| WO | 2008/018376 A1 | 2/2008 |
| WO | WO 2008018376 A1 * | 2/2008 |

OTHER PUBLICATIONS

English Translation WO2008018376 (2008).*
Japanese Office Action application No. 2008-309582 issued on Jun. 29, 2010.

* cited by examiner

*Primary Examiner* — Quyen Leung
*Assistant Examiner* — Jose Gonzalez Quinones
(74) *Attorney, Agent, or Firm* — Squire Sanders (US) LLP

(57) ABSTRACT

An accessory drive system which is capable of preventing the driving efficiency thereof from being lowered and achieving simplified construction, and reduction of the size and manufacturing costs. The system has a rotating machine including a first rotor, a second rotor, and a stator. The first rotor is formed by magnetic poles circumferentially arranged, with each two adjacent ones having different polarities. The stator has an armature row for generating a rotating magnetic pole that circumferentially rotates, between the armature and magnetic pole rows. The second rotor is formed by soft magnetic material elements circumferentially arranged with space, and disposed between the magnetic pole and armature rows. A ratio between the number of the armature magnetic poles, that of the magnetic poles, and that of the soft magnetic material elements is set to $1:m:(1+m)/2 (m \neq 1.0)$.

3 Claims, 27 Drawing Sheets

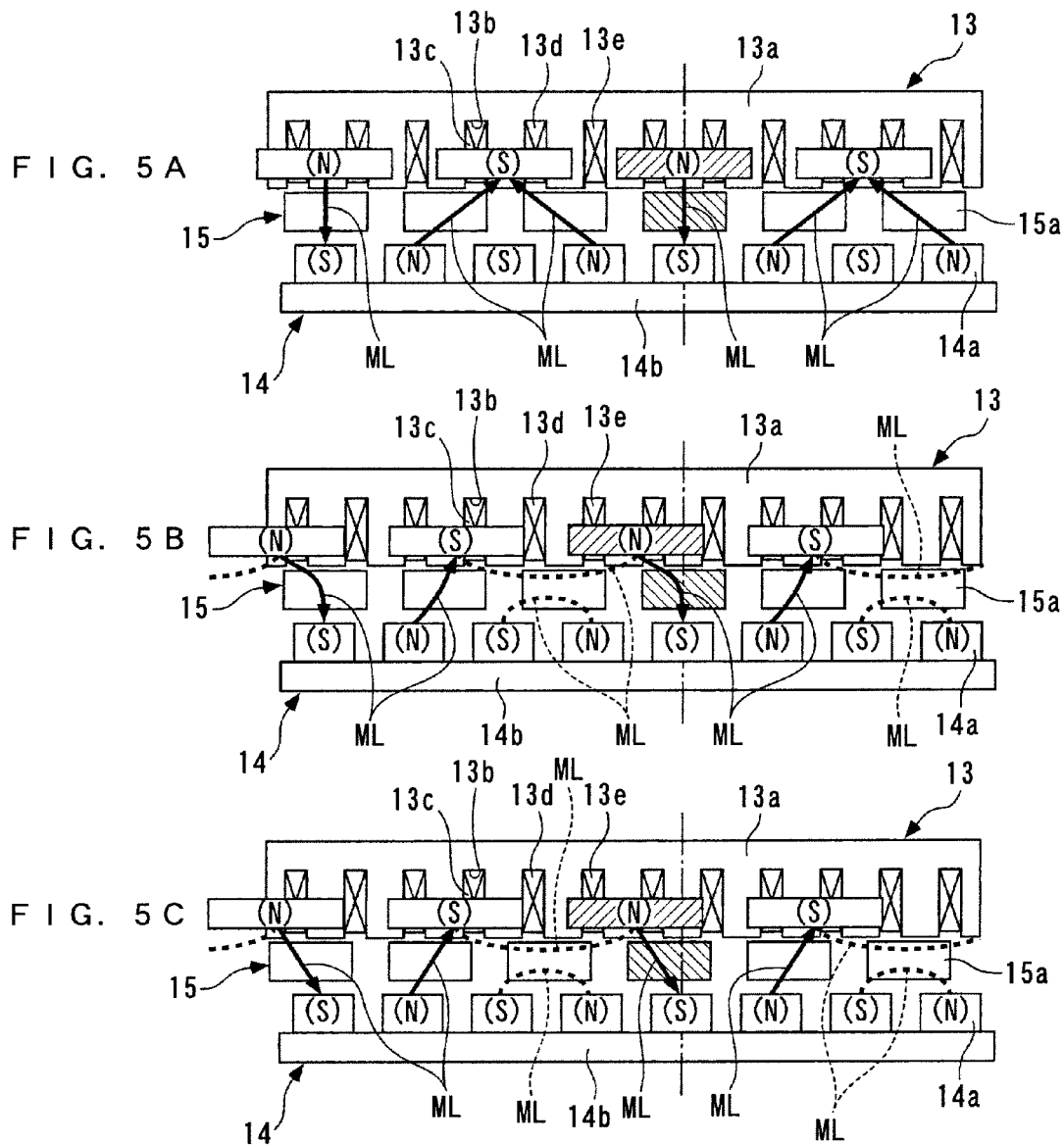

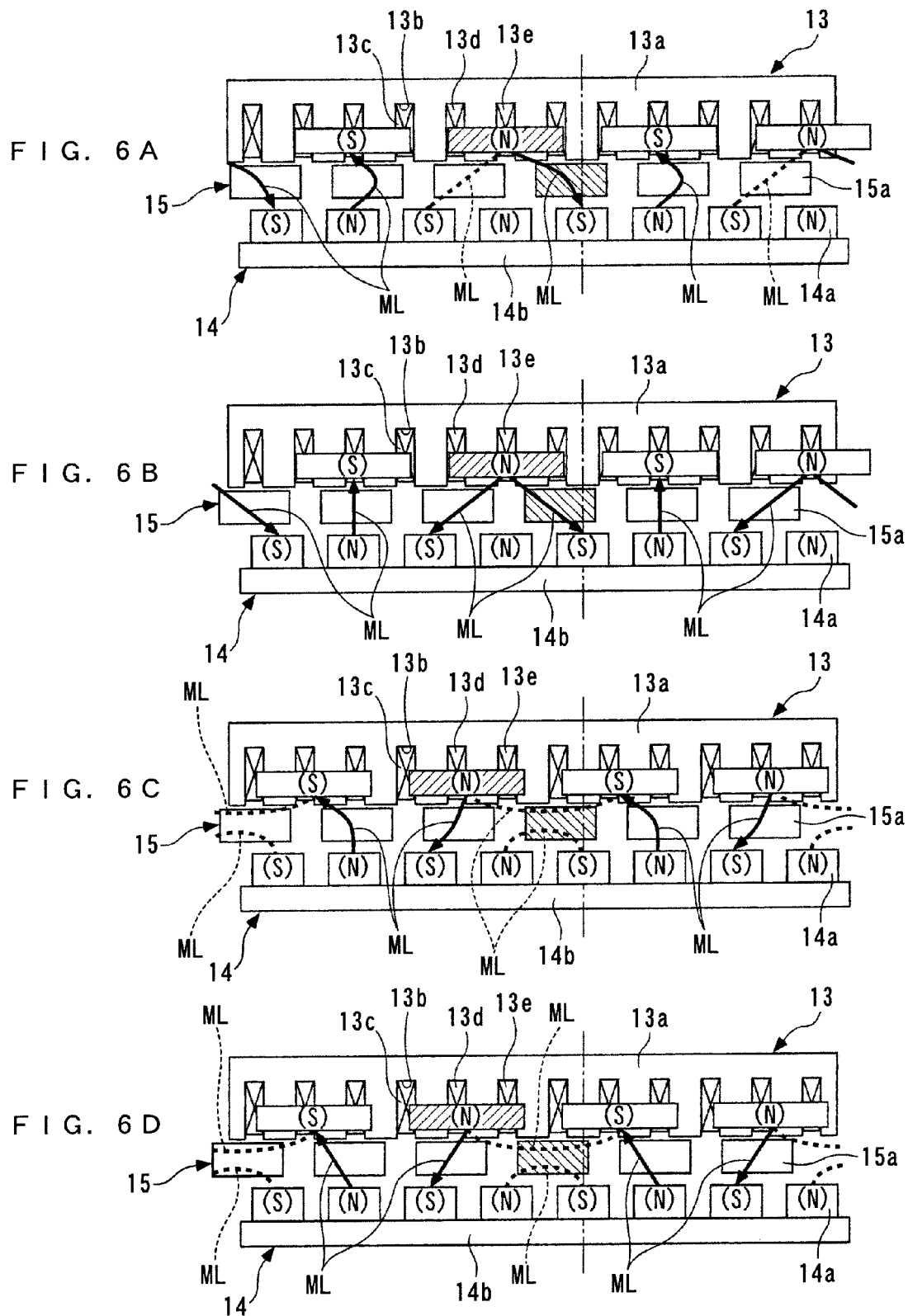

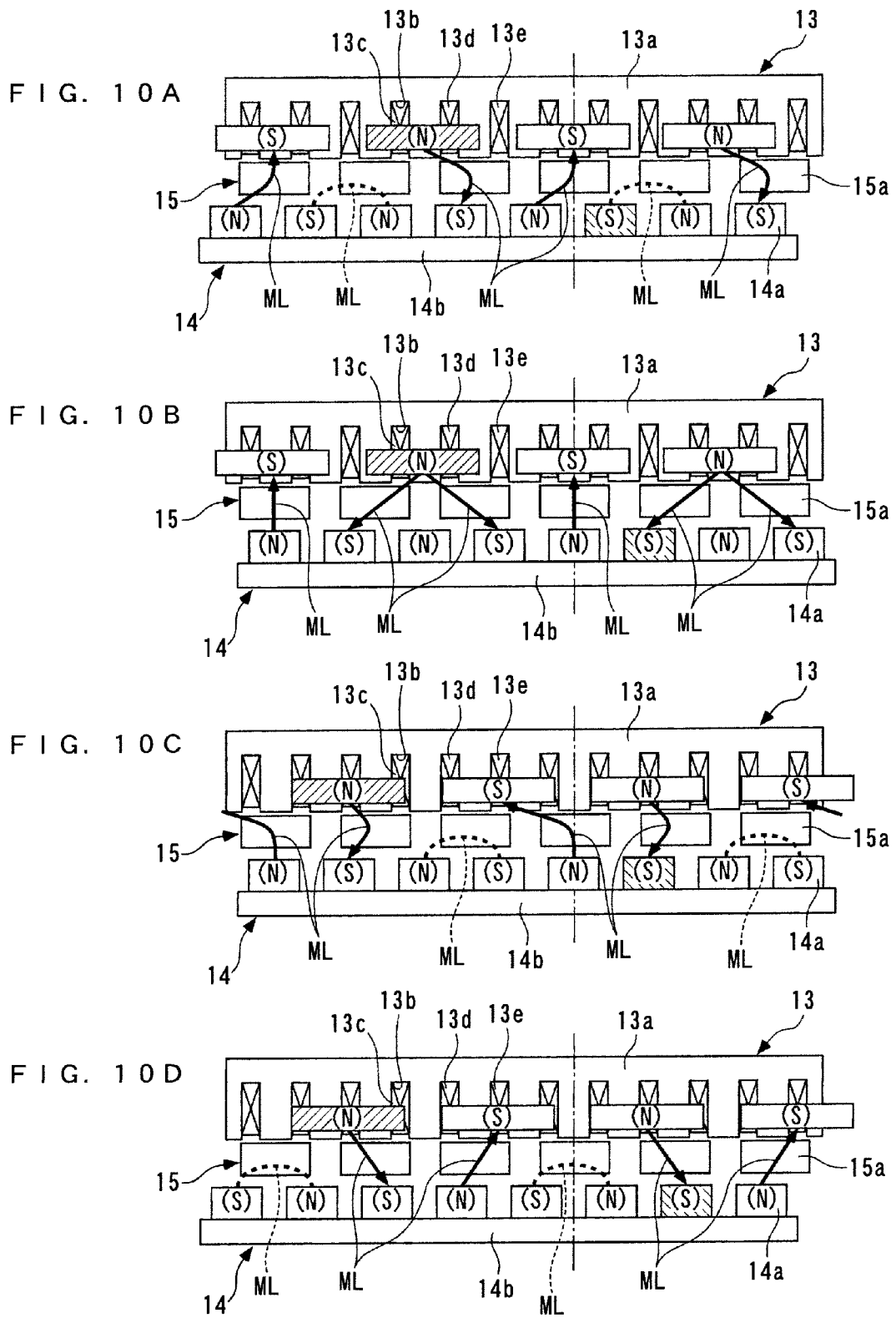

F I G. 1 2
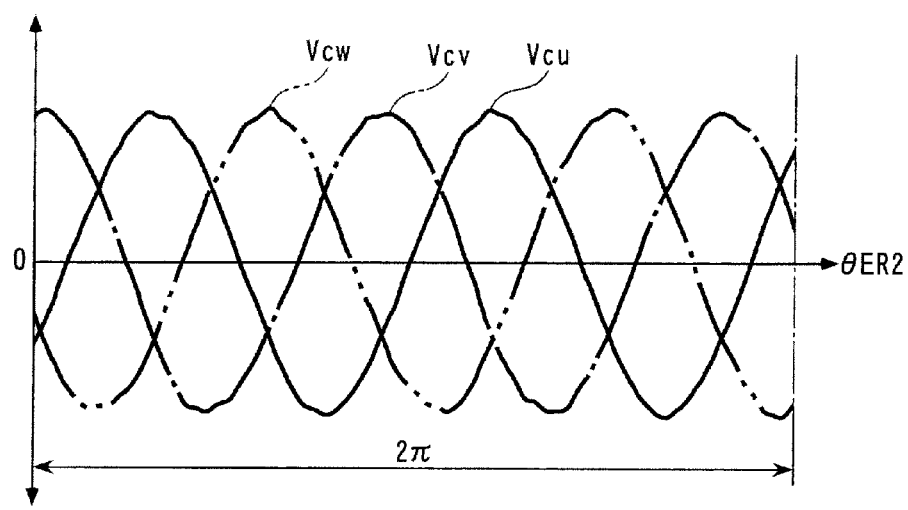
F I G. 1 3
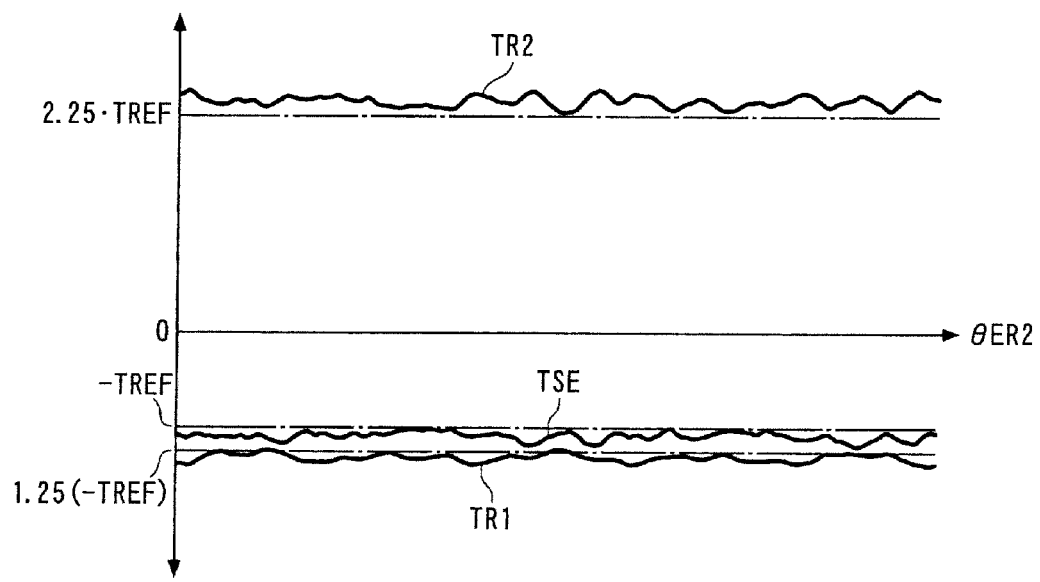

F I G. 1 8
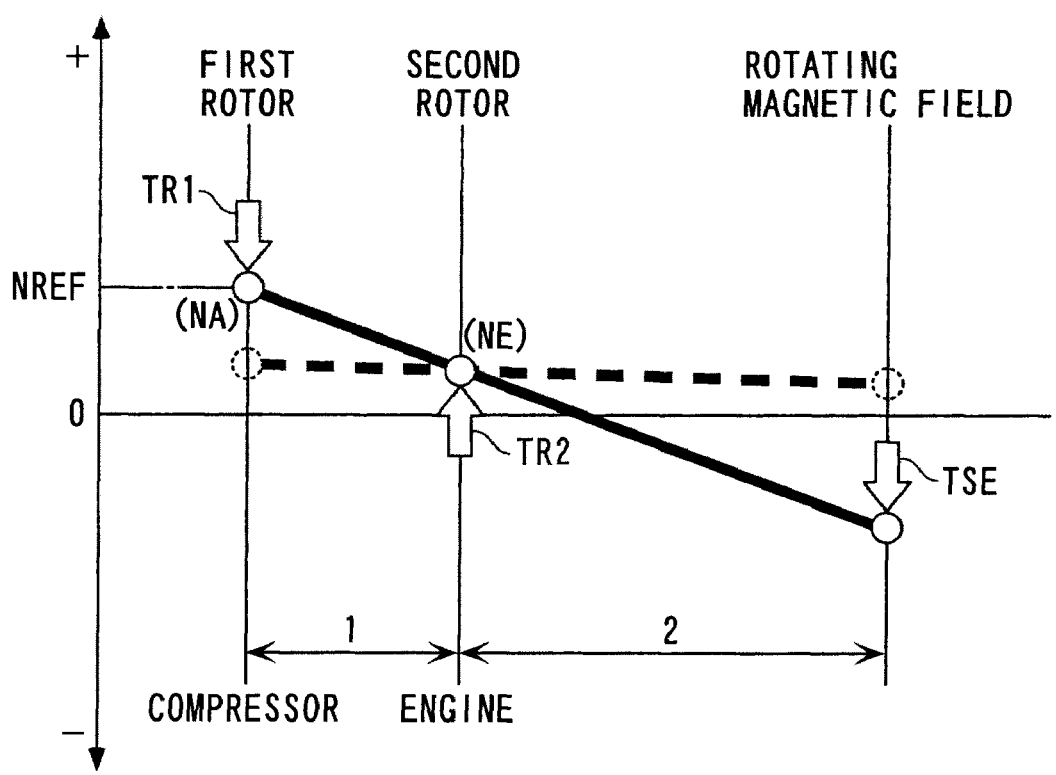

ACCESSORY DRIVE SYSTEM CONNECTED TO AN INTERNAL COMBUSTION ENGINE

BACKGROUND OF THE INVENTION

1. Field of the Invention

The present invention relates to an accessory drive system connected to a prime mover, for driving an accessory.

2. Description of the Related Art

Conventionally, as an accessory drive system of this kind, one disclosed in Japanese Laid-Open Patent Publication (Kokai) No. 2008-43138 is known. This accessory drive system is equipped with a rotating machine, and the rotating machine includes a first rotor, a second rotor, and a single stator. These first rotor, second rotor and stator are radially arranged from inside to outside, and the one of the first and second rotors (hereinafter referred to as "the one rotor") is connected to the output shaft of the prime mover and the other of the two (hereinafter referred to as "the other rotor") is connected to the accessory.

The first rotor includes a plurality of first permanent magnets and second permanent magnets which are arranged in the circumferential direction, respectively. The first and second permanent magnets are arranged in parallel with each other in the direction of axis of the first rotor. The stator is configured to be capable of generating a first rotating magnetic field and a second rotating magnetic field which rotate in the circumferential direction. The first and second rotating magnetic fields are generated between the stator and respective portions of the first rotor toward the first and second permanent magnets. The second rotor includes a plurality of first cores and second cores which are arranged in the circumferential direction, respectively. These first and second cores are comprised of soft magnetic material elements. The first cores are arranged between a portion of the first rotor toward the first permanent magnets and the stator, and the second cores are arranged between a portion of the first rotor toward the second permanent magnets and the stator. The numbers of the magnetic poles of the first and second permanent magnets, the magnetic poles of the first and second rotating magnetic fields, and the first and second cores are set to be equal to each other, respectively.

In the conventional accessory drive system described above, when an internal combustion engine is at rest, the accessory is driven using the rotating machine as a drive source in the following manner: By supplying electric power to the stator, the first and second rotating magnetic fields are generated. Accordingly, the magnetic poles of the first and second rotating magnetic fields and the magnetic poles of the first and second permanent magnets magnetize the first and second cores, whereby magnetic force lines are generated between the mentioned elements. Then, the magnetic force lines act to convert the electric power supplied to the stator to mechanical power, and the mechanical power is transmitted to the accessory via the other rotor, whereby the accessory is driven.

Further, during operation of the engine, the accessory is driven by transmitting the mechanical power of the engine to the accessory via the rotating machine in the following manner: Using part of the mechanical power transmitted from the output shaft of the engine to the one rotor, electric power is generated by the stator, and the remainder of the mechanical power transmitted to the one rotor is transmitted to the accessory via the other rotor, whereby the accessory is driven.

However, the conventional accessory drive system suffers from the following inconveniences: In the rotating machine described above, due to its construction, not only the row of the first soft magnetic material elements formed by the plurality of the first cores but also the row of the second soft magnetic material elements formed by the plurality of the second cores is indispensable, for appropriate action of magnetism of the aforementioned magnetic force lines, so as to convert the electric power supplied to the stator to the mechanical power and output the mechanical power from the one rotor. This complicates the construction of the rotating machine, and it becomes eventually inevitable that the construction of the accessory drive system is complicated and the manufacturing costs thereof are increased. Further, due to the construction thereof, the rotating machine is only possible with a speed relation that the difference between the rotational speed of the first and second rotating magnetic fields and that of the second rotor and the difference between the rotational speed of the second rotor and that of the first rotor are equal to each other. Therefore, during driving of the accessory, the rotational speed of the first and second rotating magnetic fields sometimes becomes too high, and in such a case, much loss occurs in the rotating machine, so that the efficiency of driving the accessory by the accessory drive system is lowered.

Let it be assumed that a torque equivalent to electric power supplied to the stator and the rotational speed of the first and second rotating magnetic fields is a driving equivalent torque, and a torque equivalent to electric power generated by the stator and the rotational speed of the first and second rotating magnetic fields is an electric power-generating equivalent torque. The rotating machine is only possible, due to its construction, with a torque relationship that the ratio between the driving equivalent torque (or the electric power-generating equivalent torque), a torque transmitted to the first rotor, and a torque transmitted to the second rotor is 1:1:2. Therefore, the driving equivalent torque (the electric power-generating equivalent torque) required for driving the accessory cannot help being increased. This makes it impossible to reduce the size of the stator, which in turn makes it impossible to reduce the size and manufacturing costs of the accessory drive system.

SUMMARY OF THE INVENTION

It is an object of the present invention to provide an accessory drive system which is capable of preventing the driving efficiency thereof from being lowered and achieving simplified construction, and reduction of the size and manufacturing costs.

To attain the above object, in a first aspect of the present invention, there is provided an accessory drive system that is connected to a prime mover having an output shaft for outputting mechanical power, and drives an accessory, comprising a rotating machine including a first rotor that is connected to one of the output shaft of the prime mover and the accessory and is rotatable in a circumferential direction, and a second rotor that is connected to the other of the output shaft of the prime mover and the accessory and is rotatable in the circumferential direction, and a stator that is unmovable, wherein the first rotor has a magnetic pole row that is formed by a predetermined plurality of magnetic poles arranged in the circumferential direction, and has each two adjacent magnetic poles so disposed as to have polarities different from each other, wherein the stator has an armature row that is formed by a plurality of armatures arranged in the circumferential direction, and is disposed in a manner opposed to the magnetic pole row, for generating a rotating magnetic field rotating in the circumferential direction between the armature row and the magnetic pole row by a predetermined plurality of armature magnetic poles generated at the plurality of armatures, wherein the second rotor has a soft magnetic material element row that is formed by a predetermined plurality of soft magnetic material elements arranged in the circumferential direction in a manner spaced from each other, and is disposed such that the soft magnetic material element row is positioned between the magnetic pole row and the armature row, and wherein a ratio between a number of the armature magnetic poles, a number of the magnetic poles, and a number of the soft magnetic material elements is set to 1:m:(1+m)/2(m≠1.0).

With the construction of the accessory drive system according to the first aspect of the present invention, the magnetic pole row of the first rotor that is rotatable in the circumferential direction and the armature row of the stator which is immovable are opposed to each other, and between these magnetic pole row and the armature row, the soft magnetic material element row of the second rotor that is rotatable in the circumferential direction is disposed. Further, the magnetic poles forming the magnetic pole row, the armatures forming the armature row, and the soft magnetic material elements forming the soft magnetic material element are arranged in the circumferential direction. Further, the armature row of the stator is capable of generating a rotating magnetic filed that rotates in the circumferential direction between the armature row and the magnetic pole row, by a predetermined plurality of armature magnetic poles that are generated at the armatures. Further, each two adjacent magnetic poles have different polarities, and space is provided between each tow adjacent soft magnetic material elements. As described above, between the magnetic pole row and the armature row, the rotating magnetic field is generated by the plurality of armature magnetic poles, and further the soft magnetic material element row is disposed, so that the soft magnetic material elements are magnetized by the armature magnetic poles and the magnetic poles. Due to this fact and that space is provided between each adjacent two soft magnetic material elements, there are generated magnetic force lines in a manner connecting the magnetic poles, the soft magnetic material elements, and the armature magnetic poles. Therefore, when the rotating magnetic field is generated by the supply of electric power to the armatures, the action of magnetism of the magnetic force lines converts the electric power supplied to the armatures to mechanical power, and the mechanical power is output from the first rotor or the second rotor.

Now, a torque equivalent to the electric power supplied to the armatures and the electrical angular velocity ωmf of the rotating magnetic field is referred to as "driving equivalent torque Te". Hereafter, a description will be given of a relationship between the driving equivalent torque Te, torques transmitted to the first and second rotors (hereinafter referred to as "the first rotor transmission torque T1", and "the second rotor transmission torque T2" respectively), and a relationship between the rotating magnetic field, and the electrical angular velocities of the first and second rotors.

When the rotating machine according to the present invention is constructed under the following conditions (A) and (B), an equivalent circuit corresponding to the rotating machine is expressed as shown in FIG. 30.

The armatures have three-phase coils of U-phase, V-phase, and W-phase.

The number of the armature magnetic poles is 2, and the number of the magnetic poles is 4, that is, a pole pair number, in which an N pole and an S pole form one pair, of the armature magnetic poles, has a value of 1, a pole pair number, in which an N pole and an S pole form one pair, of the magnetic poles, has a value of 2, and the number of the soft magnetic material elements is 3.

It should be noted that as described above, throughout the specification, the term "pole pair" is intended to mean a pair of an N pole and an S pole.

In this case, a magnetic flux $\Psi k1$ of a magnetic pole passing through a first soft magnetic material element of the soft magnetic material elements is expressed by the following equation (1):

$$\Psi k1 = \psi f \cdot \cos[2(\theta 2 - \theta 1)] \qquad (1)$$

wherein $\phi f$ represents the maximum value of the magnetic flux of the magnetic pole, and $\theta 1$ and $\theta 2$ represent a rotational angular position of the magnetic pole and a rotational angular position of the first soft magnetic material element, with respect to the U-phase coil. Further, in this case, since the ratio of the pole pair number of the magnetic poles to the pole pair number of the armature magnetic poles is 2.0, the magnetic flux of the magnetic pole rotates (changes) at a repetition period of the twofold of the repetition period of the rotating magnetic field, so that in the aforementioned equation (1), to indicate this fact, $(\theta 2 - \theta 1)$ is multiplied by 2.0.

Therefore, a magnetic flux $\Psi u1$ of a magnetic pole passing through the U-phase coil via the first soft magnetic material element is expressed by the following equation (2) obtained by multiplying the equation (1) by $\cos \theta 2$.

$$\Psi u1 = \psi f \cdot \cos[2(\theta 2 - \theta 1)] \cos \theta 2 \qquad (2)$$

Similarly, a magnetic flux $\Psi k2$ of a magnetic pole passing through a second soft magnetic material element of the soft magnetic material elements is expressed by the following equation (3):

$$\Psi k2 = \psi f \cdot \cos\left[2\left(\theta 2 + \frac{2\pi}{3} - \theta 1\right)\right] \qquad (3)$$

The rotational angular position of the second soft magnetic material element with respect to the armature leads that of the first soft magnetic material element by $2\pi/3$, so that in the aforementioned equation (3), to indicate this fact, $2\pi/3$ is added to $\theta 2$.

Therefore, a magnetic flux $\Psi u2$ of a magnetic pole passing through the U-phase coil via the second soft magnetic material element is expressed by the following equation (4) obtained by multiplying the equation (3) by $\cos(\theta 2 + 2\pi/3)$.

$$\Psi u2 = \psi f \cdot \cos\left[2\left(\theta 2 + \frac{2\pi}{3} - \theta 1\right)\right]\cos\left(\theta 2 + \frac{2\pi}{3}\right) \qquad (4)$$

Similarly, a magnetic flux $\Psi u3$ of a magnetic pole passing through the U-phase coil via a third soft magnetic material element of the soft magnetic material elements is expressed by the following equation (5):

$$\Psi u3 = \psi f \cdot \cos\left[2\left(\theta 2 + \frac{4\pi}{3} - \theta 1\right)\right]\cos\left(\theta 2 + \frac{4\pi}{3}\right) \qquad (5)$$

In the rotating machine as shown in FIG. 30, a magnetic flux $\Psi u$ of the magnetic pole passing through the U-phase coil via the soft magnetic material elements is obtained by adding Ψu1 to Ψu3 expressed by the above-described equations (2), (4) and (5), and hence the magnetic flux Ψu is expressed by the following equation (6):

$$\Psi u = \psi f \cdot \cos[2(\theta 2 - \theta 1)]\cos\theta 2 + \psi f \cdot \cos\left[2\left(\theta 2 + \frac{2\pi}{3} - \theta 1\right)\right]\cos\left(\theta 2 + \frac{2\pi}{3}\right) + \psi f \cdot \cos\left[2\left(\theta 2 + \frac{4\pi}{3} - \theta 1\right)\right]\cos\left(\theta 2 + \frac{4\pi}{3}\right) \quad (6)$$

Further, when this equation (6) is generalized, the magnetic flux Ψu of the magnetic pole passing through the U-phase coil via the soft magnetic material elements is expressed by the following equation (7):

$$\Psi u = \sum_{i=1}^{b} \psi f \cdot \cos\left\{a\left[\frac{\theta 2 + (i-1)\frac{2\pi}{b}}{} - \theta 1\right]\right\}\cos\left\{c\left[\theta 2 + (i-1)\frac{2\pi}{b}\right]\right\} \quad (7)$$

wherein a, b and c represent the pole pair number of the magnetic poles, the number of the soft magnetic material elements, and the pole pair number of the armature magnetic poles. Further, when the above equation (7) is changed based on the formula of the sum and product of the trigonometric function, there is obtained the following equation (8):

$$\Psi u = \sum_{i=1}^{b} \frac{1}{2} \cdot \psi f \left\{ \begin{array}{l} \cos\left[(a+c)\theta 2 - a \cdot \theta 1(a+c)(i-1)\frac{2\pi}{b}\right] + \\ \cos\left[(a-c)\theta 2 - a \cdot \theta 1 + (a-c)(i-1)\frac{2\pi}{b}\right] \end{array} \right\} \quad (8)$$

When this equation (8) is arranged by setting b=a+c, and based on cos (θ+2π)=cos θ, there is obtained the following equation (9):

$$\Psi u = \frac{b}{2} \cdot \psi f \cdot \cos[(a+c)\theta 2 - a \cdot \theta 1] + \sum_{i=1}^{b} \frac{1}{2} \cdot \psi f \left\{\cos\left[(a-c)\theta 2 - a \cdot \theta 1 + (a-c)(i-1)\frac{2\pi}{b}\right]\right\} \quad (9)$$

When this equation is arranged based on the addition theorem of the trigonometric function, there is obtained the following equation (10):

$$\Psi u = \frac{b}{2} \cdot \psi f \cdot \cos[(a+c)\theta 2 - a \cdot \theta 1] + \frac{1}{2} \cdot \psi f \cdot \cos[(a-c)\theta 2 - a \cdot \theta 1]\sum_{i=1}^{b}\cos\left[(a-c)(i-1)\frac{2\pi}{b}\right] - \frac{1}{2} \cdot \psi f \cdot \sin[(a-c)\theta 2 - a \cdot \theta 1]\sum_{i=1}^{b}\sin\left[(a-c)(i-1)\frac{2\pi}{b}\right] \quad (10)$$

When the second term on the right side of the equation (10) is arranged based on the sum total of the series and the Euler's formula on condition that a−c≠0, the second term becomes equal to 0, as is apparent from the following equation (11):

$$\sum_{i=1}^{b}\cos\left[(a-c)(i-1)\frac{2\pi}{b}\right] = \sum_{i=0}^{b-1}\frac{1}{2}\{e^{j[(a-c)\frac{2\pi}{b}i]} + e^{-j[(a-c)\frac{2\pi}{b}i]}\} \quad (11)$$

$$= \frac{1}{2}\left\{\frac{e^{j[(a-c)\frac{2\pi}{b}b]} - 1}{e^{j[(a-c)\frac{2\pi}{b}]} - 1} + \frac{e^{-j[(a-c)\frac{2\pi}{b}b]} - 1}{e^{-j[(a-c)\frac{2\pi}{b}]} - 1}\right\}$$

$$= \frac{1}{2}\left\{\frac{e^{j[(a-c)2\pi]} - 1}{e^{j[(a-c)\frac{2\pi}{b}]} - 1} + \frac{e^{-j[(a-c)2\pi]} - 1}{e^{-j[(a-c)\frac{2\pi}{b}]} - 1}\right\}$$

$$= \frac{1}{2}\left\{\frac{0}{e^{j[(a-c)\frac{2\pi}{b}]} - 1} + \frac{0}{e^{-j[(a-c)\frac{2\pi}{b}]} - 1}\right\}$$

$$= 0$$

Further, when the third term on the right side of the above-described equation (10) is arranged based on the sum total of the series and the Euler's formula on condition that a−c≠0, the third term as well becomes equal to 0, as is apparent from the following equation (12):

$$\sum_{i=1}^{b}\cos\left[(a-c)(i-1)\frac{2\pi}{b}\right] = \sum_{i=0}^{b-1}\frac{1}{2}\{e^{j[(a-c)\frac{2\pi}{b}i]} + e^{-j[(a-c)\frac{2\pi}{b}i]}\} \quad (12)$$

$$= \frac{1}{2}\left\{\frac{e^{j[(a-c)\frac{2\pi}{b}b]} - 1}{e^{j[(a-c)\frac{2\pi}{b}]} - 1} - \frac{e^{-j[(a-c)\frac{2\pi}{b}b]} - 1}{e^{-j[(a-c)\frac{2\pi}{b}]} - 1}\right\}$$

$$= \frac{1}{2}\left\{\frac{e^{j[(a-c)2\pi]} - 1}{e^{j[(a-c)\frac{2\pi}{b}]} - 1} - \frac{e^{-j[(a-c)2\pi]} - 1}{e^{-j[(a-c)\frac{2\pi}{b}]} - 1}\right\}$$

$$= \frac{1}{2}\left\{\frac{0}{e^{j[(a-c)\frac{2\pi}{b}]} - 1} - \frac{0}{e^{-j[(a-c)\frac{2\pi}{b}]} - 1}\right\}$$

$$= 0$$

From the above, when a−c≠0 holds, the magnetic flux Ψu of the magnetic pole passing through the U-phase coil via the soft magnetic material elements is expressed by the following equation (13):

$$\Psi u = \frac{b}{2} \cdot \psi f \cdot \cos[(a+c)\theta 2 - a \cdot \theta 1] \quad (13)$$

Further, in this equation (13), if a/c=α holds, there is obtained the following equation (14):

$$\Psi u = \frac{b}{2} \cdot \psi f \cdot \cos[(\alpha + 1)c \cdot \theta 2 - \alpha \cdot c \cdot \theta 1] \quad (14)$$

Furthermore, in this equation (14), if c·θ2=θe2 and c·θ1=θe1 hold, there is obtained the following equation (15):

$$\Psi u = \frac{b}{2} \cdot \psi f \cdot \cos[(\alpha + 1)\theta e2 - \alpha \cdot \theta e1] \quad (15)$$

In this equation, as is clear from the fact that θe2 is obtained by multiplying the rotational angular position θ2 of the first soft magnetic material element with respect to the U-phase coil by the pole pair number c of the armature magnetic poles, θe2 represents the electrical angular position of the soft magnetic material element with respect to the U-phase coil. Further, as is clear from the fact that θe1 is obtained by multiplying the rotational angular position θ1 of the magnetic pole with respect to the U-phase coil by the pole pair number c of the armature magnetic poles, θe1 represents the electrical angular position of the magnetic pole with respect to the U-phase coil.

Similarly, since the electrical angular position of the V-phase coil leads that of the U-phase coil by the electrical angle 2π/3, the magnetic flux Ψv of the magnetic pole passing through the V-phase coil via the soft magnetic material elements is expressed by the following equation (16). Further, since the electrical angular position of the W-phase coil is retarded from that of the U-phase coil by the electrical angle 2π/3, the magnetic flux Ψw of the magnetic pole passing through the W-phase coil via the soft magnetic material elements is expressed by the following equation (17):

$$\Psi v = \frac{b}{2} \cdot \psi f \cdot \cos\left[(\alpha + 1)\theta e2 - \alpha \cdot \theta e1 - \frac{2\pi}{3}\right] \quad (16)$$

$$\Psi w = \frac{b}{2} \cdot \psi f \cdot \cos\left[(\alpha + 1)\theta e2 - \alpha \cdot \theta e1 + \frac{2\pi}{3}\right] \quad (17)$$

Further, when the magnetic fluxes Ψu to Ψw expressed by the aforementioned equations (15) to (17), respectively, is differentiated with respect to time, the following equations (18) to (20) are obtained:

$$\frac{d\Psi u}{dt} = -\frac{b}{2} \cdot \psi f\{[(\alpha + 1)\omega e2 - \alpha \cdot \omega e1]\sin[(\alpha + 1)\theta e2 - \alpha \cdot \theta e1]\} \quad (18)$$

$$\frac{d\Psi v}{dt} = -\frac{b}{2} \cdot \psi f\left\{[(\alpha + 1)\omega e2 - \alpha \cdot \omega e1]\sin\left[(\alpha + 1)\theta e2 - \alpha \cdot \theta e1 - \frac{2\pi}{3}\right]\right\} \quad (19)$$

$$\frac{d\Psi w}{dt} = \quad (20)$$

$$-\frac{b}{2} \cdot \psi f\left\{[(\alpha + 1)\omega e2 - \alpha \cdot \omega e1]\sin\left[(\alpha + 1)\theta e2 - \alpha \cdot \theta e1 + \frac{2\pi}{3}\right]\right\}$$

wherein ωe1 represents a first rotor electrical angular velocity, which is a value obtained by differentiating θe1 with respect to time, i.e. a value obtained by converting an angular velocity of the first rotor with respect to the stator to an electrical angular velocity. Furthermore, ωe2 represents a second rotor electrical angular velocity, which is a value obtained by differentiating θe2 with respect to time, i.e. a value obtained by converting an angular velocity of the second rotor with respect to the stator to an electrical angular velocity.

Further, magnetic fluxes of the magnetic poles that directly pass through the U-phase to W-phase coils without via the soft magnetic material elements are very small, and hence influence thereof is negligible. Therefore, dΨu/dt to dΨw/dt, which are values obtained by differentiating with respect to time the magnetic fluxes Ψu to Ψw (equations (18) to (20)) of the magnetic poles, which pass through the U-phase to W-phase coils via the soft magnetic material elements, respectively, represent counter-electromotive force voltages (induced electromotive voltages), which are generated in the U-phase to W-phase coils as the magnetic poles and the soft magnetic material elements rotate with respect to the armature row.

From the above, electric currents Iu, Iv and Iw, flowing through the U-phase, V-phase and W-phase coils, respectively, are expressed by the following equations (21), (22) and (23):

$$Iu = I \cdot \sin[(\alpha + 1)\theta e2 - \alpha \cdot \theta e1] \quad (21)$$

$$Iv = I \cdot \sin\left[(\alpha + 1)\theta e2 - \alpha \cdot \theta e1 - \frac{2\pi}{3}\right] \quad (22)$$

$$Iw = I \cdot \sin\left[(\alpha + 1)\theta e2 - \alpha \cdot \theta e1 + \frac{2\pi}{3}\right] \quad (23)$$

wherein I represents the amplitude (maximum value) of electric currents Iu to Iw flowing through the U-phase to W-phase coils, respectively.

Further, from the above equations (21) to (23), the electrical angular position θmf of the vector of the rotating magnetic field with respect to the U-phase coil is expressed by the following equation (24), and the electrical angular velocity ωmf of the rotating magnetic field with respect to the U-phase coil (hereinafter referred to as "the magnetic field electrical angular velocity") is expressed by the following equation (25):

$$\theta mf = (\alpha + 1)\theta e2 - \alpha \cdot \theta e1 \quad (24)$$

$$\omega mf = (\alpha + 1)\omega e2 - \alpha \cdot \omega e1 \quad (25)$$

Further, the mechanical output (power) W, which is output to the first and second rotors by the flowing of the currents Iu to Iw through the U-phase to W-phase coils, is represented, provided that an reluctance-associated portion is excluded therefrom, by the following equation (26):

$$W = \frac{d\Psi u}{dt} \cdot Iu + \frac{d\Psi v}{dt} \cdot Iv + \frac{d\Psi w}{dt} \cdot Iw \quad (26)$$

When the above equations (18) to (23) are substituted into this equation (26) for arrangement, there is obtained the following equation (27):

$$W = -\frac{3 \cdot b}{4} \cdot \psi f \cdot I[(\alpha + 1)\omega e2 - \alpha \cdot \omega e1] \quad (27)$$

Furthermore, the relationship between this mechanical output W, the aforementioned first and second rotor transmission torques T1 and T2, and the first and second rotor electrical angular velocities ωe1 and ωe2 is expressed by the following equation (28):

$$W = T1 \cdot \omega e1 + T2 \cdot \omega e2 \quad (28)$$

As is clear from the above equations (27) and (28), the first and second rotor transmission torques T1 and T2 are expressed by the following equations (29) and (30):

$$T1 = \alpha \cdot \frac{3 \cdot b}{4} \cdot \psi f \cdot I \quad (29)$$

$$T2 = -(\alpha + 1) \cdot \frac{3 \cdot b}{4} \cdot \psi f \cdot I \quad (30)$$

Further, due to the fact that the electric power supplied to the armature row and the mechanical output W are equal to each other (provided that losses are ignored), and from the equations (25) and (27), the aforementioned driving equivalent torque Te is expressed by the following equation (31):

$$Te = \frac{3 \cdot b}{4} \cdot \psi f \cdot I \quad (31)$$

Further, by using the above equations (29) to (31), there is obtained the following equation (32):

$$Te = \frac{T1}{\alpha} = \frac{-T2}{(\alpha+1)} \quad (32)$$

The relationship between the torques, expressed by the equation (32), and the relationship between the electrical angular velocities, expressed by the equation (25), are quite the same as the relationship between the torques and the relationship between the rotational speeds of the sun gear, the ring gear and the carrier of a planetary gear unit.

Further, as described above, on condition that b=a+c and a−c≠0 hold, the relationship between the electrical angular velocities, expressed by the equation (25), and the relationship between the torques, expressed by the equation (32), hold. The above condition b=a+c is expressed by b=(p+q)/2, i.e. b/q=(1+p/q)/2, assuming that the number of the magnetic poles is p and that of the armature magnetic poles is q. Here, as is clear from the fact that if p/q=m holds, b/q=(1+m)/2 is obtained, the satisfaction of the above condition of b=a+c represents that the ratio between the number of the armature magnetic poles, the number of the magnetic poles, and the number of the soft magnetic material elements is 1:m:(1+m)/2. Further, the satisfaction of the above condition of a−c≠0 represents that m≠1.0 holds. According to the rotating machine of the present invention, the ratio between the number of the armature magnetic poles, the number of the magnetic poles, and the number of the soft magnetic material elements is set to 1:m:(1+m)/2 (m≠1.0), and hence the relationship between the electrical angular velocities, expressed by the equation (25), and the relationship between the torques, expressed by the equation (32), hold, from which it is understood that the rotating machine properly operates.

Further, as is clear from the equations (25) and (32), by setting α=a/c, i.e. the ratio of the pole pair number of the magnetic poles to the pole pair number of the armature magnetic poles (hereinafter referred to as "the pole pair number ratio"), it is possible to freely set the relationship between the magnetic field electrical angular velocity ωmf, and the first and second rotor electrical angular velocities ωe1 and ωe2, and the relationship between the driving equivalent torque Te, the first and second rotor transmission torques T1 and T2, and hence it is possible to enhance the degree of freedom in design of the rotating machine. The same advantageous effects can be obtained also when the number of phases of coils of the plurality of armatures is other than the aforementioned 3.

As described above, in the rotating machine, when the rotating magnetic field is generated by supplying electric power to the armatures, magnetic force lines are generated in a manner connecting between the aforementioned magnetic poles, soft magnetic material elements, and armature magnetic poles, and the action of the magnetism of the magnetic force lines converts the electric power supplied to the armatures to mechanical power, which is output from the first rotor or the second rotor such that the aforementioned electrical angular velocity and torque relationships hold. Therefore, by supplying mechanical power to at least one of the first and second rotors in a state where electric power is not being supplied to the armatures, to thereby cause the same to rotate with respect to the armatures, electric power is generated in the armatures, and the rotating magnetic field is generated.

Therefore, in this case as well, such magnetic force lines that connect between the magnetic poles, the soft magnetic material elements, and the armature magnetic poles are generated, and the action of the magnetism of the magnetic force lines causes the electrical angular velocity relationship shown in the equation (25) and the torque relationship shown in the equation (32), mentioned above, to hold.

That is, assuming that torque equivalent to the generated electric power and the magnetic field electrical angular velocity ωmf is the electric power-generating equivalent torque, a relationship shown in the equation (32) holds between the electric generating equivalent torque and the first and second rotor transmission torques T1 and T2. As is clear from the above, the rotating machine according to the present invention has the same functions as those of an apparatus formed by combining a planetary gear unit and a general one-rotor-type rotating machine.

Further, according to the above-described construction, the first rotor of the rotating machine is connected to one of the output shaft of the prime mover and the accessory, while the second rotor is connected to the other of the output shaft of the prime mover and the accessory. From the above, according to the accessory drive system according to the present invention, the accessory can be driven as follows: Hereafter, it is assumed that an accessory drive system in which the first and second rotors are connected to the accessory and the output shaft of the prime mover, respectively, is referred to as "the first accessory drive system" and an accessory drive system in which the first and second rotors are connected to the output shaft of the prime mover and the accessory, respectively, is referred to as "the second accessory drive system". First, a description will be given of how the accessory is driven by the first accessory drive system when the prime mover is at rest. In this case, when the prime mover is e.g. an internal combustion engine, the friction of the engine acts on the second rotor, and the friction is much larger than torque required for driving the accessory. Based on this fact and the aforementioned functions of the rotating machine, when electric power is supplied to the stator, the driving equivalent torque based on the electric power is transmitted to the accessory via the first rotor, using the friction acting on the second rotor as mentioned above as a reaction force, whereby the accessory is driven.

Next, a description will be given of how the accessory is driven by the first accessory drive system when the prime mover is in operation. In this case, when the rotational direction of the rotating magnetic field determined by the respective rotational speeds of the first and second rotors is the same as that of the second rotor, electric power is generated by the stator using the mechanical power transmitted from the output shaft of the prime mover to the second rotor. This causes part of the torque transmitted from the output shaft of the prime mover to the second rotor to be transmitted to the accessory via the first rotor using the electric power-generating equivalent torque as a reaction force, whereby the accessory is driven. On the other hand, when the rotational direction of the rotating magnetic field determined by the respective rotational speeds of the first and second rotors is opposite to that of the second rotor, electric power is supplied to the stator. This causes, based on the functions of the rotating machine, part of the torque transmitted from the output shaft of the prime mover to the second rotor to be transmitted to the accessory via the first rotor using the driving equivalent torque as a reaction force, whereby the accessory is driven.

As described above, in both of the cases where the prime mover of the first accessory drive system is at rest and in operation, it is possible to drive the accessory.

Further, in the first accessory drive system, when the first and second rotors are directly connected to the accessory and the output shaft of the prime mover without via a transmission mechanism, such as gears, the rotational speed of the first rotor and that of the accessory are equal to each other, and the rotational speed of the second rotor and that of the output shaft of the prime mover are equal to each other. Based on this fact and the equation (25), a relationship between the respective rotational speeds of the output shaft of the prime mover, the accessory, the rotating magnetic field, and the first and second rotors can be expressed e.g. as shown in FIG. 31. FIG. 31 is a so-called nomograph (collinear chart) in which vertical lines intersecting with a horizontal line indicative of a value of 0 indicate respective rotational speeds of rotating elements, and the distance between a white circle of each vertical line and the horizontal line corresponds to the rotational speed of a rotating element denoted at one end of the vertical line. This also applies to the other velocity nomographs, referred to hereinafter. It should be noted that in the present specification, "direct connection" is intended to mean connection of elements without using a transmission mechanism, such as gears.

On the other hand, as described hereinbefore, in the conventional accessory drive system, the difference between the rotational speed of the first and second rotating magnetic fields and that of the second rotor and the difference between the rotational speed of the second rotor and that of the first rotor are equal to each other, and hence the rotational speed of the first and second rotating magnetic fields is expressed as indicated by a broken line in a velocity nomograph shown in FIG. 31. The aforementioned various rotating elements are in a nomographic (collinear) relation, and because of a relatively high rotational speed of the prime mover, when the rotational speed of the second rotor is higher than that of the first rotor, as shown in FIG. 31, the rotational speed of the first and second rotating magnetic fields becomes higher than that of the second rotor, and is too high. In contrast, according to the first accessory drive system of the present invention, as is apparent from a comparison between a broken line and a solid line in the velocity nomograph in FIG. 31, the rotational speed of the rotating magnetic field can be reduced to be lower than in the conventional cases, and hence it is possible to prevent the driving efficiency of the accessory from being lowered due to occurrence of losses caused by too high a rotational speed of the rotating magnetic field.

Next, a description will be given of how the accessory is driven when the prime mover of the second accessory drive system (in which the first and second rotors are connected to the output shaft of the prime mover and the accessory, respectively) is at rest. In this case, when the prime mover is e.g. an internal combustion engine, the friction of the engine, which is much larger than torque required for driving the accessory, acts on the first rotor. Therefore, by supplying electric power to the stator, the driving equivalent torque based on the electric power is transmitted to the accessory via the second rotor, using the fiction acting on the first rotor as mentioned above as a reaction force, whereby the accessory is driven.

Next, a description will be given of how the accessory is driven when the prime mover of the second accessory drive system is in operation. In this case, when the rotational direction of the rotating magnetic field determined by the respective rotational speeds of the first and second rotors is opposite to the rotational direction of the first rotor, using the mechanical power transmitted from the output shaft of the prime mover to the first rotor, electric power is generated by the stator. This causes, based on the functions of the rotating machine, the torque transmitted from the output shaft of the prime mover to the first rotor, to be transmitted to the accessory via the second rotor, using the electric power-generating equivalent torque as a reaction force, whereby the accessory is driven. On the other hand, when the rotational direction of the rotating magnetic field determined by the respective rotational speeds of the first and second rotors is the same as that of the first rotor, electric power is supplied to the stator. This causes, based on the functions of the rotating machine, the torque transmitted from the output shaft of the prime mover to the first rotor to be transmitted to the accessory via the second rotor using the driving equivalent torque as a reaction force, whereby the accessory is driven.

As described above, in both of the cases where the prime mover of the second accessory drive system is at rest and in operation, it is possible to drive the accessory.

Further, during driving of the accessory of the first and second accessory drive system, as is apparent from the aforementioned equation (32), as the aforementioned pole pair number ratio $\alpha$ is larger, the driving equivalent torque Te becomes smaller with respect to the first and second rotor transmission torques T1 and T2. This applies not only during occurrence of the rotating magnetic field by the supply of electric power, but also during occurrence of the rotating magnetic field for electric power generation. Therefore, by setting the pole pair number ratio $\alpha$ to a larger value, it is possible to reduce the size of the stator, which in turn makes it possible to reduce the size and costs of the accessory drive system including the first and second accessory drive systems. Further, differently from the conventional case described hereinbefore, it is possible to cause the rotating machine to operate by a single row of soft magnetic material elements, to thereby drive the accessory, and hence it is possible to simplify the construction of the rotating machine, which in turn makes it possible to simplify the construction of the accessory drive system, and further reduce the manufacturing costs thereof.

Preferably, the accessory drive system further comprises relative rotational angle positional relation-detecting means for detecting a relative rotational angle positional relation between the stator and the first and second rotors, and control means for controlling the rotating magnetic field based on the detected relative rotational angle positional relation between the stator and the first and second rotors.

With the construction of this preferred embodiment, the relative rotational angle positional relation-detecting means detects a relative rotational angle positional relation between the stator and the first and second rotors, and the control means controls the rotating magnetic field based on the detected relative rotational angle positional relation between the stator and the first and second rotors. This makes it possible to properly generate the magnetic force lines between the magnetic poles, the soft magnetic material elements, and the armature magnetic poles, and cause the magnetism by the magnetic force lines to act properly, and hence it is possible to ensure the proper operation of the rotating machine, which in turn makes it possible to ensure the proper operation of the accessory drive system. It should be noted that "detection" is intended to mean not only direct detection using a sensor, but also calculation or estimating by computing operation.

More preferably, the relative rotational angle positional relation-detecting means detects electrical angular positions of the first and second rotors with respect to the stator, respectively, as the relative rotational angle positional relation between the stator and the first and second rotors, and the control means controls the rotating magnetic field based on a difference between a value obtained by multiplying the detected electrical angular position of the second rotor by (1+m), and a value obtained by multiplying the detected electrical angular position of the first rotor by m.

With the construction of this preferred embodiment, the moving rotating magnetic field is controlled based on the difference between the value obtained by multiplying the detected electrical angular position of the second rotor with respect to the stator by (1+m), and the value obtained by multiplying the detected electrical angular position of the first rotor with respect to the stator by m. As is clear from claim 1, m represents the ratio of the number of the magnetic poles to the number of the armature magnetic poles. Further, as described hereinabove as to the operation of claim 1, when the rotating machine is in operation, the relationship between the electrical angular position of the rotating magnetic fields and the electrical angular positions of the first and second rotors is expressed by the equation (24). In the equation (24), the pole pair number ratio $\alpha$ represents the ratio (a/c) of the pole pair number of the magnetic poles to the pole pair number of the armature magnetic poles, that is, the ratio of the number of the magnetic poles to the number of the armature magnetic poles, which is equal to m. Therefore, with the above-described arrangement, it possible to ensure a more proper operation of the rotating machine.

The above and other objects, features, and advantages of the present invention will become more apparent from the following detailed description taken in conjunction with the accompanying drawings.

BRIEF DESCRIPTION OF THE DRAWINGS

FIGS. 5A to 5C are diagrams illustrating the operation of the rotating machine in FIG. 1 in a case where electric power is supplied to the stator in a state of the first rotor being held unrotatable;

FIGS. 6A to 6D are diagrams illustrating a continuation of the operation in FIGS. 5A to 5C;

FIGS. 10A to 10D are diagrams illustrating a continuation of the operation in FIGS. 9A to 9C;

FIG. 12 is a diagram illustrating an example of changes in U-phase to W-phase counter-electromotive force voltages in a case where the first rotor of the rotating machine in the present invention is held unrotatable;

FIG. 13 is a diagram illustrating an example of changes in a driving equivalent torque, and first and second rotor transmission torques in the case where the first rotor of the rotating machine in the present invention is held unrotatable;

FIG. 18 is a velocity nomograph illustrating an example of a relationship between the respective rotational speeds of the rotating elements of the accessory drive system shown in FIG. 1, together with an example of a relationship between the respective torques of the rotating elements, when the accessory drive system is in the ENG operation mode and at the same time the engine speed is very low;

FIG. 32 is a block diagram showing the rotating machine in FIG. 1, an ECU and the like.

DETAILED DESCRIPTION OF PREFERRED EMBODIMENTS

Figure 1:
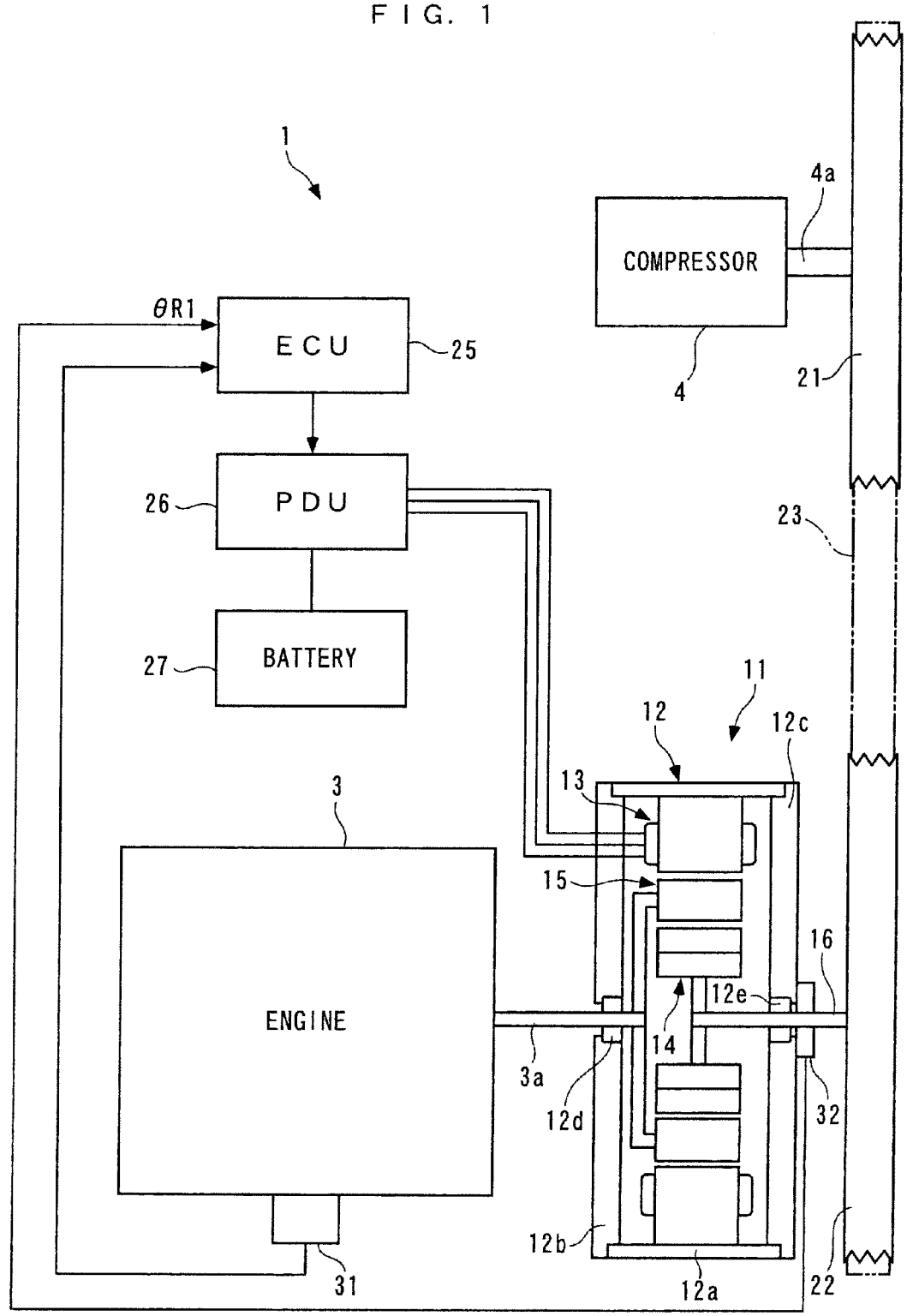
FIG. 1 is a diagram schematically showing an accessory drive system according to a first embodiment of the present invention together with an engine and a compressor.

The present invention will now be described in detail with reference to the drawings showing preferred embodiments thereof. It should be noted that in the figures, hatching in portions illustrating cross-sections are omitted for convenience. FIG. 1 schematically shows an accessory drive system 1 according to a first embodiment of the present invention together with an internal combustion engine 3 (prime mover) and a compressor 4 (accessory). The internal combustion engine (hereinafter simply referred to as "the engine") 3 is e.g. a gasoline engine installed on a vehicle (not shown) as a drive source, and is equipped with a crank angle sensor 31, which is an electromagnetic induction-type sensor (relative rotational angle positional relation-detecting means). The crank angle sensor 31 detects the crank angle position of a crankshaft 3a (output shaft) of the engine 3, and delivers a signal indicative of the sensed crank angle position to an ECU 25 (relative rotational angle positional relation-detecting means, control means), described hereinafter. The ECU 25 calculates the rotational speed NE of the engine 3 (hereinafter referred to as "the engine speed NE") based on the sensed crank angle position. The aforementioned compressor 4 is for an air conditioner installed on a vehicle, and has an input shaft 4a thereof integrally formed with an input pulley 21.

Referring to FIG. 1, the accessory drive system 1 is comprised of a rotating machine 11, the ECU 25 for controlling the operation of the rotating machine 11, a power drive unit 26 (hereinafter simply referred to as "the PDU 26") (control means), and a battery 27. The rotating machine 11 has an output pulley 22 integrally formed with an rotating shaft 16 thereof, referred to hereinafter, and a belt 23 extends around the output pulley 22 and aforementioned input pulley 21.

Figure 2:
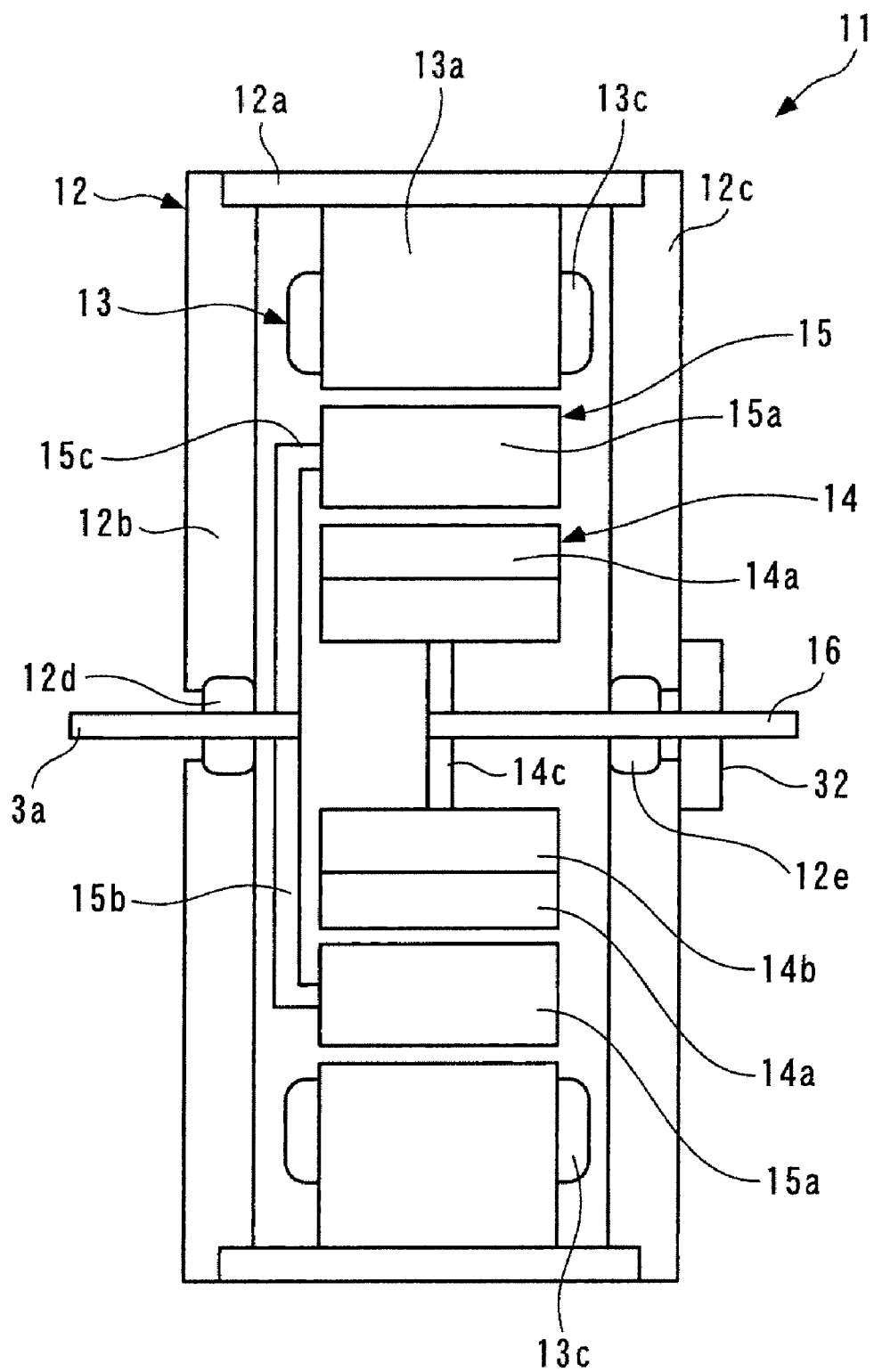
FIG. 2 is an enlarged cross-sectional view of a rotating machine appearing in FIG. 1.

As shown in FIGS. 1 and 2, the rotating machine 11 is comprised of an immovable casing 12, a stator 13 disposed in the casing 12, a first rotor 14 disposed within the casing 12 in a manner opposed to the stator 13, and a second rotor 15 disposed between the two 13 and 14, and the rotating shaft 16. The casing 12 includes a hollow cylindrical peripheral wall 12a, and a pair of annular plate-shaped side walls 12b and 12c integrally provided on opposite ends of the peripheral wall 12a, respectively. The side walls 12b and 12c have bearings 12d and 12e mounted in the respective centers thereof. These bearings 12d and 12e support the crankshaft 3a and the rotating shaft 16, respectively. The crankshaft 3a and the rotating shaft 16 are disposed in a manner concentric to each other, and both of the two 3a and 16 have portions thereof accommodated within the casing 12, and the remaining portions thereof protrude out of the casing 12. Further, the stator 13, the second rotor 15, and the first rotor 14 are coaxially arranged side by side in a radial direction of the rotating shaft 16 (hereinafter simply referred to as "radially" or "in the radial direction") in the mentioned order.

Figure 3:
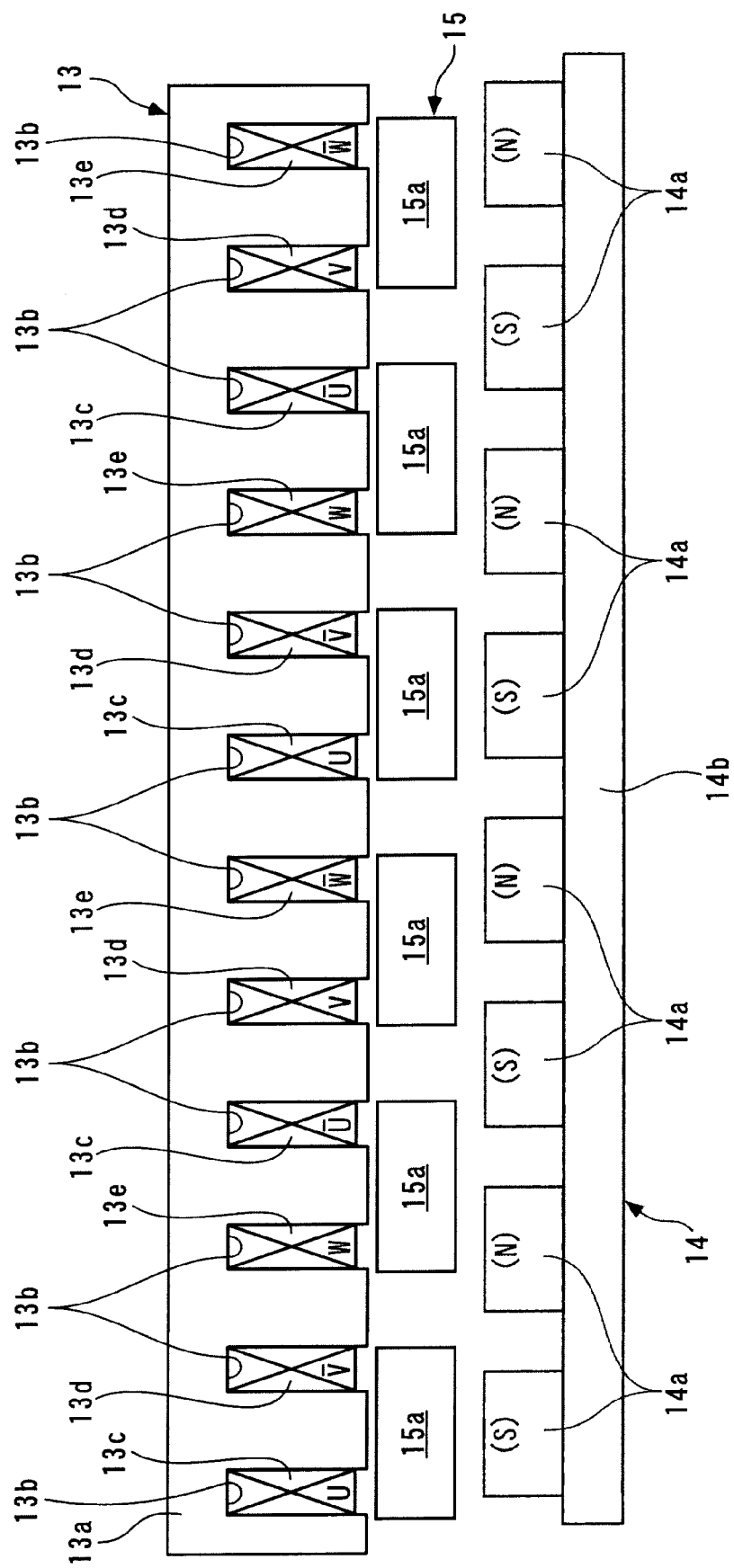
FIG. 3 is a schematic development view showing a stator and first and second rotors of the rotating machine in FIG. 1, in a state developed in the circumferential direction.

The aforementioned stator 13 is for generating a rotating magnetic field, and as shown in FIGS. 2 and 3, includes an iron core 13a (armature), and U-phase, V-phase and W-phase coils 13c, 13d and 13e (armature) provided on the iron core 13a. It should be noted that in FIG. 2, only the U-phase coil 13c is shown for convenience. The iron core 13a, which has a hollow cylindrical shape formed by laminating a plurality of steel plates, extends in the direction of axis (hereinafter simply referred to as "axially" or "in the axial direction"), and is mounted on the inner peripheral surface of the peripheral wall 12a of the casing 12. Further, the inner peripheral surface of the iron core 13a is formed with twelve slots 13b. The slots 13b extend in the axial direction, and are arranged at equally-spaced intervals in the direction of circumference (hereinafter simply referred to as "circumferentially" or "in the circumferential direction"). The U-phase to W-phase coils 13c to 13e are wound in the slots 13b by distributed winding (wave winding), and are connected to the battery 27 via the PDU 26. The PDU 26 is implemented as an electric circuit comprised of an inverter, and is connected to the ECU 25.

In the stator 13 configured as above, when electric power is supplied from the battery 27 via the PDU 26, to thereby cause electric current to flow through the U-phase to W-phase coils 13c to 13e, or when electric power is generated, as described hereinafter, four magnetic poles are generated at an end of the iron core 13a toward the first rotor 14 at equally-spaced intervals in the circumferential direction (see FIGS. 5A to 5C), and a rotating magnetic field caused by the magnetic poles rotates in the circumferential direction. Hereinafter, the magnetic poles generated on the iron core 13a are referred to as "the armature magnetic poles". Further, each two armature magnetic poles which are circumferentially adjacent to each other have polarities different from each other. It should be noted that in FIGS. 5A to 5C and other figures, referred to hereinafter, the armature magnetic poles are represented by (N) and (S) over the iron core 13a and the U-phase to W-phase coils 13c to 13e.

As shown in FIG. 3, the first rotor 14 includes a magnetic pole row comprised of eight permanent magnets 14a (magnetic poles). These permanent magnets 14a are arranged at equally-spaced intervals in the circumferential direction, and the magnetic pole row is opposed to the iron core 13a of the stator 13. Each permanent magnet 14a extends in the axial direction, and the length thereof in the axial direction is set to the same length as that of the iron core 13a of the stator 13.

Further, the permanent magnets 14a are mounted on an outer peripheral surface of a mounting portion 14b. This mounting portion 14b is formed by a soft magnetic material, such as iron or a laminate of a plurality of steel plates, and has an inner peripheral surface thereof attached to the outer peripheral surface of a disk-shaped flange 14c. The flange 14c is integrally formed with the aforementioned rotating shaft 16. Thus, the first rotor 14 including the permanent magnets 14a is rotatable in unison with the rotating shaft 16, and is connected to the compressor 14 via the rotating shaft 16, the output pulley 22, the belt 23, and the input pulley 21. Further, the permanent magnets 14a are attached to the outer peripheral surface of the mounting portion 14b formed by the soft magnetic material, as described above, and hence a magnetic pole of (N) or (S) appears on an end of each permanent magnet 14a toward the stator 13. It should be noted that in FIG. 3 and other figures, referred to hereinafter, the magnetic poles of the permanent magnets 14a are denoted by (N) and (S). Further, each two permanent magnets 14a circumferentially adjacent to each other have polarities different from each other.

The second rotor 15 includes a single soft magnetic material element row comprised of six cores 15a (soft magnetic material elements). These cores 15a are arranged at equally-spaced intervals in the circumferential direction, and the soft magnetic material element row is disposed between the iron core 13a of the stator 13 and the first rotor 14, in a manner spaced therefrom by respective predetermined distances. Each core 15a is formed by a soft magnetic material, such as a laminate of a plurality of steel plates, and extends in the axial direction. Further, similarly to the permanent magnet 14a, the length of the core 15a in the axial direction is set to the same length as that of the iron core 13a of the stator 13. Furthermore, the core 15a is mounted on an outer end of a disk-shaped flange 15b via a hollow cylindrical connecting portion 15c slightly extending in the axial direction. This flange 15b is integrally formed with the aforementioned crankshaft 3a. This arrangement makes the second rotor 15 including the cores 15a, which is directly connected to the crankshaft 3a, rotatable in unison with the crankshaft 3a. It should be noted that in FIGS. 3 and 5A to 5C, the connecting portion 15c and the flange 15b are omitted for convenience.

Now, a description will be given of the operation of the rotating machine constructed as described above. As described hereinabove, the rotating machine 11 includes the four armature magnetic poles, the eight magnetic poles of the permanent magnets 14a (hereinafter referred to as "the magnet magnetic poles"), and the six cores 15a. That is, the ratio between the number of the armature magnetic poles, the number of the magnet magnetic poles, and the number of the cores 15a (hereinafter referred to as "the pole number ratio") is set to 1:2.0:(1+2.0)/2. As is clear from this configuration and the aforementioned equations (18) to (20), counter-electromotive force voltages, which are generated by the U-phase to W-phase coils 13c to 13e as the first rotor 14 and the second rotor 15 rotate with respect to the stator 13 (hereinafter referred to as "the U-phase counter-electromotive force voltage Vcu", "the V-phase counter-electromotive force voltage Vcv" and "the W-phase counter-electromotive force voltage Vcw", respectively), are expressed by the following equations (33), (34) and (35).

$$Vcu = -3 \cdot \psi F[(3 \cdot \omega ER2 - 2 \cdot \omega ER1)\sin(3 \cdot \theta ER2 - 2 \cdot \theta ER1)] \quad (33)$$

$$Vcv = -3 \cdot \psi F\left[(3 \cdot \omega ER2 - 2 \cdot \omega ER1)\sin\left(3 \cdot \theta ER2 - 2 \cdot \theta ER1 - \frac{2\pi}{3}\right)\right] \quad (34)$$

$$Vcw = -3 \cdot \psi F\left[(3 \cdot \omega ER2 - 2 \cdot \omega ER1)\sin\left(3 \cdot \theta ER2 - 2 \cdot \theta ER1 + \frac{2\pi}{3}\right)\right] \quad (35)$$

In these equations, $\phi F$ represents the maximum value of magnetic fluxes of the magnet magnetic poles. Further, $\theta ER1$ represents a first rotor electrical angle, which is a value obtained by converting a rotational angle position of a specific permanent magnet 14a with respect to a specific U-phase coil 13c (hereinafter referred to as "the reference coil") to an electrical angular position. More specifically, the first rotor electrical angle $\theta ER1$ is a value obtained by multiplying the rotational angle position of the specific permanent magnet 14a (hereinafter referred to as "the first rotor rotational angle $\theta ER1$") by a pole pair number of the armature magnetic poles, i.e. a value of 2. Further, $\theta ER2$ represents a second rotor electrical angle, which is a value obtained by converting a rotational angle position of a specific core 15a of the second rotor 15 with respect to the aforementioned reference coil to an electrical angular position. More specifically, the second rotor electrical angle $\theta ER2$ is a value obtained by multiplying the rotational angle position of this specific core 15a (hereinafter referred to as "the second rotor rotational angle $\theta R2$") by a pole pair number (value of 2) of the armature magnetic poles.

Further, $\omega ER1$ in the equations (33) to (35) represents a first rotor electrical angular velocity, which is a value obtained by differentiating the first rotor electrical angle $\theta ER1$ with respect to time, i.e. a value obtained by converting an angular velocity of the first rotor 14 with respect to the stator 13 to an electrical angular velocity. Furthermore, $\omega ER2$ represents a second rotor electrical angular velocity which is a value obtained by differentiating the second rotor electrical angle θER2 with respect to time, i.e. a value obtained by converting an angular velocity of the second rotor 15 with respect to the stator 13 to an electrical angular velocity.

Further, as is clear from the aforementioned pole number ratio and the aforementioned equations (21) to (23), currents flowing through the respective U-phase, V-phase and W-phase coils 13c, 13d and 13e (hereinafter referred to as "the U-phase current Iu", "the V-phase current Iv" and "the W-phase current Iw") are expressed by the following equations (36), (37) and (38), respectively.

$$Iu = I \cdot \sin(3 \cdot \theta ER2 - 2 \cdot \theta ER1) \quad (36)$$

$$Iv = I \cdot \sin\left(3 \cdot \theta ER2 - 2 \cdot \theta ER1 - \frac{2\pi}{3}\right) \quad (37)$$

$$Iw = I \cdot \sin\left(3 \cdot \theta ER2 - 2 \cdot \theta ER1 + \frac{2\pi}{3}\right) \quad (38)$$

In these equations, I represents the amplitude (maximum value) of the U-phase to W-phase currents Iu to Iw. Furthermore, as is clear from the afore-mentioned pole number ratio and the aforementioned equations (24) and (25), the electrical angular position (hereinafter referred to as "the magnetic field electrical angular position θMFR") of a vector of the rotating magnetic field of the stator 13 with respect to the reference coil is expressed by the following equation (39), and the electrical angular velocity of the rotating magnetic field with respect to the stator 13 (hereinafter referred to as "the magnetic field electrical angular velocity ωMFR") is expressed by the following equation (40):

$$\theta MFR = 3 \cdot \theta ER2 - 2 \cdot \theta ER1 \quad (39)$$

$$\omega MRF = 3 \cdot \omega ER2 - 2 \cdot \omega ER1 \quad (40)$$

Figure 4:
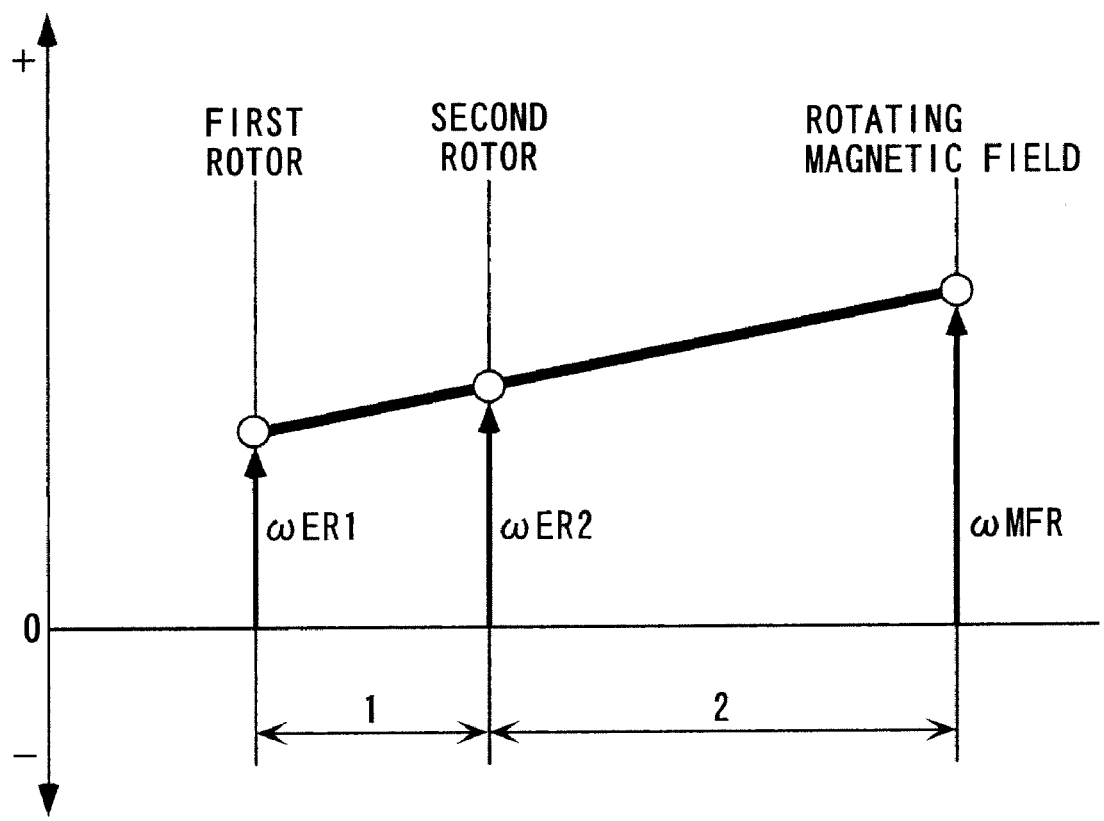
FIG. 4 is a velocity nomograph illustrating an example of the relationship between a magnetic field electrical angular velocity, and first and second rotor electrical angular velocities of the rotating machine in FIG. 1.
Figure 7A:
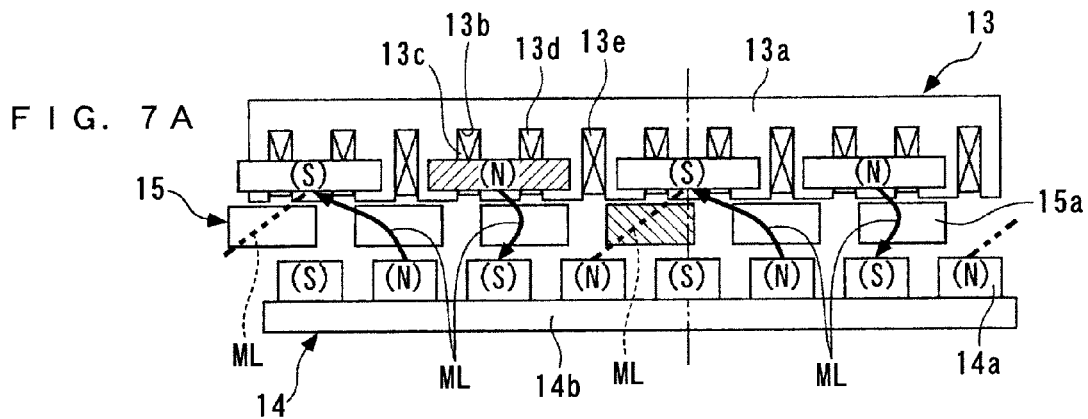
FIGS. 7A and 7B are diagrams illustrating a continuation of the operation in FIGS. 6A to 6D.
Figure 7B:
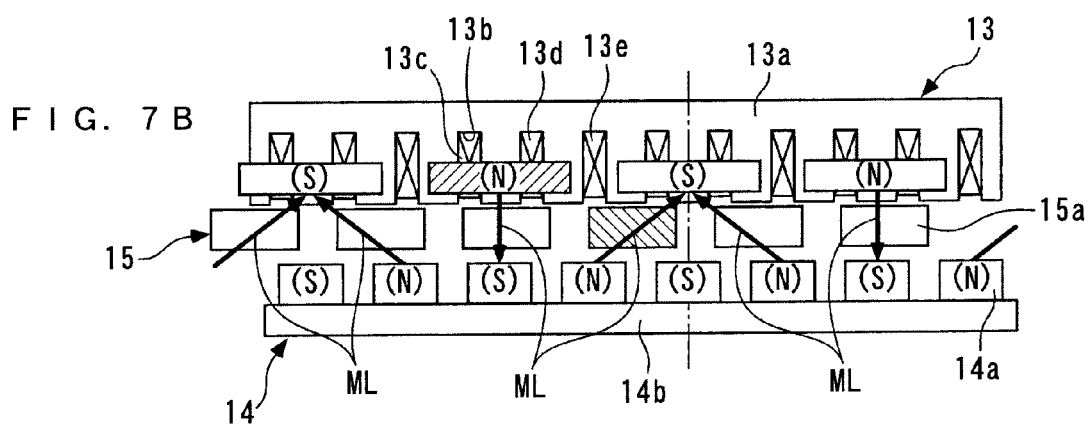

Therefore, the relationship between the magnetic field electrical angular velocity ωMFR, the first rotor electrical angular velocity ωER1, and the second rotor electrical angular velocity ωER2 can be expressed by a so-called velocity nomograph, which is illustrated e.g. as in FIG. 4.

Further, assuming that a torque equivalent to electric power supplied to the stator 13 and the magnetic field electrical angular velocity ωMFR is a driving equivalent torque TSE, as is clear from the aforementioned pole number ratio and the aforementioned equation (32), the relationship between the driving equivalent torque TSE, a torque TR1 transmitted to the first rotor 14 (hereinafter referred to as "the first rotor transmission torque TR1"), and a torque TR2 transmitted to the second rotor 15 (hereinafter referred to as "the second rotor transmission torque TR2") is expressed by the following equation (41):

$$TSE = \frac{TR1}{2} = \frac{-TR2}{3} \quad (41)$$

The relationship of the electrical angular velocities expressed by the equation (40), and the relationship between the torques expressed by the equation (41) are quite the same as the relationship between the rotational speed of the sun gear, that of the ring gear, and that of the carrier of a planetary gear unit having a gear ratio between the sun gear and the ring gear set to 1:2, and the relationship between torques thereof.

Next, a more specific description will be given of how electric power supplied to the stator 13 is converted to mechanical power and is output from the first rotor 14 and the second rotor 15. First, a case where electric power is supplied to the stator 13 in a state in which the first rotor 14 is held unrotatable will be described with reference to FIGS. 5A to 7B. It should be noted that in FIGS. 5A to 7B, reference numerals indicative of a plurality of component elements are omitted for convenience. This also applies to other figures, referred to hereinafter. Further, in FIGS. 5A to 7B, one identical armature magnetic pole and one identical core 15a are indicated by hatching for clarity.

First, as shown in FIG. 5A, from a state where the center of a certain core 15a and the center of a certain permanent magnet 14a are circumferentially coincident with each other, and the center of a third core 15a from the certain core 15a and the center of a fourth permanent magnet 14a from the certain permanent magnet 14a are circumferentially coincident with each other, the rotating magnetic field is generated such that it rotates leftward, as viewed in FIG. 5A. At the start of generation of the rotating magnetic field, the positions of two armature magnetic poles adjacent but one to each other that have the same polarity and respective centers coincident with the centers of cores 15a are caused to circumferentially coincide with the centers of corresponding ones of the permanent magnets 14a, and the polarity of these armature magnetic poles is made different from the polarity of the magnet magnetic poles of these permanent magnets 14a.

Since the rotating magnetic field is generated by the stator 13, between the same and the first rotor 14, and the second rotor 15 having the cores 15a is disposed between the stator 13 and the first rotor 14, as described hereinabove, the cores 15a are magnetized by the armature magnetic poles and the magnet magnetic poles. Because of this fact and the fact that the cores 15a adjacent to each other are spaced from each other, magnetic force lines ML are generated in a manner connecting between the armature magnetic poles, the cores 15a, and the magnet magnetic poles. It should be noted that in FIGS. 5A to 7B, magnetic force lines ML at the iron core 13a and the mounting portion 14b are omitted for convenience. This also applies to other figures, referred to hereinafter.

In the state shown in FIG. 5A, the magnetic force lines ML are generated in a manner connecting an armature magnetic pole, a core 15a and a magnet magnetic pole circumferential positions of which are coincident with each other, and at the same time in a manner connecting armature magnetic poles, cores 15a and magnet magnetic poles which are adjacent to the above-mentioned armature magnetic pole, core 15a, and magnet magnetic pole, respectively, on circumferentially opposite sides thereof. Further, in this state, since the magnetic force lines ML are straight, no magnetic forces for circumferentially rotating the cores 15a act on the cores 15a.

When the armature magnetic poles rotate from the positions shown in FIG. 5A to respective positions shown in FIG. 5B in accordance with rotation of the rotating magnetic field, the magnetic force lines ML are bent, and accordingly magnetic forces act on the cores 15a in such a manner that the magnetic force lines ML are made straight. In this case, the magnetic force lines ML are bent at the cores 15a in a manner convexly curved in an opposite direction to a direction of rotation of the rotating magnetic field (hereinafter, this direction is referred to as "the magnetic field rotation direction") with respect to the straight lines each connecting an armature magnetic pole and a magnet magnetic pole which are connected to each other by an associated one of the magnetic force lines ML. Therefore, the above-described magnetic forces act on the cores 15a to drive the cores 15a in the magnetic field rotation direction. The cores 15a are driven in the magnetic field rotation direction by such action of the magnetic forces caused by the magnetic force lines ML, for rotation to respective positions shown in FIG. 5C, and the second rotor 15 provided with the cores 15a also rotates in the magnetic field rotation direction. It should be noted that broken lines in FIGS. 5B and 5C indicate that the magnetic flux amount of the magnetic force lines ML is very small, and the magnetic connection between the armature magnetic poles, the cores 15a, and the magnet magnetic poles is weak. This also applies to other figures, referred to hereinafter.

As the rotating magnetic field further rotates, a sequence of the above-described operations, that is, the operations that "the magnetic force lines ML are bent at the cores 15a in a manner convexly curved in the direction opposite to the magnetic field rotation direction→the magnetic forces act on the cores 15a in such a manner that the magnetic force lines ML are made straight→the cores 15a and the second rotor 15 rotate in the magnetic field rotation direction" are repeatedly performed as shown in FIGS. 6A to 6D, and FIGS. 7A and 7B. As described above, in a case where electric power is supplied to the stator 13 in a state of the first rotor 14 being held unrotatable, the action of the magnetic forces caused by the magnetic force lines ML converts electric power supplied to the stator 13 to mechanical power, and outputs the mechanical power from the second rotor 15.

Figure 8:
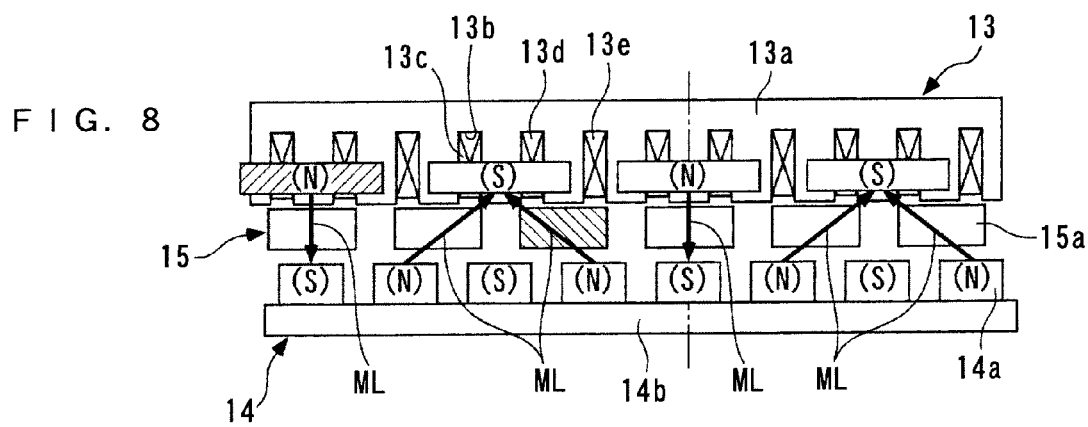
FIG. 8 is a diagram illustrating the positional relationship between armature magnetic poles and cores in a case where the armature magnetic poles have rotated through an electrical angle of $2\pi$ from the state shown in FIGS. 5A to 5C.

FIG. 8 shows a state in which the armature magnetic poles have rotated from the FIG. 5A state through an electrical angle of 2π. As is apparent from a comparison between FIG. 8 and FIG. 5A, it is understood that the cores 15a have rotated in the same direction through ⅓ of a rotational angle of the armature magnetic poles. This agrees with the fact that by substituting ωER1=0 into the aforementioned equation (40), ωER2=ωMFR/3 is obtained.

Figure 9A:
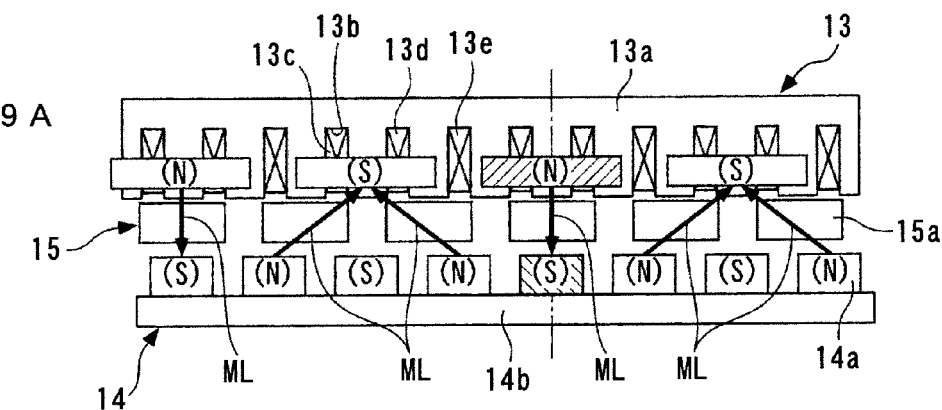
FIGS. 9A to 9C are diagrams illustrating the operation of the rotating machine in FIG. 1 in a case where electric power is supplied to the stator in a state of the second rotor being held unrotatable.

Next, an operation in the case where electric power is supplied to the stator 13 in a state in which the second rotor 15 is held unrotatable will be described with reference to FIGS. 9A to 11B. It should be noted that in FIGS. 9A to 11B, similarly to FIGS. 5A to 7B, one identical armature magnetic pole and one identical permanent magnet 14a are indicated by hatching for clarity. First, as shown in FIG. 9A, similarly to the case shown in FIG. 5A, from a state where the center of a certain core 15a and the center of a certain permanent magnet 14a are circumferentially coincident with each other, and the center of the third core 15a from the certain core 15a and the center of the fourth permanent magnet 14a from the permanent magnet 14a are circumferentially coincident with each other, the rotating magnetic field is generated such that it rotates leftward, as viewed in FIG. 5A. At the start of generation of the rotating magnetic field, the positions of two armature magnetic poles adjacent but one to each other that have the same polarity and respective centers coincident with the centers of cores 15a are caused to circumferentially coincide with the centers of corresponding ones of the permanent magnets 14a, and the polarity of these armature magnetic poles is made different from the polarity of the magnet magnetic poles of these permanent magnets 14a.

In the state shown in FIG. 9A, similarly to the case shown in FIG. 5A, magnetic force lines ML are generated in a manner connecting an armature magnetic pole, a core 15a and a magnet magnetic pole circumferential positions of which are coincident with each other, and at the same time in a manner connecting armature magnetic poles, cores 15a and magnet magnetic poles which are adjacent to the above-mentioned armature magnetic pole, core 15a, and magnet magnetic pole, respectively, on circumferentially opposite sides thereof. Further, in this state, since the magnetic force lines ML are straight, no magnetic forces for circumferentially rotating the permanent magnets 14a act on the permanent magnets 14a.

Figure 9B:
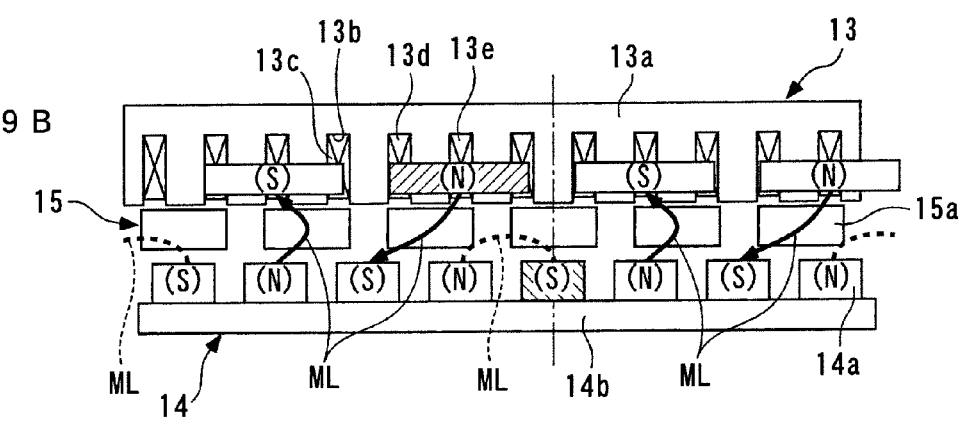
Figure 9C:
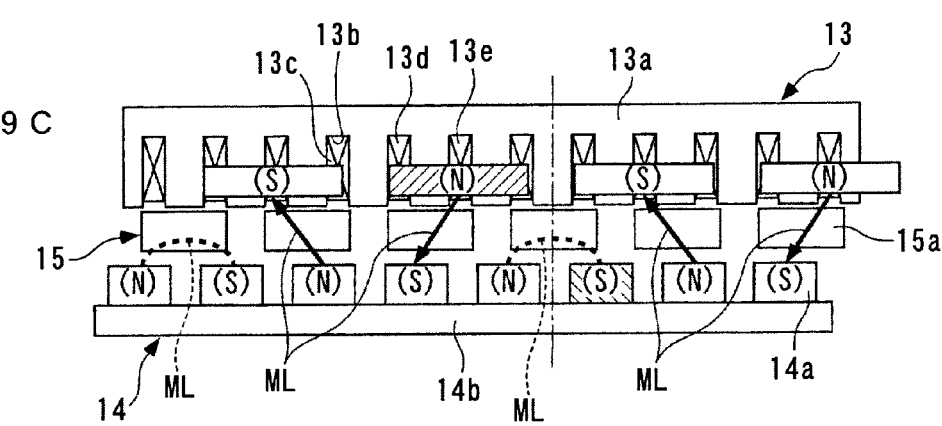

When the armature magnetic poles rotate from the positions shown in FIG. 9A to respective positions shown in FIG. 9B in accordance with rotation of the rotating magnetic field, the magnetic force lines ML are bent, and accordingly magnetic forces act on the permanent magnets 14a in such a manner that the magnetic force lines ML are made straight. In this case, the permanent magnets 14a are each positioned forward of a line of extension from an armature magnetic pole and a core 15a which are connected to each other by an associated one of the magnetic force lines ML, in the magnetic field rotation direction, and therefore the magnetic forces act on the permanent magnets 14a such that each permanent magnet 14a is caused to be positioned on the extension line, i.e. such that the permanent magnet 14a is driven in a direction opposite to the magnetic field rotation direction. The permanent magnets 14a are driven in a direction opposite to the magnetic field rotation direction by such action of the magnetic forces caused by the magnetic force lines ML, and rotate to respective positions shown in FIG. 9C. The first rotor 14 provided with the permanent magnets 14a also rotates in the direction opposite to the magnetic field rotation direction.

As the rotating magnetic field further rotates, a sequence of the above-described operations, that is, the operations that "the magnetic force lines ML are bent→the permanent magnets 14a are each positioned forward of a line of extension from an armature magnetic pole and a core 15a which are connected to each other by an associated one of the magnetic force lines ML, in the magnetic field rotation direction→the magnetic forces act on the permanent magnets 14a in such a manner that the magnetic force lines ML are made straight→the permanent magnets 14a and the first rotor 14 rotate in the direction opposite to the magnetic field rotation direction" are repeatedly performed as shown in FIGS. 10A to 10D, and FIGS. 11A and 11B. As described above, in a case where electric power is supplied to the stator 13 in a state of the second rotor 15 being held unrotatable, the action of the magnetic forces caused by the magnetic force lines ML converts electric power supplied to the stator 13 to mechanical power, and outputs the mechanical power from the first rotor 14.

Figure 11A:
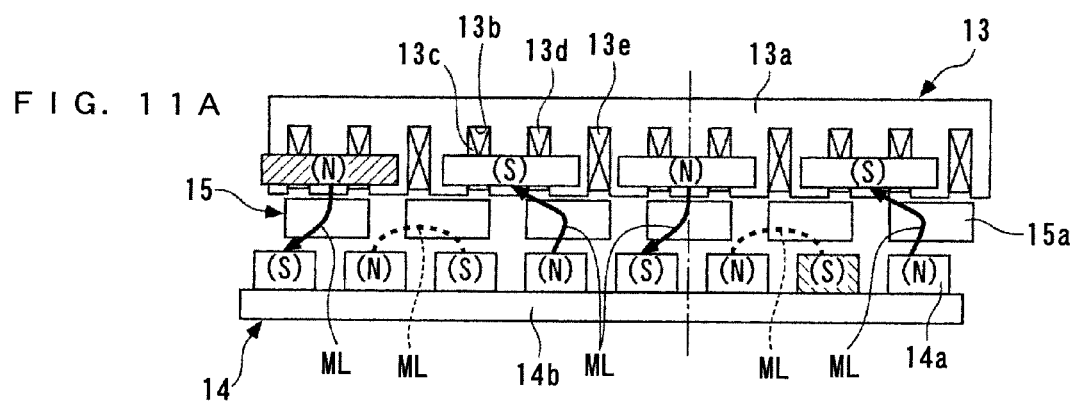
FIGS. 11A and 11B are diagrams illustrating a continuation of the operation in FIGS. 10A to 10D.
Figure 11B:
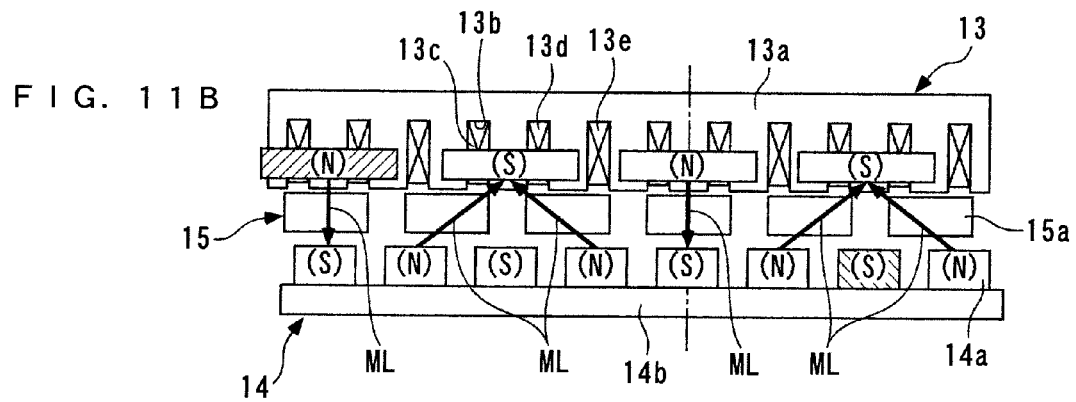

FIG. 11B shows a state in which the armature magnetic poles have rotated from the FIG. 9A state through the electrical angle of 2π. As is apparent from a comparison between FIG. 11B and FIG. 9A, it is understood that the permanent magnets 14a have rotated in the opposite direction through ½ of a rotational angle of the armature magnetic poles. This agrees with the fact that by substituting ωER2=0 into the aforementioned equation (40), −ωER1=ωMFR/2 is obtained.

FIG. 12 and FIG. 13 show results of simulations of control in which the numbers of the armature magnetic poles, the cores 15a, and the permanent magnets 14a are set to 16, 18 and 20, respectively; the first rotor 14 is held unrotatable; and mechanical power is output from the second rotor 15 by supplying electric power to the stator 13. FIG. 12 shows an example of changes in the U-phase to W-phase counter-electromotive force voltages Vcu to Vcw during a time period over which the second rotor electrical angle θER2 changes from 0 to 2π.

In this case, due to the fact that the first rotor 14 is held unrotatable, and that the pole pair numbers of the armature magnetic poles and the magnet magnetic poles are equal to 8 and 10, respectively, and from the aforementioned equation (25), the relationship between the magnetic field electrical angular velocity ωMFR and the first and second rotor electrical angular velocities ωER1 and ωER2 is expressed by ωMFR=2.25·ωER2. As shown in FIG. 12, during a time period over which the second rotor electrical angle θER2 changes from 0 to 2π, the U-phase to W-phase counter-electromotive force voltages Vcu to Vcw are generated over approximately 2.25 repetition periods thereof. Further, FIG. 12 shows changes in the U-phase to W-phase counter-electromotive force voltages Vcu to Vcw, as viewed from the second rotor 15. As shown in FIG. 12, with the second rotor electrical angle θER2 as the horizontal axis, the counter-electromotive force voltages are arranged in the order of the W-phase counter-electromotive force voltage Vcw, the V-phase counter-electromotive force voltage Vcv, and the U-phase counter-electromotive force voltage Vcu. This represents that the second rotor 15 rotates in the magnetic field rotation direction. The simulation results described above with reference to FIG. 12 agree with the relationship of ωMFR=2.25·ωER2, based on the aforementioned equation (26).

Further, FIG. 13 shows an example of changes in the driving equivalent torque TSE, and the first and second rotor transmission torques TR1 and TR2. In this case, due to the fact that the pole pair numbers of the armature magnetic poles and the magnet magnetic poles are equal to 8 and 10, respectively, and from the aforementioned equation (32), the relationship between the driving equivalent torque TSE, and the first and second rotor transmission torques TR1 and TR2 is represented by TSE=TR1/1.25=−TR2/2.25. As shown in FIG. 13, the driving equivalent torque TSE is approximately equal to −TREF; the first rotor transmission torque TR1 is approximately equal to 1.25·(−TREF); and the second rotor transmission torque TR2 is approximately equal to 2.25·TREF. This TREF represents a predetermined torque value (e.g. 200 Nm). The simulation results described above with reference to FIG. 13 agree with the relationship of TSE=TR1/1.25=−TR2/2.25, based on the aforementioned equation (32).

Figure 14:
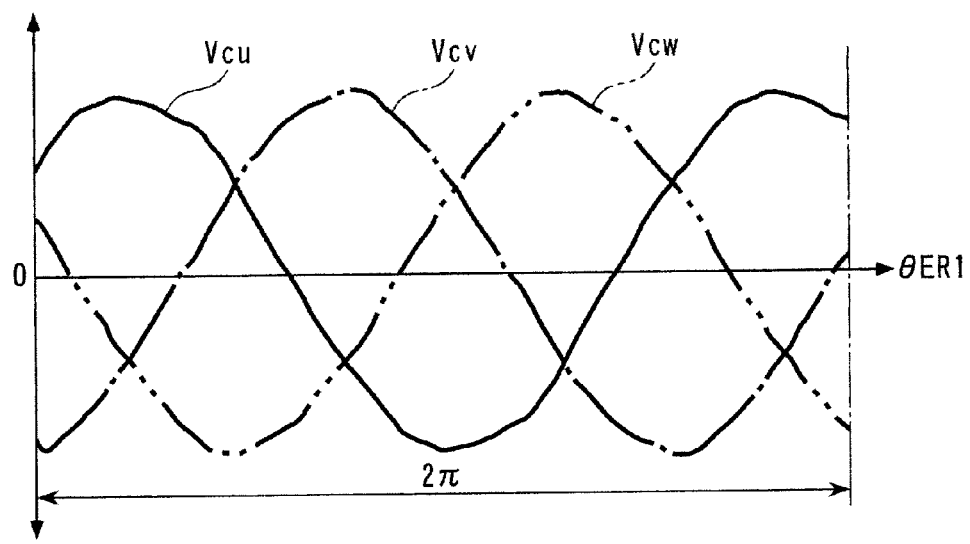
FIG. 14 is a diagram illustrating an example of changes in the U-phase to W-phase counter-electromotive force voltages in the case where the second rotor of the rotating machine in the present invention is held unrotatable.
Figure 15:
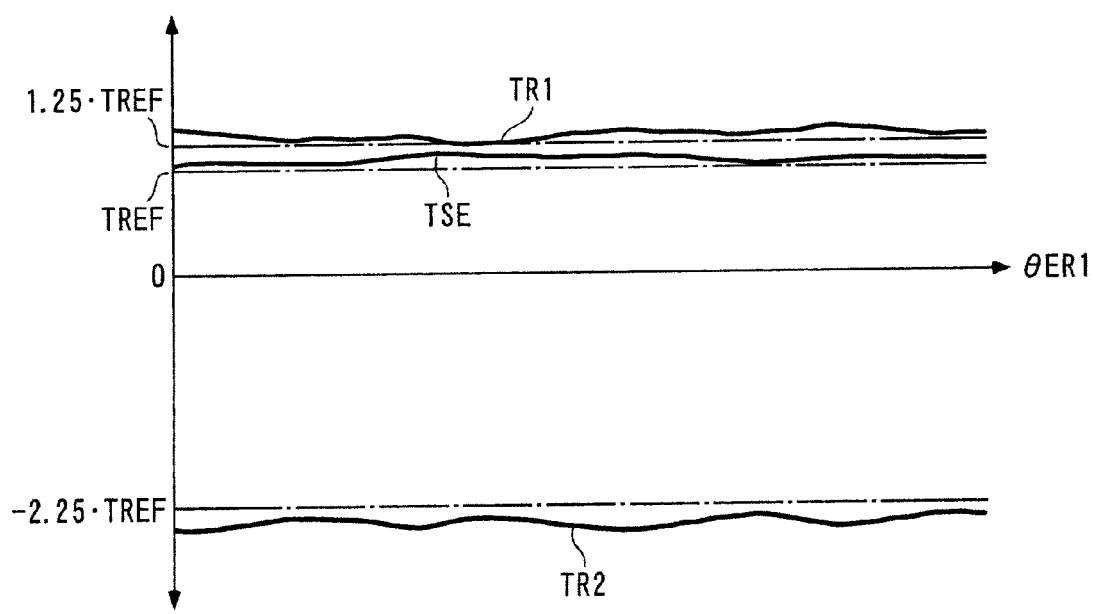
FIG. 15 is a diagram illustrating an example of changes in the driving equivalent torque, and the first and second rotor transmission torques in the case where the second rotor of the rotating machine in the present invention is held unrotatable.

FIGS. 14 and 15 show results of simulations of control in which the numbers of the armature magnetic poles, the cores 15a, and the permanent magnets 14a are set in the same manner as in the cases illustrated in FIGS. 12 and 13; the second rotor 15 is held unrotatable in place of the first rotor 14; and mechanical power is output from the first rotor 14 by supplying electric power to the stator 13. FIG. 14 shows an example of changes in the U-phase to W-phase counter-electromotive force voltages Vcu to Vcw during a time period over which the first rotor electrical angle θER1 changes from 0 to 2π.

In this case, due to the fact that the second rotor 15 is held unrotatable, and that the pole pair numbers of the armature magnetic poles and the magnet magnetic poles are equal to 8 and 10, respectively, and from the aforementioned equation (25), the relationship between the magnetic field electrical angular velocity ωMFR, and the first and second rotor electrical angular velocities ωER1 and ωER2 is expressed by ωMFR=−1.25·ER1. As shown in FIG. 14, during a time period over which the first rotor electrical angle θER1 changes from 0 to 2π, the U-phase to W-phase counter-electromotive force voltages Vcu to Vcw are generated over approximately 1.25 repetition periods thereof. Further, FIG. 14 shows changes in the U-phase to W-phase counter-electromotive force voltages Vcu to Vcw change, as viewed from the first rotor 14. As shown in FIG. 14, with the first rotor electrical angle θER1 as the horizontal axis, the counter-electromotive force voltages are arranged in the order of the U-phase counter-electromotive force voltage Vcu, the V-phase counter-electromotive force voltage Vcv, and the W-phase counter-electromotive force voltage Vcw. This represents that the first rotor 14 rotates in the direction opposite to the magnetic field rotation direction. The simulation results described above with reference to FIG. 14 agree with the relationship of ωMFR=−1.25·ωER1, based on the aforementioned equation (25).

Further, FIG. 15 shows an example of changes in the driving equivalent torque TSE, and the first and second rotor transmission torques TR1 and TR2. Also in this case, similarly to the FIG. 13 case, the relationship between the driving equivalent torque TSE, and the first and second rotor transmission torques TR1 and TR2 is represented by TSE=TR1/1.25=−TR2/2.25 from the aforementioned equation (32). As shown in FIG. 15, the driving equivalent torque TSE is approximately equal to TREF; the first rotor transmission torque TR1 is approximately equal to 1.25·TREF; and the second rotor transmission torque TR2 is approximately equal to −2.25·TREF. The simulation results described above with reference to FIG. 15 agree with the relationship of TSE=TR1/1.25=−TR2/2.25, based on the aforementioned equation (32)

As described above, in the rotating machine 11, when the rotating magnetic field is generated by supplying electric power to the stator 13, the aforementioned magnetic force lines ML are generated in a manner connecting between the magnet magnetic poles, the cores 15a and the armature magnetic poles, and the action of the magnetism of the magnetic force lines ML converts the electric power supplied to the stator 13 to mechanical power, and the mechanical power is output from the first rotor 14 or the second rotor 15. In this case, the relationship as expressed by the aforementioned equation (40) holds between the magnetic field electrical angular velocity ωMFR, and the first and second electrical angular velocities ωER1 and ωER2, and the relationship as expressed by the aforementioned equation (41) holds between the driving equivalent torque TSE, and the first and second rotor transmission torques TR1 and TR2.

Therefore, by supplying mechanical power to at least one of the first and second rotors 14 and 15, without electric power being supplied to the stator 13, the at least one rotor is caused to rotate with respect to the stator 13. This causes electric power to be generated by the stator, and generates a rotating magnetic field. In this case as well, magnetic force lines ML are generated in a manner connecting between the magnet magnetic poles, the soft magnetic material elements, and the armature magnetic poles, and the action of magnetism of the magnetic force lines ML causes the relationship of the electrical angular velocities shown in the equation (40) and the relationship of the torques shown in the equation (41) to hold.

That is, assuming the a torque equivalent to the generated electric power and the magnetic field electrical angular velocity ωMFR is the electric power-generating equivalent torque TGE, there holds the relationship expressed by the equation (41) between this electric power-generating equivalent torque TGE, and the first and second rotor transmission torques TR1 and TR2. As is clear from the above, the rotating machine 11 has the same functions as those of an apparatus formed by combining a planetary gear unit and a general one-rotor-type rotating machine.

Figure 32:
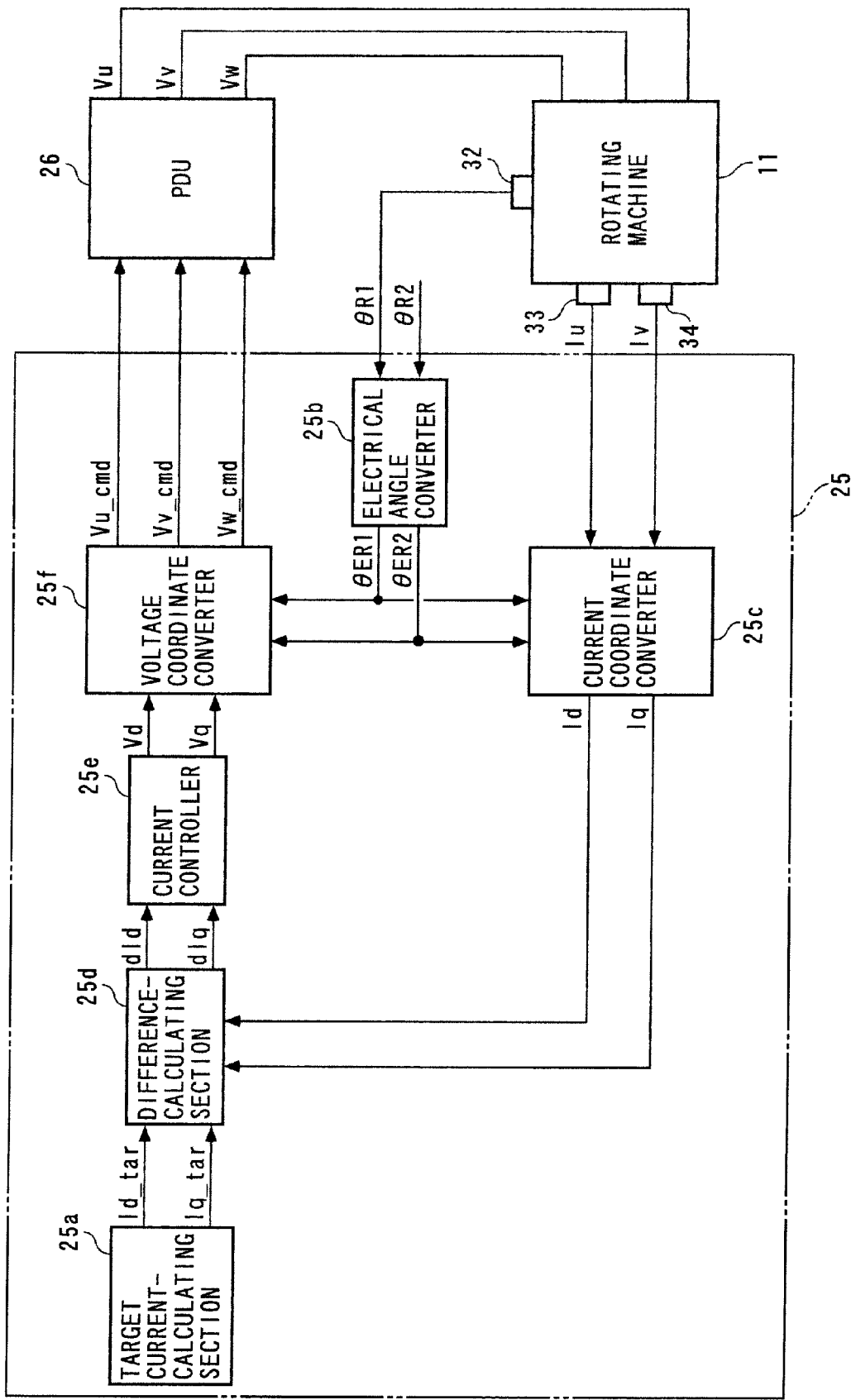

Further, the rotating machine 11 is provided with a rotational angle sensor 32 (relative rotational angle positional relation-detecting means) of an electromagnetic induction type, and the rotational angle sensor 32 detects the aforementioned first rotor rotational angle θR1, and delivers a signal indicative of the detected first rotor rotational angle θR1 to the ECU 25. Further, as shown in FIG. 32, the rotating machine 11 is provided with a first electric current sensor 32 and a second electric current sensor 34. The first and second electric current sensors 33 and 34 deliver respective signals indicative of the aforementioned U-phase current Iu and V-phase current Iv to the ECU 25.

The ECU 25 is implemented by a microcomputer comprised of an I/O interface, a CPU, a RAM and a ROM. Further, since the second rotor 15 is directly connected to the crankshaft 3a, the ECU 25 calculates the aforementioned second rotor rotational angle θR2 based on the detected crank angle position, and since the first rotor 14 is connected to the input shaft 4a of the compressor 4, the ECU 25 calculates the rotational speed of the input shaft 4a of the compressor (hereinafter referred to as "the compressor rotational speed NA") based on the detected first rotor rotational angle θR1.

The ECU 25 controls the rotating magnetic field according to the first and second rotor rotational angles θR1 and θR2 based on the aforementioned equation (39) to thereby control the rotating machine 11. More specifically, as shown in FIG. 32, the ECU 25 includes a target current-calculating section 25a, an electrical angle converter 25b (relative rotational angle positional relation-detecting means), a current coordinate converter 25c, a difference-calculating section 25d, a current controller 25e, and a voltage coordinate converter 25f. The above-described control of the rotating magnetic field is carried out by controlling the currents Iu, Iv, and Iw of the U-phase to W-phase, by so-called vector control.

The target current-calculating section 25a calculates respective target values of d-axis current Id and q-axis current Iq (hereinafter referred to as "the target d-axis current Id_tar" and "the target q-axis current Iq_tar"), referred to hereinafter, and delivers the calculated target d-axis current Id_tar and target q-axis current Iq_tar to the difference-calculating section 25d. It should be noted that these target d-axis current Id_tar and target q-axis current Iq_tar are calculated according to load on the compressor 4 acting on the first rotor 14 or the like.

The detected (calculated) first and second rotor rotational angles θR1 and θR2 are input to the electrical angle converter 25b. The electrical angle converter 25b calculates the first and second rotor electrical angles θER1 and θER2 by multiplying the input first and second rotor rotational angles θR1 and θR2 by the pole pair number (value of 2) of the armature magnetic poles, and delivers the calculated first and second rotor electrical angles θER1 and θER2 to the current coordinate converter 25c and the voltage coordinate converter 25f.

In addition to the first and second rotor electrical angles θER1 and θER2, the detected U-phase and V-phase currents Iu and Iv are input to the current coordinate converter 25c. The current coordinate converter 25c converts the present U-phase to W-phase currents Iu to Iw on a three-phase AC coordinate system to the d-axis current Id and the q-axis current Iq on a dq coordinate system, based on the input U-phase and V-phase currents Iu and Iv, and the first and second rotor electrical angles θER1 and θER2. The dq coordinate system rotates at (3·ωER2−2·ωER1), with (3·θER2−2·θER1) as the d axis, and an axis orthogonal to the d axis as the q axis. More specifically, the d-axis current Id and the q-axis current Iq are calculated by the following equation (42). Further, the current coordinate converter 25c delivers the calculated d-axis current Id and q-axis current Iq to the difference calculating-section 25d.

$$\begin{bmatrix} Id \\ Iq \end{bmatrix} = \sqrt{\frac{2}{3}} \begin{bmatrix} \cos(3\cdot\theta ER2 - 2\cdot\theta ER1) & \cos\left(3\cdot\theta ER2 - 2\cdot\theta ER1 - \frac{2}{3}\pi\right) & \cos\left(3\cdot\theta ER2 - 2\cdot\theta ER1 + \frac{2}{3}\pi\right) \\ -\sin(3\cdot\theta ER2 - 2\cdot\theta ER1) & -\sin\left(3\cdot\theta ER2 - 2\cdot\theta ER1 - \frac{2}{3}\pi\right) & -\sin\left(3\cdot\theta ER2 - 2\cdot\theta ER1 + \frac{2}{3}\pi\right) \end{bmatrix} \begin{bmatrix} Iu \\ Iv \\ Iw \end{bmatrix} \quad (42)$$

The difference-calculating section 25d calculates the difference between the input target d-axis current Id_tar and d-axis current Id (hereinafter referred to as "the d-axis current difference dId"), and calculates the difference between the input target q-axis current Iq_tar and q-axis current Iq (hereinafter referred to as "the q-axis current difference dIq"). Further, the difference calculating-section 25d delivers the calculated d-axis current difference dId and q-axis current difference dIq to the current controller 25e.

The current controller 25e calculates a d-axis voltage Vd and a q-axis voltage Vq based on the input d-axis current difference dId and q-axis current difference dIq with a predetermined feedback control algorithm, e.g. a PI control algorithm. This causes the d-axis voltage Vd to be calculated such that the d-axis current Id becomes equal to the target d-axis current Id_tar, and the q-axis voltage Vq to be calculated such that the q-axis current Iq becomes equal to the target q-axis current Iq_tar. Further, the current controller 25e delivers the calculated d-axis and q-axis voltages Vd and Vq to the voltage coordinate converter 25f.

The voltage coordinate converter 25f converts the input d-axis voltage Vd and q-axis voltage Vq to command values (hereinafter referred to as "the U-phase voltage command value Vu_cmd", "the V-phase voltage command value Vv_cmd", and "the W-phase voltage command value Vw_cmd") of the U-phase to W-phase voltages Vu, Vv, and Vw on the three-phase AC coordinate system, based on the input first and second rotor electrical angles θER1 and θER2. More specifically, the U-phase to W-phase voltage command values Vu_cmd to Vw_cmd are calculated by the following equation (43). Further, the voltage coordinate converter 25f delivers the calculated U-phase to W-phase voltage command values Vu_cmd to Vw_cmd to the aforementioned PDU 26.

$$\begin{bmatrix} Vu\_cmd \\ Vv\_cmd \\ Vw\_cmd \end{bmatrix} = \sqrt{\frac{2}{3}} \begin{bmatrix} \cos(3 \cdot \theta ER2 - 2 \cdot \theta ER1) & -\sin(3 \cdot \theta ER2 - 2 \cdot \theta ER1) \\ \cos\left(3 \cdot \theta ER2 - 2 \cdot \theta ER1 - \frac{2}{3}\pi\right) & -\sin\left(3 \cdot \theta ER2 - 2 \cdot \theta ER1 - \frac{2}{3}\pi\right) \\ \cos\left(3 \cdot \theta ER2 - 2 \cdot \theta ER1 + \frac{2}{3}\pi\right) & -\sin\left(3 \cdot \theta ER2 - 2 \cdot \theta ER1 + \frac{2}{3}\pi\right) \end{bmatrix} \begin{bmatrix} Vd \\ Vq \end{bmatrix} \quad (43)$$

In accordance therewith, the PDU 26 applies the U-phase to W-phase voltages Vu to Vw to the rotating machine 11 such that the U-phase to W-phase voltages Vu to Vw become equal to the respective U-phase to W-phase voltage command values Vu_cmd to Vw_cmd, respectively, whereby the U-phase to W-phase currents Iu to Iw are controlled. In this case, these currents Iu to Iw are represented by the aforementioned equations (36) to (38), respectively. Further, the amplitude I of electric current is determined based on the target d-axis current Id_tar and the target q-axis current Iq_tar.

By the above-described control by the ECU 25, the magnetic field electrical angular position θMFR is controlled such that the aforementioned equation (39) holds, and the magnetic field electrical angular velocity ωMFR is controlled such that the aforementioned equation (40) holds.

The accessory drive system 1 constructed as described above has, as operative modes thereof, an ENG stoppage mode in which the compressor 4 is driven when the engine is at rest and an ENG operation mode in which the compressor 4 is driven when the engine 3 is in operation. Hereinafter, a description will be sequentially given of the operative modes, starting with the ENG stoppage mode.

ENG Stoppage Mode

Figure 16:
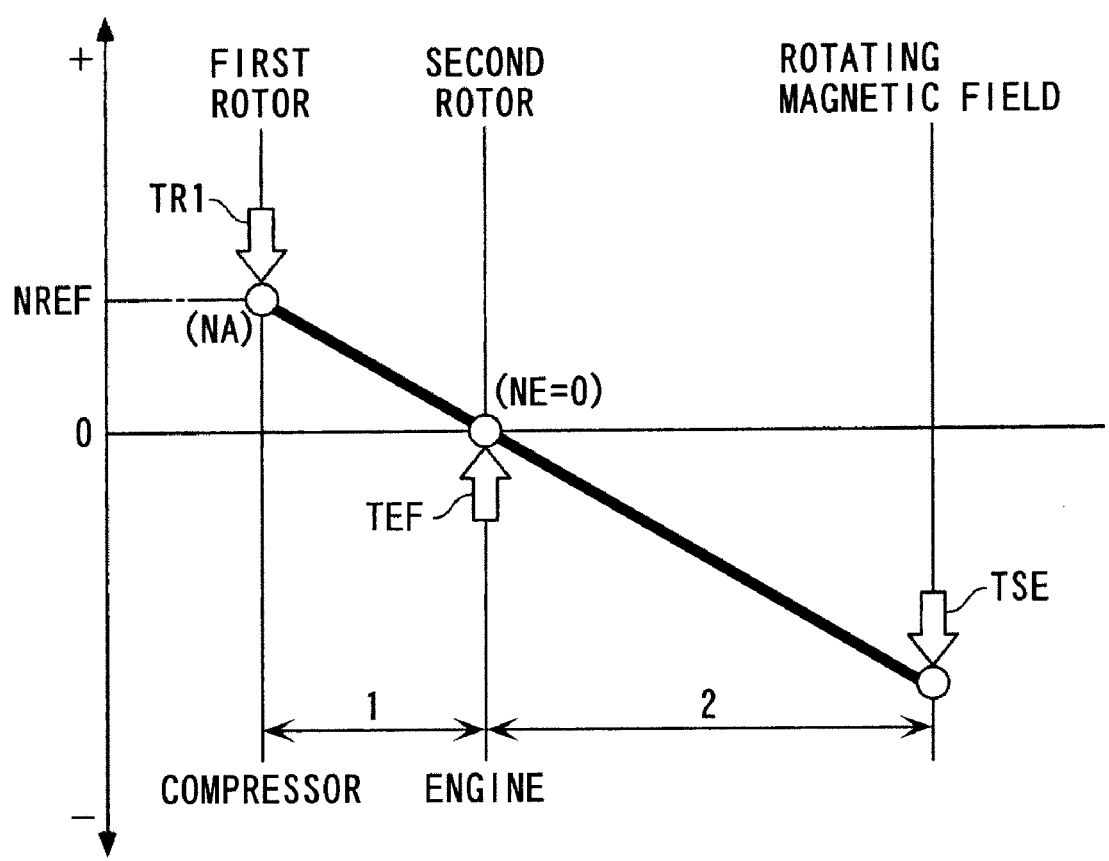
FIG. 16 is a velocity nomograph illustrating an example of a relationship between respective rotational speeds of rotating elements of the accessory drive system shown in FIG. 1, together with an example of a relationship between respective torques of the rotating elements, when the accessory drive system is in an ENG stoppage mode.

FIG. 16 illustrates an example of a relationship between respective rotational speeds of rotating elements, together with an example of a relationship between respective torques of the rotating elements, in the ENG stoppage mode. As mentioned hereinbefore, the second rotor 15 is directly connected to the crankshaft 3a, and hence the rotational speed of the second rotor 15 and the engine speed NE are equal to each other. Further, the first rotor 14 is connected to the input shaft 4a of the compressor 4 via the rotating shaft 16, the output pulley 22, the belt 23, and the input pulley 21, and hence assuming that a change in speed by the pulleys 22 and 21 is ignored, the rotational speed of the first rotor 14 and the compressor rotational speed NA are equal to each other. From these facts and the above-described functions of the rotating machine 11, a relationship between the respective rotational speeds of the rotating magnetic field, and the first and second rotors 14 and 15, and a relationship between the engine speed NE and the compressor rotational speed NA, in the ENG stoppage mode, can be illustrated e.g. as shown in FIG. 16.

It should be noted that in FIG. 16, similarly to FIG. 4, the distance between a white circle of each vertical line intersecting with a horizontal line indicative of a value of 0 the horizontal line corresponds to the rotational speed of a rotating element denoted at one end of the vertical line. For convenience's sake, symbols indicative of the engine speed NE and the compressor rotational speed NA are denoted close to the white circles associated therewith. Further, in FIG. 16. the direction of normal rotation and the direction of reverse rotation are represented by "+" and "−". These also apply to other nomographs, referred to hereinafter.

During the ENG stoppage mode, friction (hereinafter referred to as "engine friction TEF") of the engine 3 acts on the second rotor 15, and the engine friction TEF is much larger than a torque required for driving the compressor 4. In such a state, the ECU 25 controls the PDU 26 to thereby supply electric power to the stator 13 to cause reverse rotation of the rotating magnetic field. The driving equivalent torque TSE thus generated in accordance with the supply of electric power to the stator 13 is transmitted to the first rotor 14 using the engine friction TEF acting on the second rotor 15 as a reaction force, thereby acting on the first rotor 14 such that the first rotor 14 is normally rotated (see FIG. 16). Further, the first rotor transmission torque TR1 transmitted to the first rotor 14 is transmitted to the compressor 4 via the rotating shaft 16, the output pulley 22, the belt 23, and the input pulley 21, whereby the input shaft 4a of the compressor 4 is eventually caused to perform normal rotation. In this case, the engine speed NE is equal to 0, and the electric power supplied to the stator 13 is all transmitted to the compressor 4 as mechanical power.

Further, as shown in FIG. 16, in the ENG stoppage mode, the rotational speed of the rotating magnetic field is controlled based on the aforementioned equation (40) and the first and second rotor rotational angles θR1 and θR2, whereby the compressor rotational speed NA is held at a predetermined value NREF suitable for the operation of the compressor 4. As described above, during the ENG stoppage mode, the compressor 4 is driven using the rotating machine 11 alone as the drive source.

ENG Operation Mode

Figure 17A:
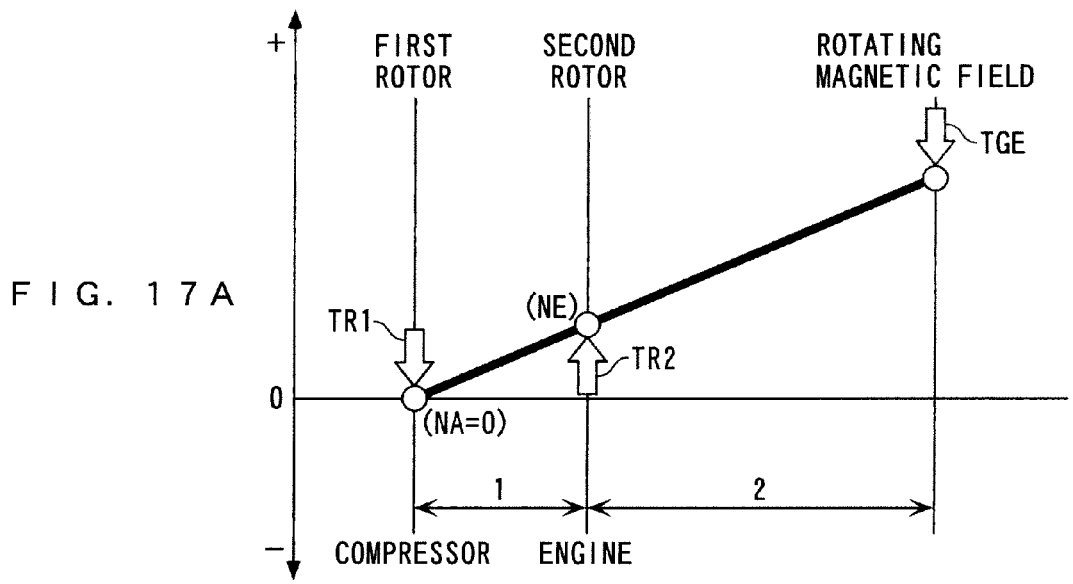
FIG. 17A is a velocity nomograph illustrating an example of a relationship between the respective rotational speeds of the rotating elements of the accessory drive system shown in FIG. 1, together with an example of a relationship between the respective torques of the rotating elements, at the start of an ENG operation mode of the accessory drive system.

In the ENG operation mode, basically, using part of mechanical power transmitted from the crankshaft 3a to the second rotor 15, electric power is generated by the stator 13. FIG. 17A illustrate a relationship between the respective rotational speeds of the rotating elements, together with an example of a relationship between the respective torques of the rotating elements, at the start of the ENG operation mode. As shown in FIG. 17A, at the start of the ENG operation mode, while the second rotor 15 performs normal rotation together with the crankshaft 3a, the first rotor 14 is at rest, and hence the rotational direction of the rotating magnetic field determined by the respective rotational speeds of the first and second rotors 14 and 15 is the direction of normal rotation.

Figure 17B:
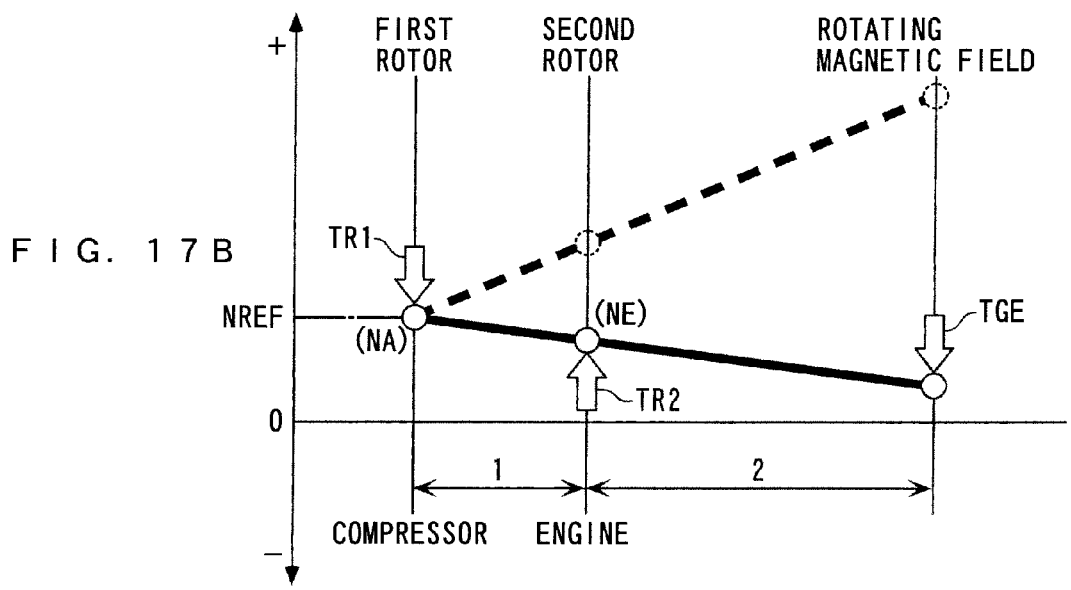
FIG. 17B is a velocity nomograph illustrating an example of a relationship between the respective rotational speeds of the rotating elements of the accessory drive system shown in FIG. 1, together with an example of a relationship between the respective torques of the rotating elements, when the accessory drive system is in the ENG operation mode.

Therefore, the second rotor transmission torque TR2 transmitted from the engine 3 to the second rotor 15 is transmitted to the compressor 4 via the first rotor 14, using the electric power-generating equivalent torque TGE as a reaction force, whereby the compressor 4 is driven (see FIGS. 17A and 17B). In other words, part of the mechanical power transmitted from the engine 3 to the second rotor 15 is distributed as electric power to the stator 13 and the remainder of the same is distributed to the compressor 4 via the first rotor 14. Further, by reducing mechanical power from the engine 3 distributed as electric power to the stator 13 by lowering the rotational speed of the rotating magnetic field performing normal rotation, mechanical power from the engine distributed to the compressor 4 via the first rotor 14 is increased. As a consequence, as shown in FIG. 17B, the compressor rotational speed NA rises from 0 shown in FIG. 17A.

As described above, during the ENG operation mode, the engine 3 is used as the drive source of the compressor 4, and the rotating machine 11 functions as a transmission mechanism that transmits mechanical power from the engine 3 to the compressor 4. Further, electric power generated by the stator 13 as described above is charged into the battery 27, whereby when the accessory drive system 1 enters the ENG stoppage mode next time, the compressor 4 can be driven using the electric power charged in the battery 27.

Further, as shown in FIG. 17B, during the ENG operation mode, similarly to the ENG stoppage mode, the rotational speed of the rotating magnetic field is controlled based on the aforementioned equation (40) and the first and second rotor rotational angles θR1 and θR2, whereby the compressor rotational speed NA is held at the predetermined value NREF suitable for the operation of the compressor 4. In this case, as is apparent from a solid line and a broke line in a velocity nomograph shown in FIG. 17B, irrespective of whether the engine speed NE is high or low, the compressor rotational speed NA is held at the predetermined value NREF suitable for the operation of the compressor 4.

As shown in FIG. 18, during the ENG operation mode, when the engine speed NE is very low, as indicated by the broke line in FIG. 18, even when the rotational speed of the rotating magnetic field generated according to the electric power generation is controlled, it is sometimes impossible to increase the compressor rotational speed NA to the predetermined value NREF. In such a case, by supplying electric power to the stator 13, the rotating magnetic field is inversely rotated. This causes the second rotor transmission torque TR2 transmitted from the engine 3 to the second rotor 15 to be transmitted to the compressor 4 via the first rotor 14 using the driving equivalent torque TSE as a reaction force, whereby the compressor 4 is driven. Further, by controlling the rotational speed of the rotating magnetic field that performs reverse rotation, as indicated by the solid line in FIG. 18, the compressor rotational speed NA is caused to rise to the predetermined value NREF and be held thereat.

Further, during the ENG operation mode, when stopping the compressor 4, it is only required that the rotational speed of the first rotor 14 becomes equal to 0, and hence as is clear from the above equation (40), the rotational speed of the rotating magnetic field is controlled such that it becomes three times as large as the engine speed NE. Further, the electric power-generating equivalent torque TGE is controlled to become equal to ½ of a torque equivalent value of the friction of the compressor 4 that acts on the first rotor 14. This controls the rotational speed of the first rotor 14 to 0 to thereby cause the compressor 4 to stop, and convert approximately 100% of the mechanical power of the engine 3 inputted to the rotating machine 11 to electric power.

As described above, according to the present embodiment, in the rotating machine 11, the ratio (hereinafter referred to as "the pole pair number ratio α" of the number of pole pairs of magnet magnetic poles of the permanent magnets 14a to the number of pole pairs of armature magnetic poles is set to 2.0. With this, as is clear from the aforementioned equation (41), to drive the compressor 4, it is only required to control the driving equivalent torque TSE and the electric power-generating equivalent torque TGE to ½ of a torque transmitted to the compressor 4 via the first rotor 14. On the other hand, to drive the compressor using the conventional accessory drive system described hereinbefore, since the ratio between the driving equivalent torque (the electric power-generating equivalent torque), the torque transmitted to the first rotor, and the torque transmitted to the second rotor is 1:1:2, it is required to control the driving equivalent torque (the electric power-generating equivalent torque) to the same magnitude as that of the torque transmitted to the compressor 4 via the first rotor. As described above, compared with the conventional case, the driving equivalent torque TSE and the electric power-generating equivalent torque TGE can be reduced, and hence the size of the stator 13 can be reduced, which in turn makes it possible to reduce the size and manufacturing costs of the accessory drive system 1.

Further, differently from the conventional case, it is possible to operate the rotating machine 11 using a single row of soft magnetic material elements formed by the cores 15a, and drive the compressor 4. This makes it possible to simplify the construction of the rotating machine 11, which in turn makes it possible to simplify the construction of the accessory drive system 1, and further reduce the manufacturing costs thereof.

Further, the first and second rotor electrical angles θER1 and θER2 are calculated, and according to the calculated rotor electrical angles θER1 and θER2, the magnetic field electrical angular position θMFR of the rotating magnetic field is controlled such that the aforementioned equation (39) holds. This makes it possible to ensure the proper operation of the rotating machine 11, which in turn makes it possible to ensure the proper operation of the accessory drive system 1.

Figure 19:
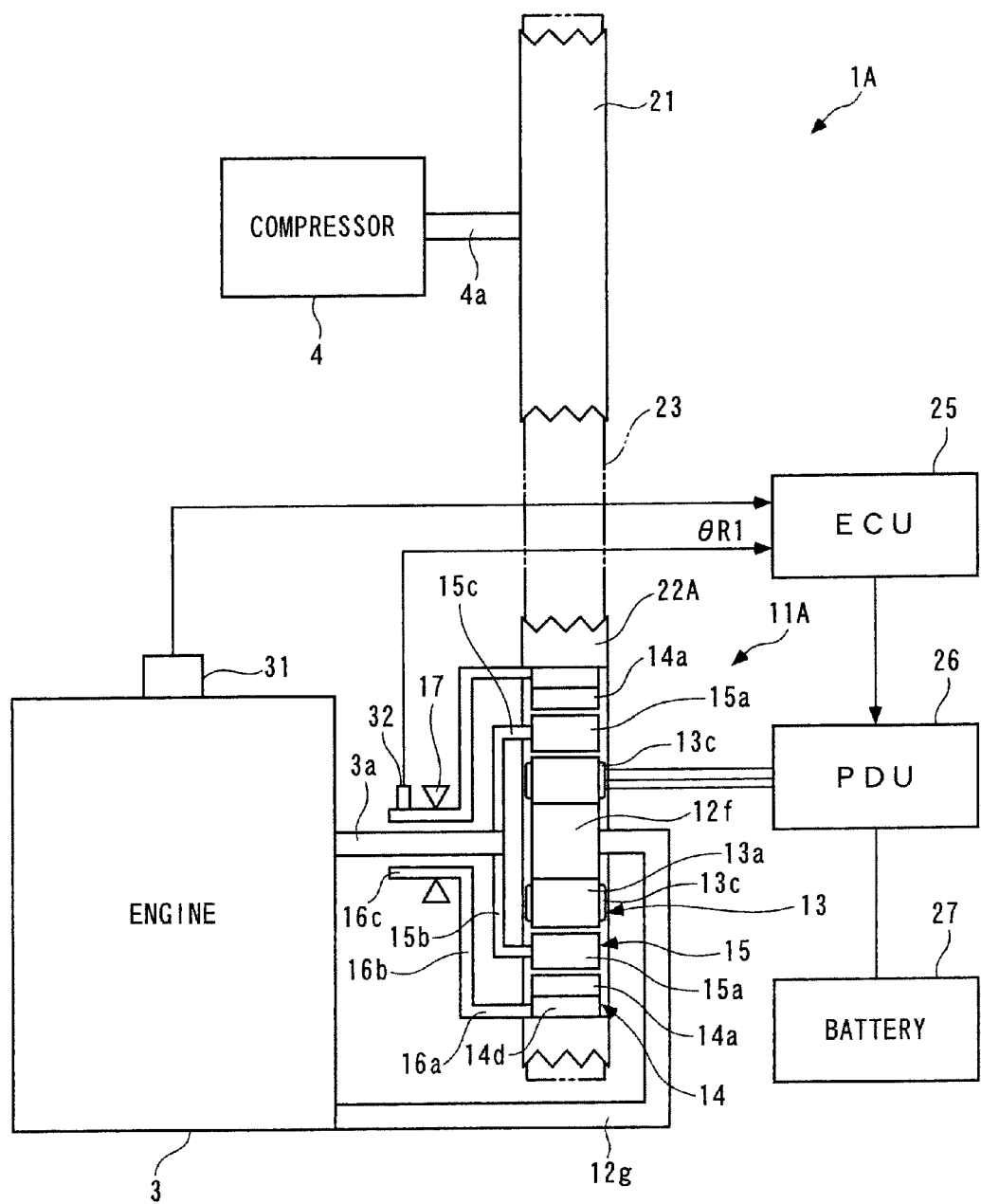
FIG. 19 is a diagram schematically showing an accessory drive system according to a second embodiment of the present invention together with an engine and a compressor.

Next, an accessory drive system 1A according to a second embodiment of the present invention will be described with reference to FIG. 19. The accessory drive system 1A is distinguished from the above-described accessory drive system 1 according to the first embodiment mainly in the construction of the rotating machine 11A. As distinct from the rotating machine 11, the rotating machine 11A has the stator 13, the second rotor 15, and the first rotor 14 arranged from inside to outside in a radial direction (hereinafter simply referred to as "radially" or "in the radial direction") of a mounting portion 12f, referred to hereinafter. In FIG. 19, out of component elements of the accessory drive system 1A, the same components as those of the first embodiment are denoted by the same reference numerals. This also applies to figures illustrating other embodiments, described hereinafter. The following description will be given mainly of different points from the first embodiment.

The iron core 13a of the stator 13 is attached to the outer peripheral surface of the mounting portion 12f, which has a hollow cylindrical shape, and the mounting portion 12f is fixed to the engine 3 via a connecting portion 12g. This makes immovable the stator 13 including the iron core 13a. Further, slots are formed in the outer peripheral surface of the iron core 13a.

Further, the permanent magnets 14a of the first rotor 14 are attached to the inner peripheral surface of a mounting portion 14d having an annular shape, and the mounting portion 14d has an outer peripheral surface integrally attached to the inner peripheral surface of an output pulley 22A having an annular shape. Around the output pulley 22A, the belt 23 extends. Further, the mounting portion 14d is integrally attached to one end of a first connecting portion 16a having a hollow cylindrical shape, and the other end of the first connecting portion 16a is attached to a hollow rotating shaft 16c via a second connecting portion 16b in the form of an annular plate. The rotating shaft 16c is rotatably supported by a bearing 17, and the crankshaft 3a is rotatably coaxially fitted therein. This makes the first rotor 14 including the permanent magnets 14a rotatable in unison with the output pulley 22A, and the first rotor 14 is connected to the compressor 4 via the output pulley 22A, the belt 23, and the input pulley 21. It should be noted that the slots of the iron core 13a, the permanent magnets 14a, and the cores 15a of the second rotor 15 are arranged along the circumference of the mounting portion 12f at respective same space intervals, and the numbers of these are set to the same as in the first embodiment, respectively.

The accessory drive system 1A constructed as above operates in the ENG stoppage mode and the ENG operation mode in the same manner as in the first embodiment. In this case, the control of the rotating machine 11A is performed as described with reference to FIG. 32. From the above, according to the second embodiment, it is possible to obtain the same advantageous effects as described hereinabove that are provided by the first embodiment. Further, although in the first embodiment, the output pulley 22 is provided separately from the rotating machine 11 and associated components, in the second embodiment, the first rotor 14, the second rotor 15 and the stator 13 are provided within the output pulley 22A, which makes it unnecessary to further reduce the size of the accessory drive system 1A.

Figure 20:
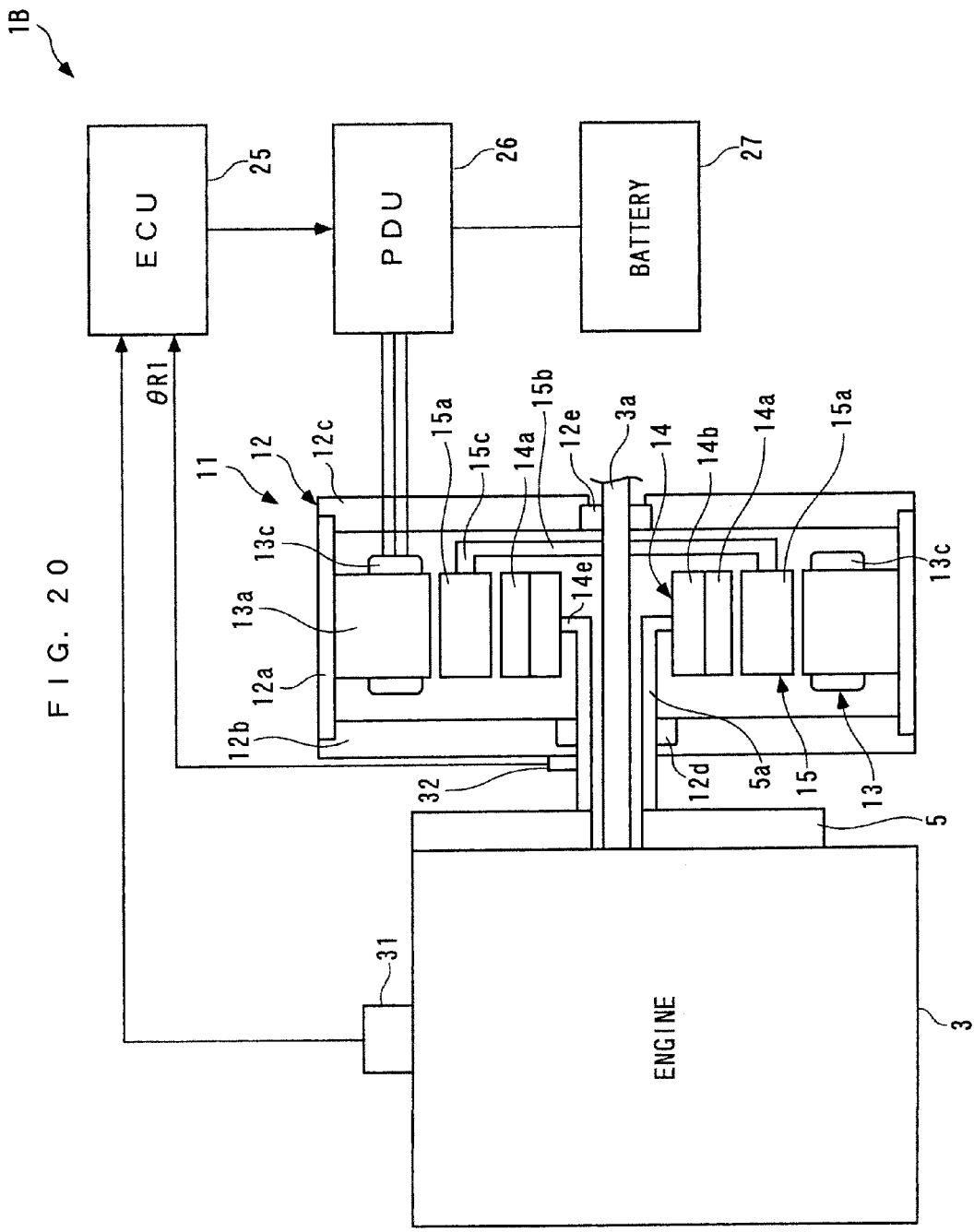
FIG. 20 is a diagram schematically showing an accessory drive system according to a third embodiment of the present invention together with an engine and an oil pump.

Next, an accessory drive system 1B according to a third embodiment of the present invention will be described with reference to FIG. 20. As shown in FIG. 20, the accessory drive system 1B is distinguished from the above-described accessory drive system 1 according to the first embodiment mainly in that the rotating machine 11 is directly connected to an oil pump, as an accessory, without using a pulley or a belt. More specifically, the mounting portion 14b of the first rotor 14 is directly connected to an input shaft 5a of the oil pump 5 via a connecting portion 14e in the form of an annular plate. This input shaft 5a is formed to be hollow, and is rotatably supported by a bearing 12d, and the crankshaft 3a is coaxially rotatably fitted therein.

Further, the accessory drive system 1B constructed as above operates in the ENG stoppage mode and the ENG operation mode in the same manner as in the first embodiment. In this case, the control of the rotating machine 11 is performed as described with reference to FIG. 32. However, the aforementioned target d-axis current Id_tar and target q-axis current Iq_tar are calculated according to load on the oil pump 5 acting on the first rotor 14 or the like. From the above, according to the third embodiment, it is possible to obtain the same advantageous effects as described hereinabove that are provided by the first embodiment. Further, compared with the first embodiment, in the third embodiment, the input pulley 21, the output pulley 22, and the belt 23 are omitted, and this makes it possible to further reduce the size and manufacturing costs of the accessory drive system 1B.

Figure 21:
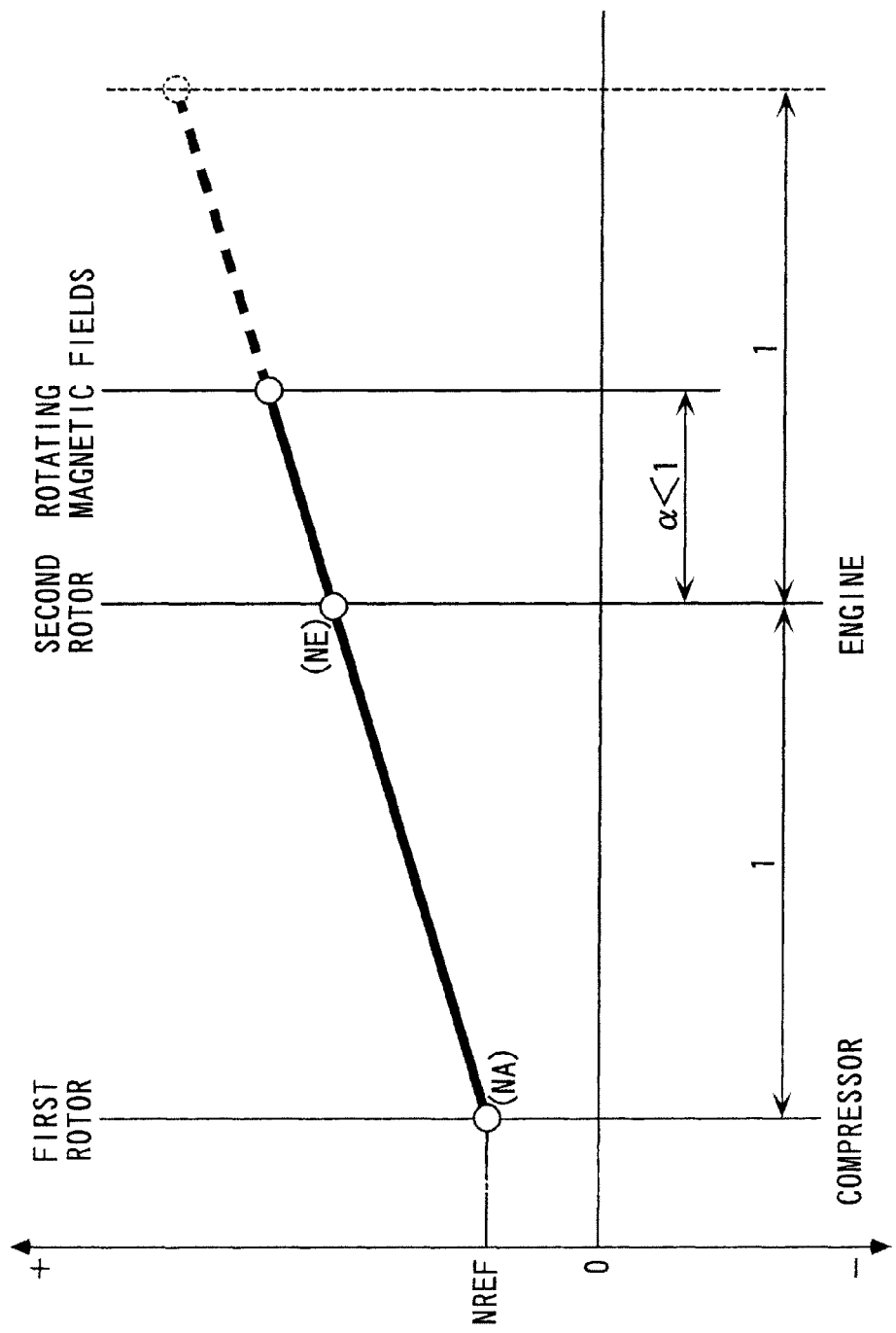
FIG. 21 is a velocity nomograph illustrating an example (solid line) of a relationship between respective rotational speeds of rotating elements of the accessory drive systems according to the first to third embodiments of the present invention) when a pole pair number ratio is set to a value less than 1, together with an conventional case (broken line)

It should be noted that although in the first to third embodiments, the aforementioned pole pair number ratio α is set to 2.0, if the pole pair number ratio α is set to less than 1.0, it is possible to obtain the following advantageous effects: A solid line in a velocity nomograph shown in FIG. 21 represents a relationship between the respective rotational speeds of rotating elements in this case, exhibited when the engine 3 is in operation, and at the same time the compressor 4 (oil pump 5) is being driven. Further, as describe above, in the conventional accessory drive system, the difference between the rotational speed of the first and second rotating magnetic fields and that of the second rotor and the difference between the rotational speed of the second rotor and that of the first rotor is equal to each other, and hence the rotational speed of the first and second rotating magnetic fields is represented by a broken line in the velocity nomograph shown in FIG. 21. It should be noted that in FIG. 21, the compressor 4 is denoted as a representative of the compressor 4 and the oil pump 5.

As indicated by a broken line in FIG. 21, when the rotational speed of the second rotor is higher than that of the first rotor due to the fact that the engine speed NE is relatively high, the rotational speed of the first and second rotating magnetic fields becomes higher than that of the second rotor, and is too high. In contrast, by setting the pole pair number ratio α to less than 1.0, as is apparent from a comparison between the broken line and the solid line in the velocity nomograph, it is possible to make the rotational speed of the rotating magnetic field lower than in the conventional case, and hence, it is possible to prevent the driving efficiency of the compressor 4 (oil pump 5) from being lowered due to too high a rotational speed of the rotating magnetic field.

Figure 22:
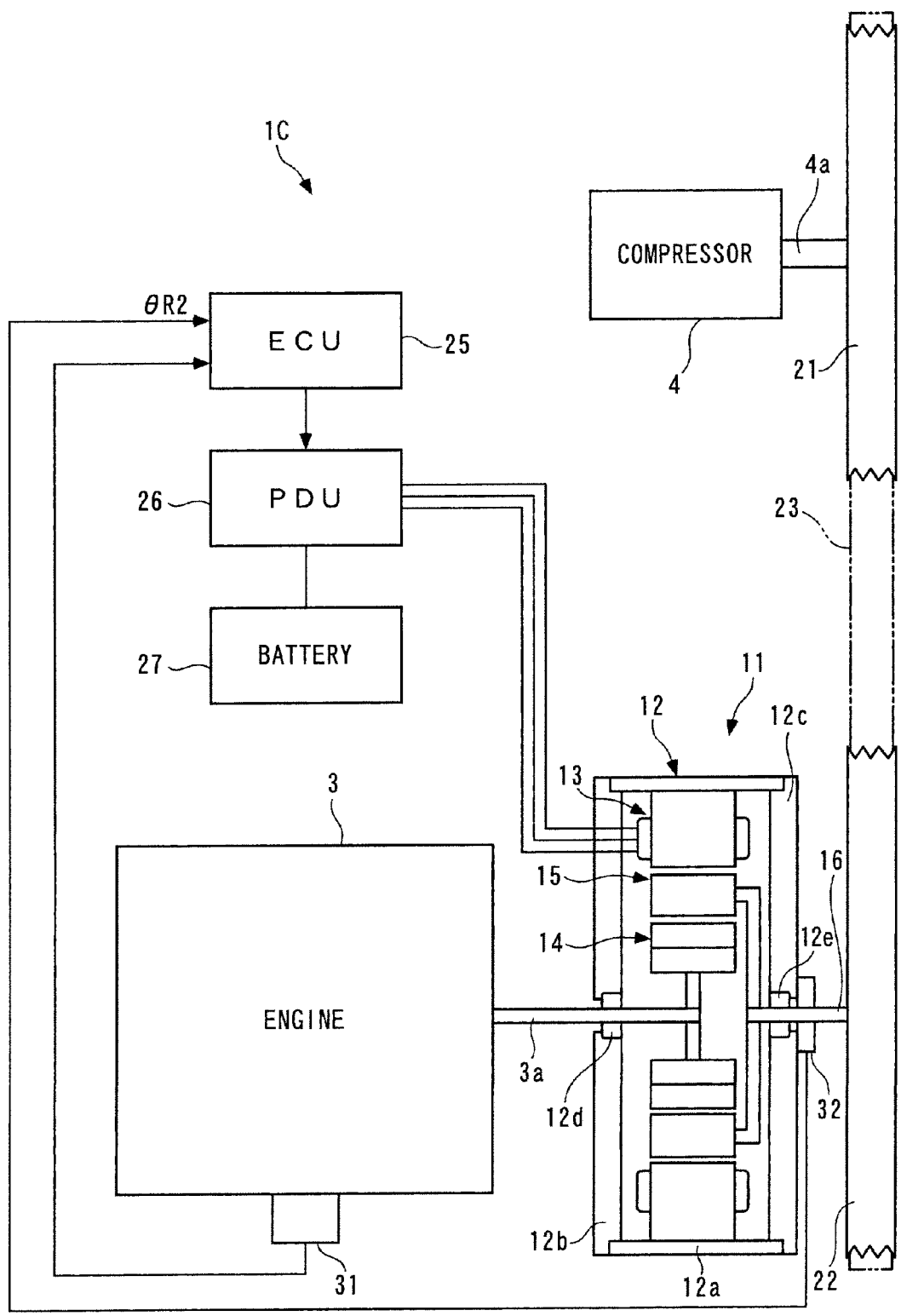
FIG. 22 is a diagram schematically showing an accessory drive system according to a fourth embodiment of the present invention together with an engine and a compressor.

Next, an accessory drive system 1C according to a fourth embodiment of the present invention will be described with reference to FIG. 22. The following description will be given mainly of different points of the accessory drive system 1C from the first embodiment. As shown in FIG. 22, the accessory drive system 1C is distinguished from the above-described accessory drive system 1 according to the first embodiment mainly in that the connection relationship between the first and second rotors 14 and 15, and the crankshaft 3a and the compressor 4 is opposite to that in the first embodiment. More specifically, the first rotor 14 is connected to the crankshaft 3a, and the second rotor 15 is connected to the input shaft 4a of the compressor 4 via the rotating shaft 16, the output pulley 22, the belt 23, and the input pulley 21. Further, differently from the first embodiment, the rotational angle sensor 32 detects not the first rotor rotational angle 74 R1 but the second rotor rotational angle θR2, and delivers a signal indicative of the detected second rotor rotational angle θR2 to the ECU 25.

Further, since the first rotor 14 is directly connected to the crankshaft 3a, the ECU 25 calculates the first rotor rotational angle θR1 based on the crank angle rotational position detected by the crank angle sensor 31, and since the second rotor 15 is connected to the input shaft 4a of the compressor 4, the ECU 25 calculates the compressor rotational speed NA based on the detected second rotor rotational angle θR2. Further, the ECU 25 controls the operation of the rotating machine 11 according to the first and second rotor rotational angle θR1 and θR2 and the compressor rotational speed NA. Further, due to the difference in construction from the first embodiment, the ENG stoppage mode and the ENG operation mode of the accessory drive system 1C are different from those of the first embodiment. Now, a description will be sequentially given of these operative modes, starting with the ENG stoppage mode.

ENG Stoppage Mode

Figure 23:
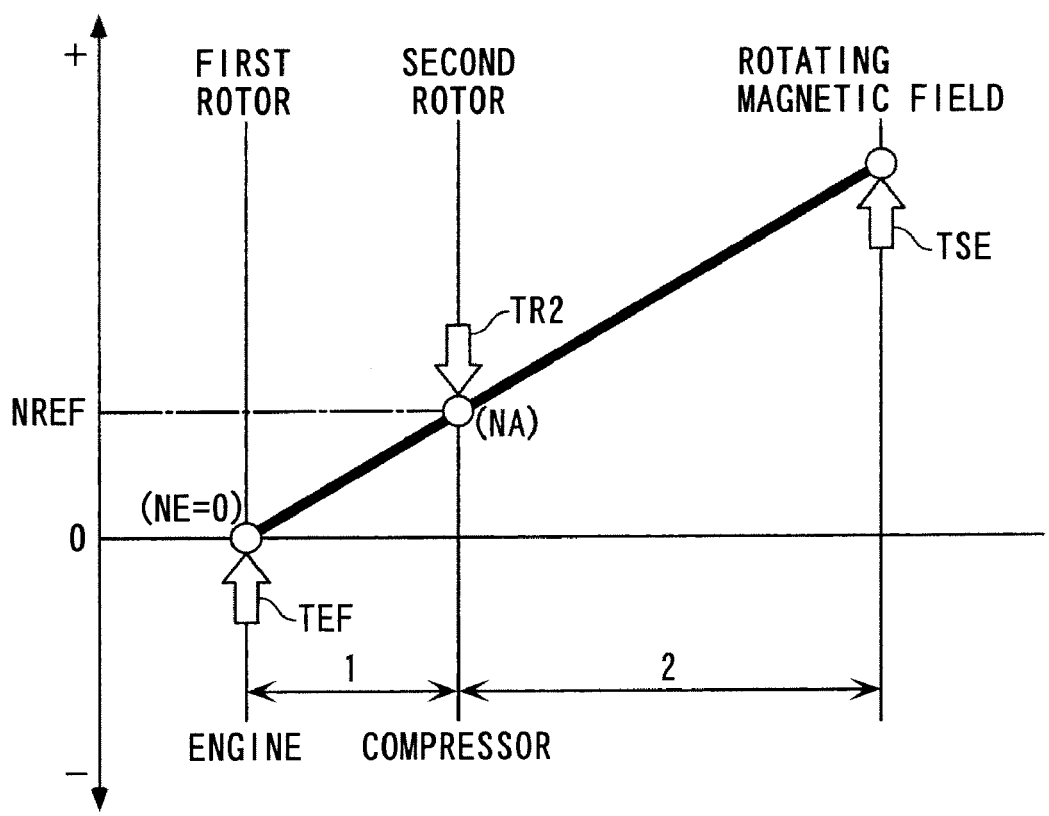
FIG. 23 is a velocity nomograph illustrating an example of a relationship between respective rotational speeds of rotating elements of the accessory drive system shown in FIG. 22, together with an example of a relationship between respective torques of the rotating elements, when the accessory drive system is in an ENG stoppage mode.

FIG. 23 is a velocity nomograph illustrating an example of a relationship between respective rotational speeds of rotating elements, together with an example of a relationship between respective torques of the rotating elements, in the ENG stoppage mode. As mentioned hereinabove, since the first rotor 14 is directly connected to the crankshaft 3a, the rotational speed of the first rotor 14 and the engine speed NE are equal to each other. Further, since the second rotor 15 is connected to the input shaft 4a of the compressor 4 via the rotating shaft 16, the output pulley 22, the belt 23, and the input pulley 21, assuming that a change in speed by the pulleys 22 and 21 is ignored, the rotational speed of the second rotor 15 and the compressor rotational speed NA are equal to each other. From these facts and the above-described functions of the rotating machine 11, a relationship between the respective rotational speeds of the rotating magnetic field, and the first and second rotors 14 and 15, and a relationship between the engine speed NE and the compressor rotational speed NA, in the ENG stoppage mode, can be illustrated e.g. as shown in FIG. 23.

During the ENG stoppage mode, the engine friction TEF acts on the first rotor 14, and the engine friction TEF is much larger than a torque required for driving the compressor 4. In such a state, the ECU 25 controls the PDU 26 such that electric power is supplied to the stator 13 to cause normal rotation of the rotating magnetic field. The driving equivalent torque TSE thus generated in accordance with the supply of electric power to the stator 13 is transmitted to the second rotor 15 using the engine friction TEF acting on the first rotor 14 as a reaction force, thereby acting on the second rotor 15 such that the second rotor 15 is normally rotated. Further, the second rotor transmission torque TR2 transmitted to the second rotor 15 is transmitted to the compressor 4 via the rotating shaft 16 etc., whereby the input shaft 4a of the compressor 4 is eventually caused to perform normal rotation. In this case, the engine speed NE is equal to 0, and the electric power supplied to the stator 13 is all transmitted to the compressor 4 as mechanical power.

Further, as shown in FIG. 23, in the ENG stoppage mode, the rotational speed of the rotating magnetic field is controlled based on the aforementioned equation (40) and the first and second rotor rotational angles $\theta R1$ and $\theta R2$, whereby the compressor rotational speed NA is held at a predetermined value NREF suitable for the operation of the compressor 4. As described above, during the ENG stoppage mode, the compressor 4 is driven using the rotating machine 11 alone as the drive source.

ENG Operation Mode

Figure 24A:
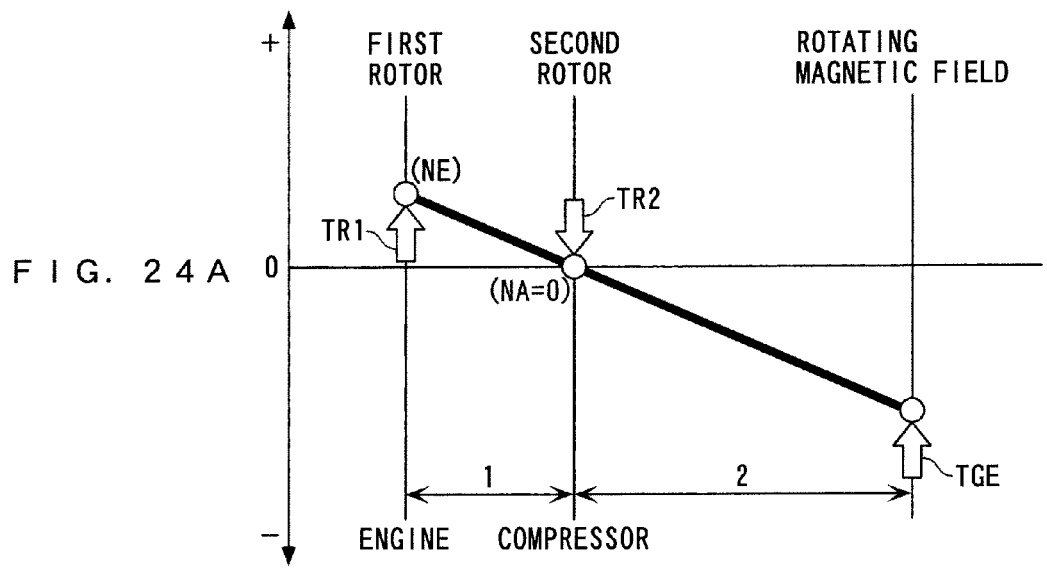
FIG. 24A is a velocity nomograph illustrating an example of a relationship between the respective rotational speeds of the rotating elements of the accessory drive system shown in FIG. 22, together with an example of a relationship between the respective torques of the rotating elements, at the start of an ENG operation mode of the accessory drive system.

At the start of the ENG operation mode, using part of mechanical power transmitted from the crankshaft 3a to the first rotor 14, electric power is generated by the stator 13. FIG. 24A illustrate a relationship between the respective rotational speeds of the rotating elements, together with a relationship between the respective torques of the rotating elements, at the start of the ENG operation mode. As shown in FIG. 24A, at the start of the ENG operation mode, while the first rotor 14 performs normal rotation together with the crankshaft 3a, the second rotor 15 is at rest, and hence the rotational direction of the rotating magnetic field determined by the respective rotational speeds of the first and second rotors 14 and 15 is the direction of reverse rotation.

Figure 24B:
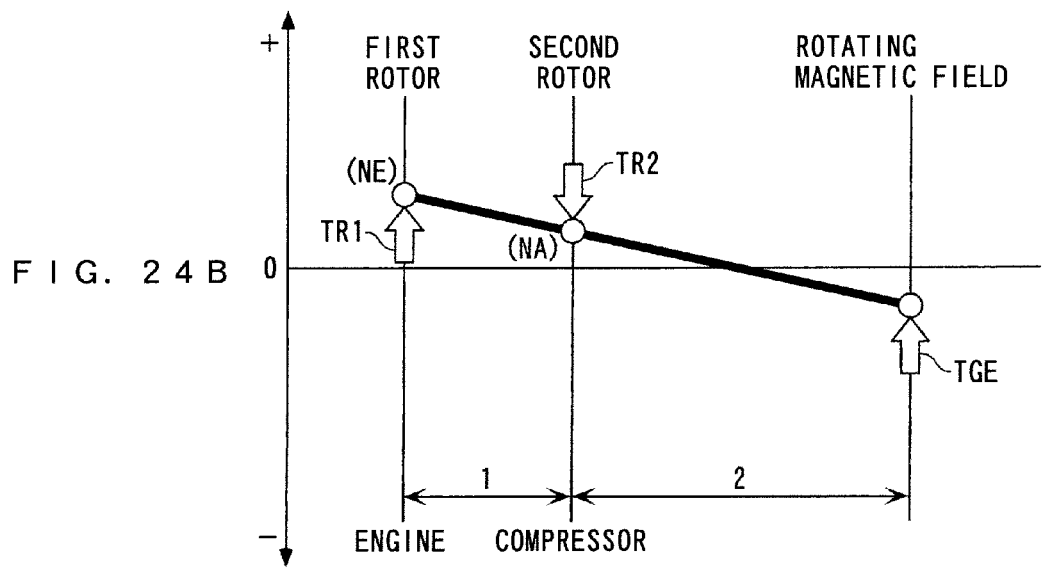
FIG. 24B is a velocity nomograph illustrating an example of a relationship between the respective rotational speeds of the rotating elements of the accessory drive system shown in FIG. 22, together with an example of a relationship between the respective torques of the rotating elements, when the accessory drive system is in the ENG operation mode and at the same time the rotating magnetic field is performing reverse rotation.

Therefore, the first rotor transmission torque TR1 transmitted from the engine 3 to the first rotor 14 is transmitted to the second rotor 15, using the electric power-generating equivalent torque TGE as a reaction force, and then to the compressor 4, whereby the compressor 4 is driven (see FIGS. 24A and 24B). In other words, part of the mechanical power transmitted from the engine 3 to the first rotor 14 is distributed as electric power to the stator 13 and the remainder of the same is distributed to the compressor 4 via the second rotor 15. Further, by reducing mechanical power from the engine 3 distributed as electric power to the stator 13 by controlling the rotational speed of the rotating magnetic field performing reverse rotation such that it become equal to 0, mechanical power from the engine distributed to the compressor 4 via the second rotor 15 is increased. As a consequence, as shown in FIG. 24B, the compressor rotational speed NA rises from 0 shown in FIG. 24A.

Figure 25:
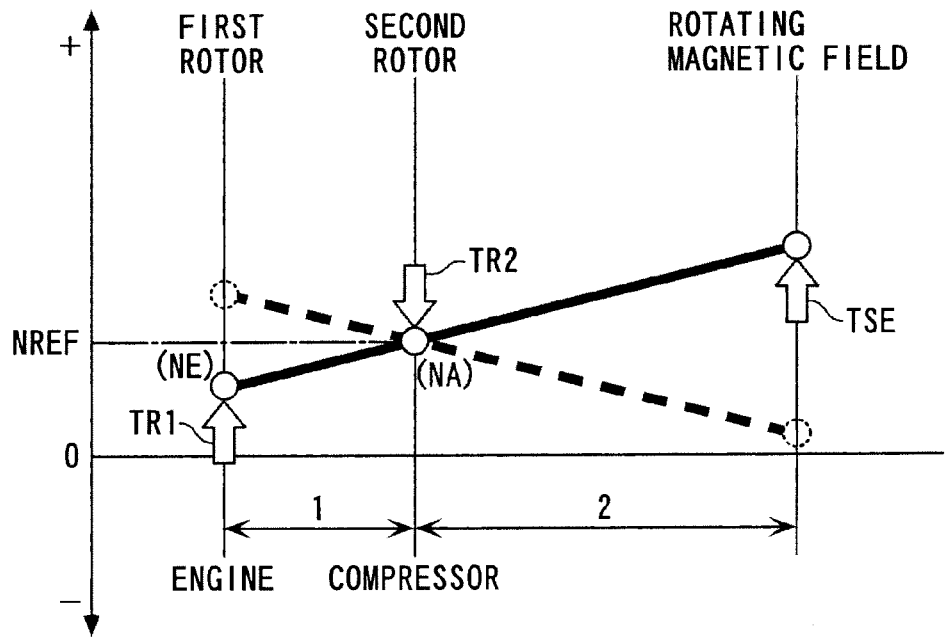
FIG. 25 is a velocity nomograph illustrating an example of a relationship between the respective rotational speeds of the rotating elements of the accessory drive system shown in FIG. 22, together with an example of a relationship between the respective torques of the rotating elements, when the accessory drive system is in the ENG operation mode and at the same time the rotating magnetic field is performing normal rotation.

Then, in the ENG operation mode, after the rotational speed of the rotating magnetic field becomes equal to 0, electric power is supplied to the stator 13, and at the same time, the rotating magnetic field is caused to perform normal rotation. This causes, as shown in FIG. 25, the first rotor transmission torque TR1 transmitted from the engine 3 to the first rotor 14 to be transmitted to the second rotor 15 using the driving equivalent torque TSE as a reaction force, and then to the compressor 4. In other words, after combining the mechanical power transmitted from the engine 3 to the first rotor 14 and the mechanical power corresponding to the electric power supplied to the stator, the combined mechanical power is transmitted to the compressor 4 via the second rotor 15.

Further, as shown in FIG. 25, during the ENG operation mode, similarly to the ENG stoppage mode, the rotational speed of the rotating magnetic field is controlled based on the aforementioned equation (40) and the first and second rotor rotational angles $\theta R1$ and $\theta R2$, whereby the compressor rotational speed NA is held at the predetermined value NREF suitable for the operation of the compressor 4. In this case, as is apparent from a solid line and a broke line in a velocity nomograph shown in FIG. 25, irrespective of whether the engine speed NE is high or low, the compressor rotational speed NA is held at the predetermined value NREF suitable for the operation of the compressor 4.

Figure 26:
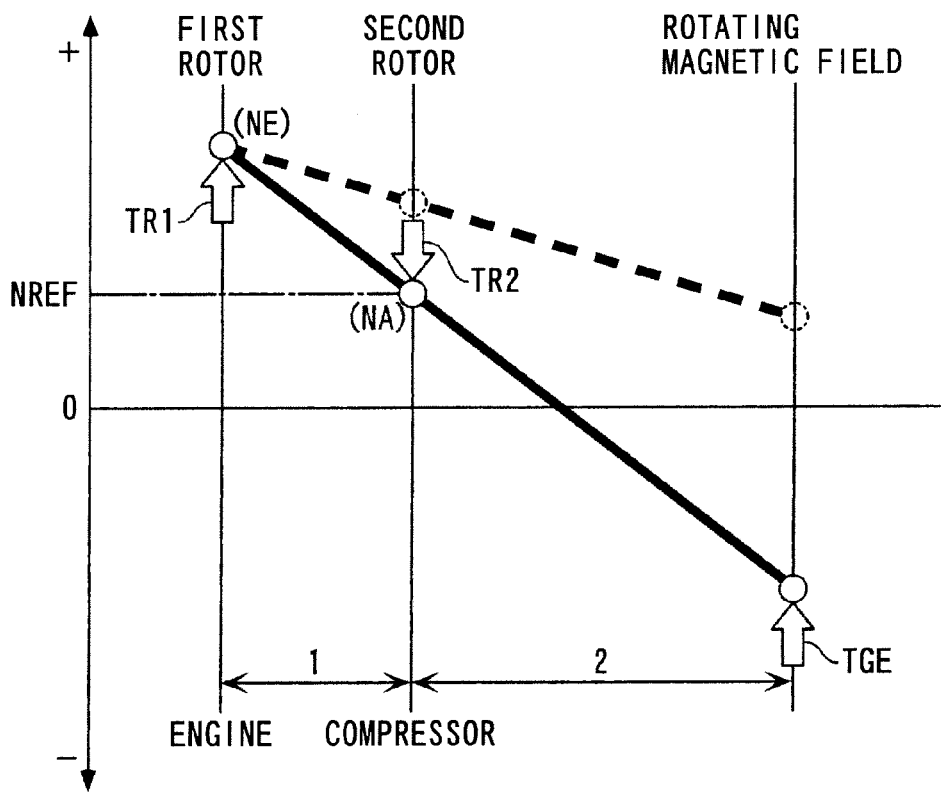
FIG. 26 is a velocity nomograph illustrating an example of a relationship between the respective rotational speeds of the rotating elements of the accessory drive system shown in FIG. 22, together with an example of a relationship between the respective torques of the rotating elements, when the accessory drive system is in the ENG operation mode and at the same time the engine speed is very high.

As shown in FIG. 26, in the ENG operation mode, when the engine speed NE is very high, as indicated by a broken line therein, even if the rotational speed of the rotating magnetic field performing normal rotation is controlled, it is sometimes impossible to control the compressor rotational speed NA to the predetermined value NREF. In such a case, the stator 13 is caused to generate electric power to thereby cause the rotating magnetic field to perform reverse rotation, and the rotational speed of the rotating magnetic field is controlled, whereby as indicated by a solid line in FIG. 26, the compressor rotational speed NA can be held at the predetermined value NREF. As described above, when the engine 3 is rotating at very high speed, the compressor 4 can be driven while causing the stator 13 to generate electric power. Further, the generated electric power is charged into the battery 27, whereby when the accessory drive system 1C enters the ENG stoppage mode next time, the compressor 4 can be driven using the electric power charged in the battery 27.

Further, when the engine 3 is in operation, to stop the compressor 4, it is only required that the compressor rotational speed NA becomes equal to 0, i.e. the rotational speed of the second rotor 15 becomes equal to 0, and hence as is clear from the equation (40), the rotating magnetic field is controlled such that it performs reverse rotation at a speed two times as fast as the engine speed NE. Further, the electric power-generating equivalent torque TGE is controlled such that it becomes equal to ⅓ of a torque equivalent value of the friction of the compressor 4 acting on the second rotor 15. This controls the rotational speed of the second rotor 15 to 0, to thereby stop the compressor 4, and at the same time converts approximately 100% of the mechanical power input from the engine 3 to the rotating machine 11 to electric power.

Further, in the ENG stoppage mode and the ENG operation mode, the control of the rotating machine by the ECU 25 is performed in the same manner as described with reference to FIG. 32, whereby the magnetic field electrical angular position $\theta MFR$ of the rotating magnetic field is controlled such that the aforementioned equation (39) holds. In this case, however, the aforementioned target d-axis current Id_tar and target q-axis current Iq_tar are calculated according to load on the compressor 4 acting on the second rotor 15 or the like.

As described above, according to the fourth embodiment, in the rotating machine 11, the pole pair number ratio $\alpha$ is set to 2.0. With this, as is clear from the aforementioned equation (41), to drive the compressor 4, it is only required to control the driving equivalent torque TSE and the electric power-generating equivalent torque TGE to ⅓ of a torque transmitted to the compressor 4 via the second rotor 15. On the other hand, to drive the compressor using the conventional accessory drive system described hereinbefore, since the ratio between the driving equivalent torque (the electric power-generating equivalent torque), the torque transmitted to the first rotor, and the torque transmitted to the second rotor is 1:1:2, it is required to control the driving equivalent torque (the electric power-generating equivalent torque) to ½ of the torque transmitted to the compressor 4 via the second rotor. As described above, compared with the conventional case, the driving equivalent torque TSE and the electric power-generating equivalent torque TGE can be reduced, and hence the size of the stator 13 can be reduced, which in turn makes it possible to reduce the size and manufacturing costs of the accessory drive system 1C.

Further, similarly to the first embodiment, differently from the conventional case described hereinbefore, it is possible to cause the rotating machine 11 to operate by a single row of soft magnetic material elements formed by the cores 15a, to thereby drive the compressor 4, and hence it is possible to simplify the construction of the rotating machine 11, which in turn makes it possible to simplify the construction of the accessory drive system 1C, and further reduce the manufacturing costs thereof. Further, the first and second rotor electrical angles θER1 and θER2 are calculated, and according to the calculated rotor electrical angles θER1 and θER2, the magnetic field electrical angular position θMFR of the rotating magnetic field is controlled such that the aforementioned equation (39) holds. This makes it possible to ensure the proper operation of the rotating machine 11, which in turn makes it possible to ensure the proper operation of the accessory drive system 1C.

Figure 27:
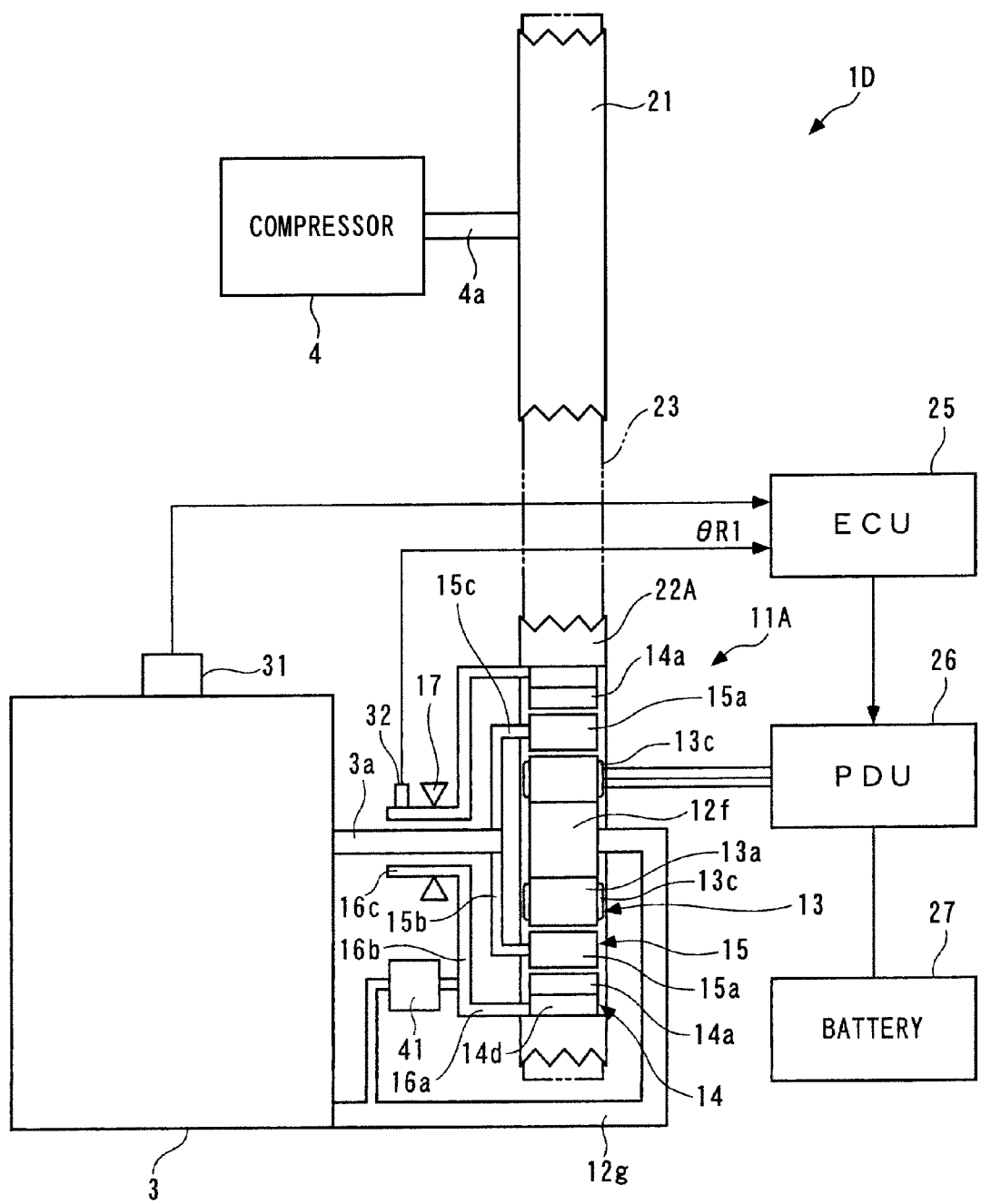
FIG. 27 is a diagram schematically showing an accessory drive system in which the first and second rotors are connected to an accessory and a crankshaft, respectively, and which also serves as a starter for starting the engine, together with an engine and a compressor.

It should be noted that the accessory drive systems 1 and 1A to 1C can be used not only for driving an accessory, such as the compressor 4, but also for serving as a stator for the engine at the same time. FIG. 27 shows an accessory drive system 1D constructed as such. The accessory drive system 1D has the rotating machine 11A in the second embodiment described above. As shown in FIG. 27, the first rotor 14 is connected to the body of the engine 3 via the first and second connecting portions 16a and 16b, a one-way clutch 41, and the connecting portion 12g. The one-way clutch 41 disconnects between the first rotor 14 and the body of the engine 3 when such mechanical power as causes normal rotation of the first rotor 14 is to be transmitted to the first rotor 14, thereby permitting the first rotor 14 to perform normal rotation, whereas when such mechanical power as causes reverse rotation is to be transmitted to the first rotor 14, the one-way clutch 41 connects between the first rotor 14 and the body of the engine 3, thereby blocking rotation of the first rotor 14.

Figure 28:
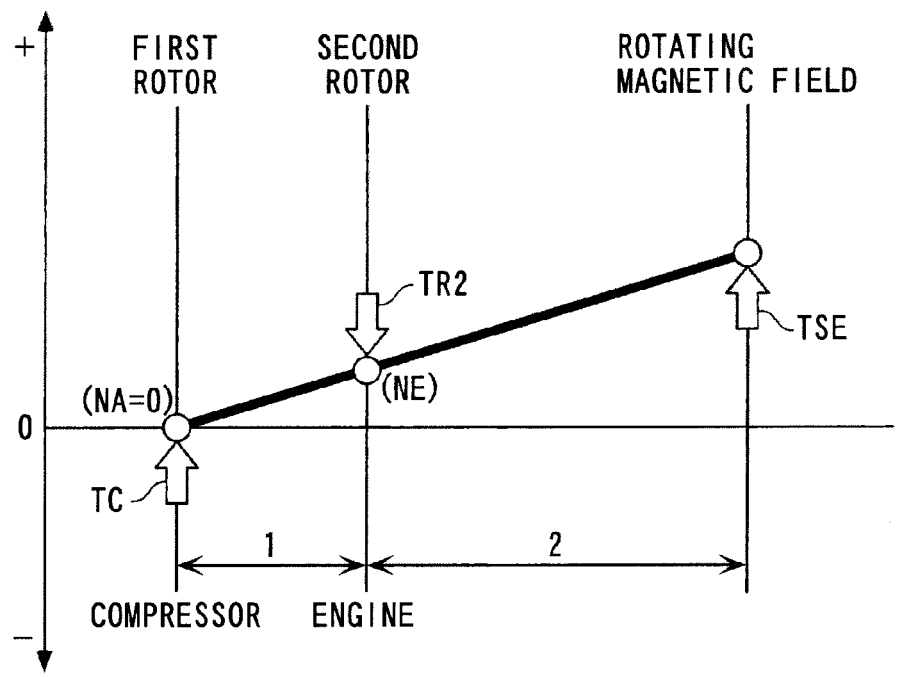
FIG. 28 is a velocity nomograph illustrating an example of a relationship between respective rotational speeds of rotating elements of the accessory drive system shown in FIG. 27, together with an example of a relationship between respective torques of the rotating elements, at the start of the engine.

FIG. 28 illustrates a relationship between respective rotational speeds of rotating elements of the accessory drive system 1D, together with a relationship between respective torques of the rotating elements, at the start of the engine 3. At the start of the engine 3, electric power is supplied to the stator 13, and at the same time the rotating magnetic field is caused to perform normal rotation. This causes the driving equivalent torque TSE to be transmitted to the second rotor 15 by a reaction force TC acting from the body of the engine 3 on the first rotor 14 via the one-way clutch 41, and further to the crankshaft 3a, whereby the crankshaft 3a is normally rotated. In this state, by controlling fuel injection valves and spark plugs, not shown, of the engine 3 for ignition operation, it is possible to start the engine 3.

In this case, as is apparent from the relationship between the torques illustrated in FIG. 28, to cause rotation of the crankshaft 3a so as to start the engine 3, it is only required to control the driving equivalent torque TSE to ⅓ of a torque transmitted to the crankshaft 3a via the second rotor 15. On the other hand, when the crankshaft 3a is driven using the conventional accessory drive system, since the ratio between the driving equivalent torque (the electric power-generating equivalent torque), the torque transmitted to the first rotor, and the torque transmitted to the second rotor is 1:1:2, it is required to control the driving equivalent torque to ½ of the torque transmitted to the crankshaft 3a via the second rotor. As described above, compared with the conventional case, the driving equivalent torque TSE can be reduced, and hence the size of the stator 13 can be reduced, which in turn makes it possible to reduce the size and manufacturing costs of the accessory drive system 1D.

It should be noted that during the start of the engine 3 described above, the control of the rotating machine 11A by the ECU 25 is performed in the same manner as described with reference to FIG. 32, whereby the magnetic field electrical angular position θMFR of the rotating magnetic field is controlled such that the aforementioned equation (39) holds. In this case, however, the aforementioned target d-axis current Id_tar and target q-axis current Iq_tar are calculated e.g. according to the engine friction TEF acting on the second rotor 15.

Further, the engine 3 can be started not limitatively when the first and second rotors 14 and 15 are connected to the accessory (compressor 4) and the crankshaft 3a, respectively, as in the accessory drive system 1D described above, but also inversely when the first and second rotors 14 and 15 are connected to the crankshaft 3a and the accessory, respectively, as in the accessory drive system 1C according to the fourth embodiment. In this case, in a state where the rotating shaft 16 is held unrotatable together with the second rotor 15 by a clutch or the like, electric power is supplied to the stator 13, and at the same time the rotating magnetic field is caused to perform reverse rotation. This causes the driving equivalent torque TSE to be transmitted to the first rotor 14 by the reaction force TC acting from the clutch on the second rotor 15, and further to the crankshaft 3a, whereby the crankshaft 3a is caused to perform normal rotation. In this state, by controlling the fuel injection valves and spark plugs of the engine 3 for ignition operation, it is possible to start the engine 3.

Figure 29:
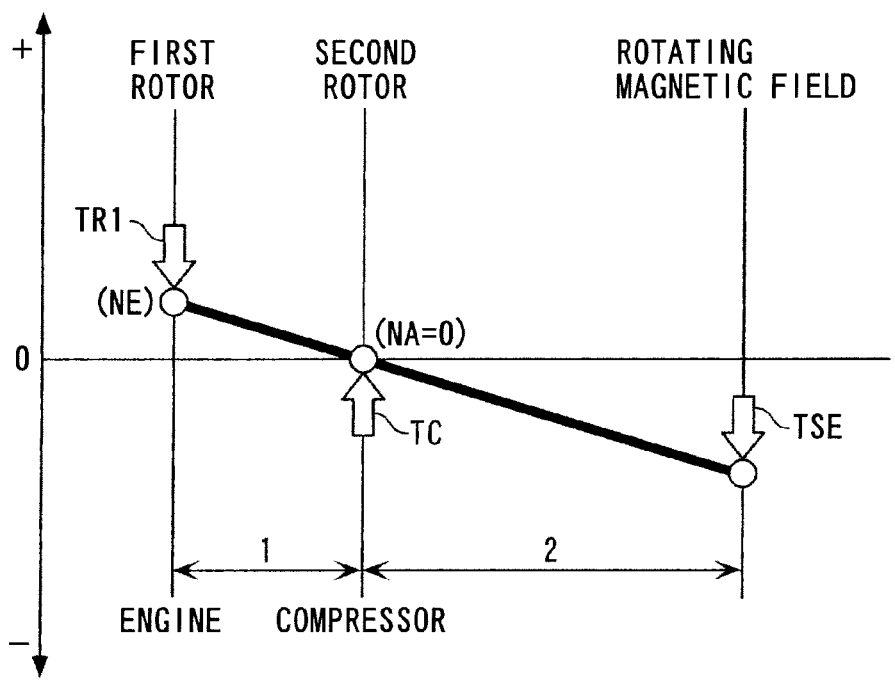
FIG. 29 is a velocity nomograph illustrating an example of a relationship between respective rotational speeds of rotating elements of an accessory drive system in which the first and second rotors are connected to an accessory and a crankshaft, respectively, in a case where the accessory drive system also serves as a starter for starting the engine, together with an example of a relationship between respective torques of the rotating elements, at the start of the engine.
Figure 30:
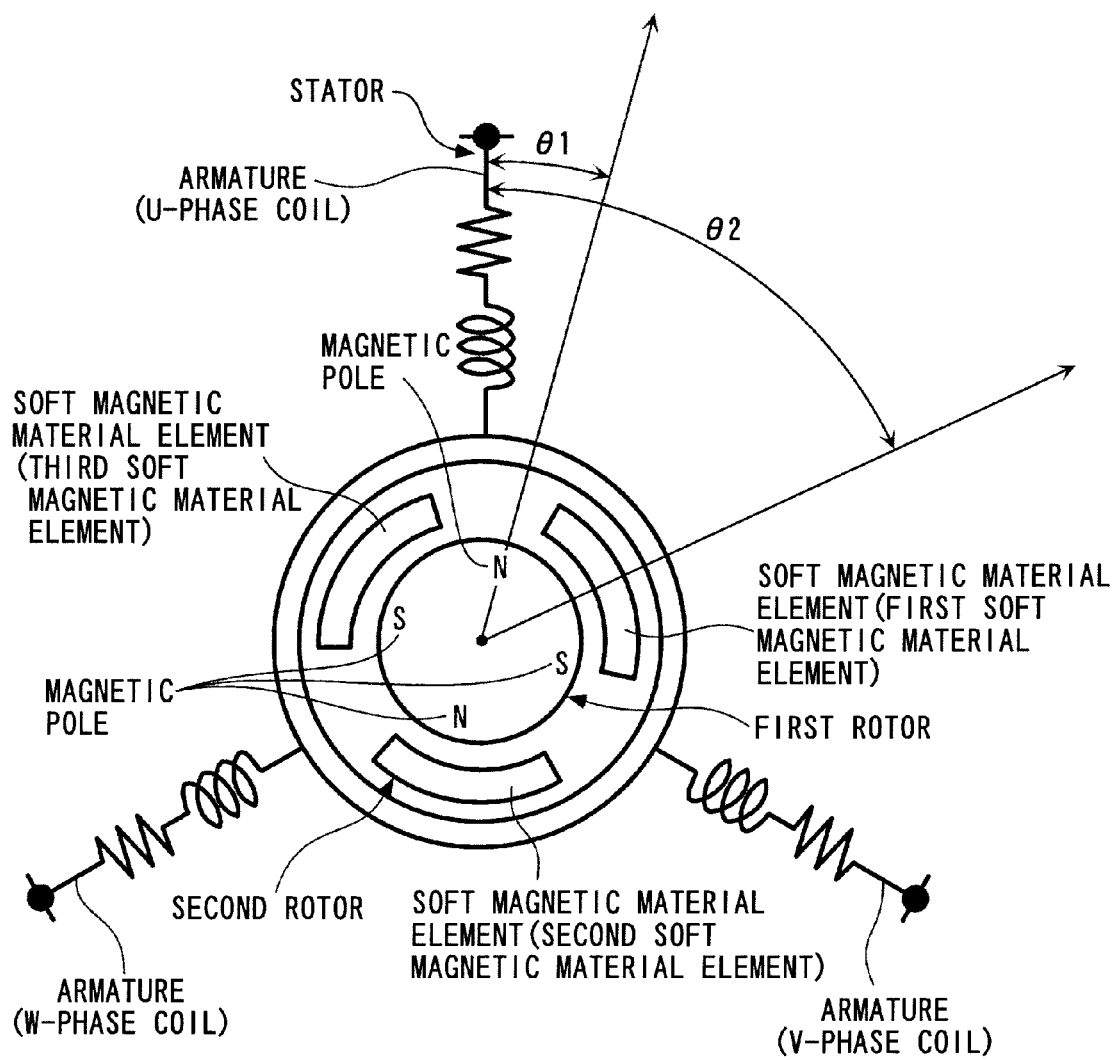
FIG. 30 is a diagram showing an equivalent circuit of the rotating machine in the present invention.
Figure 31:
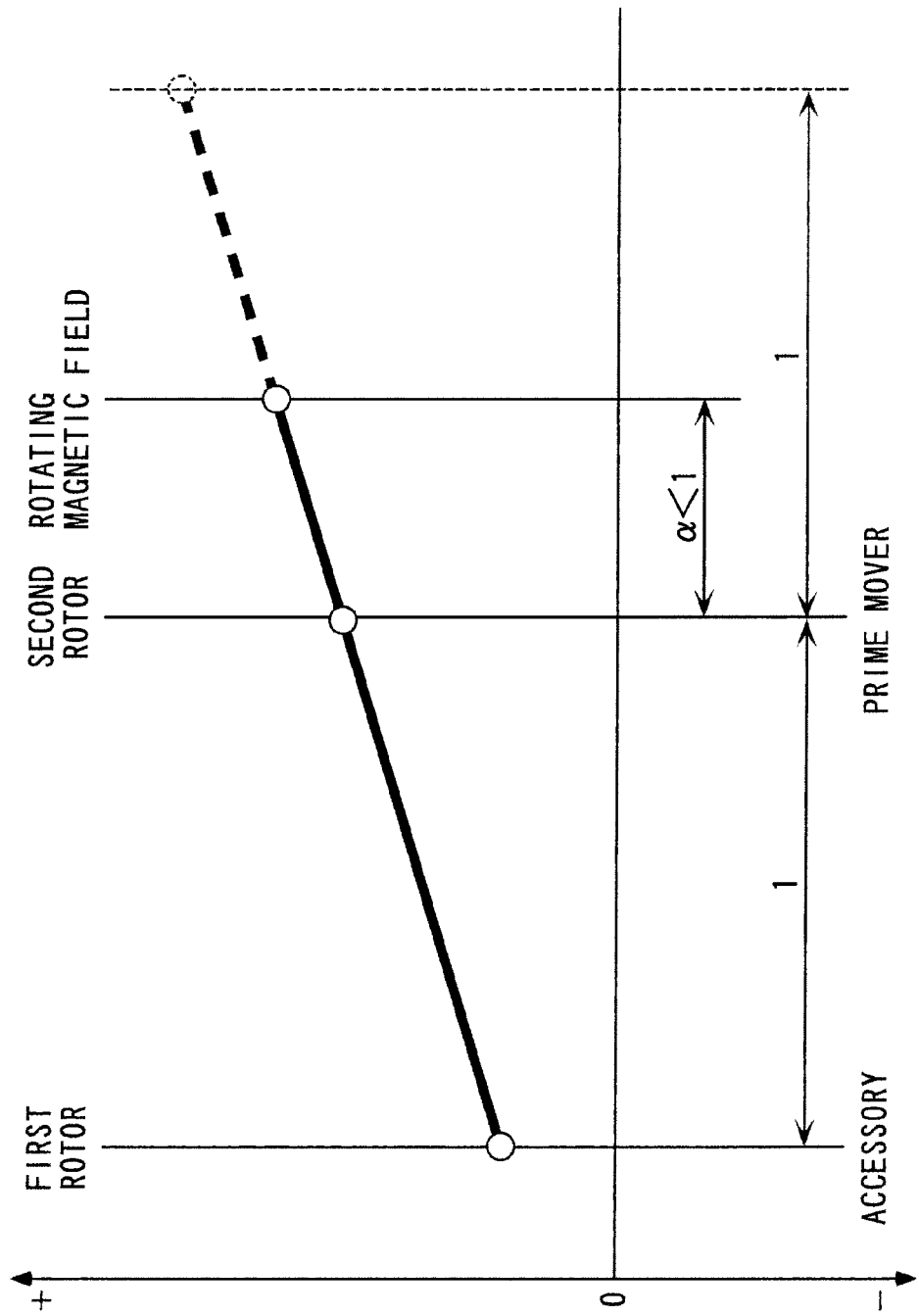
FIG. 31 is a velocity nomograph illustrating an example (solid line) of a relationship between respective rotational speeds of rotating elements of the first accessory drive system when a pole pair number ratio is set to a value less than 1, together with a conventional case (broken line)

In this case, as is apparent from the relationship between the torques illustrated in FIG. 29, to cause rotation of the crankshaft 3a so as to start the engine 3, it is only required to control the driving equivalent torque TSE to ½ of a torque transmitted to the crankshaft 3a via the first rotor 14. On the other hand, when the crankshaft 3a is driven using the conventional accessory drive system, since the ratio between the driving equivalent torque (the electric power-generating equivalent torque), the torque transmitted to the first rotor, and the torque transmitted to the second rotor is 1:1:2, it is required to control the driving equivalent torque to the same magnitude of the torque transmitted to the crankshaft 3a via the first rotor. As described above, when the accessory drive system 1C is caused to also serve for starting the engine at the same time, compared with the conventional case, the driving equivalent torque TSE can be reduced, and hence the size of the stator 13 can be reduced, which in turn makes it possible to reduce the size and manufacturing costs of the accessory drive system 1C.

It should be noted that during the start of the engine 3 described above, the control of the rotating machine 11 by the ECU 25 is performed in the same manner as described with reference to FIG. 32, whereby the magnetic field electrical angular position θMFR of the rotating magnetic field is controlled such that the aforementioned equation (39) holds. In this case, however, the aforementioned target d-axis current Id_tar and target q-axis current Iq_tar are calculated e.g. according to the engine friction TEF acting on the first rotor 14.

The present invention is not limited to the embodiments described above, but can be practiced in various forms. For example, although the embodiments are a case in which the compressor 4 or the oil pump 5 is used as the accessory by way of example, the present invention is by no means limited to this, but it is to be under stood that it can be applied to various accessories. For example, it can be applied to a fuel pump and a supercharging compressor for automotive vehicles, and accessories for ships and aircrafts. Furthermore, although in the above-described embodiments, there are used four armature magnetic poles, eight magnet magnetic poles, and six cores 15a, that is, the ratio between the number of armature magnetic poles, the number of magnetic poles, and the number of soft magnetic material elements in the invention is 1:2:1.5, by way of example, this is not limitative, but desired numbers can be employed as the number of the armature magnetic poles, the number of the magnet magnetic poles, and the number of the cores 15a, respectively, insofar as the ratio therebetween satisfies $1:m:(1+m)/2 (m \neq 1.0)$. Further, although in the embodiments, the cores 15a are formed by steel plates, they may be formed by other soft magnetic materials. Further, in the embodiments, the stator 13, the firs and second rotors 14 and 15 are arranged such that they are disposed side by side in a radial direction to form each of the rotating machines 11 and 11A as a so-called radial type, the stator 13, the first and second rotors 14 and 15 may be arranged such that they are disposed side by side in an axial direction to form each of the rotating machines 11 and 11A as a so-called axial type.

Further, although in the above-described embodiments, a magnetic pole is formed by the magnetic pole of a single permanent magnet 14a, it may be formed by the magnetic poles of a plurality of permanent magnets. For example, if a magnetic pole is formed by arranging two permanent magnets in an inverted-V shape such that the magnetic poles thereof become closer to each other toward the stator 13, it is possible to improve the directivity of the aforementioned magnetic force line ML. Further, electromagnets or armatures that can generate a rotating magnetic field may be used in place of the permanent magnets 14a used in the above-described embodiments. Further, although in the above-described embodiments, the U-phase to W-phase coils 13c to 13e are wound in the slots 13b by distributed winding, this is not limitative, but they may be wound in the slots by concentrated winding. Further, although in the above-described embodiments, the coils 13c to 13e are formed by three-phase coils of U-phase to W-phase, the number of phases can be set as desired insofar as the coils can generate a rotating magnetic field. Further, it is to be understood that a desired number of slots, other than that used in the above-described embodiments may be employed as the number of the slots 13b. Further, although in the above-described embodiments, the slots 13b, the permanent magnets 14a, and the cores 15a are arranged at equally-spaced intervals, they may be arranged at unequally-spaced intervals.

Further, although in the embodiments, as the first and second rotor rotational angles θR1 and θR2, the respective rotational angle positions of the specific permanent magnet 14a and the specific core 15a with respect to the reference coil, i.e. the specific U-phase coil 13c are detected, respectively, rotational angle positions of other elements may be detected insofar as they represent the rotational angle positions of the first and second rotors 14 and 15 with respect to the stator 13. For example, with respect to a specific portion of a specific one of the V-phase coils 13d, a specific one of the W-phase coils 13e or the casing 12, the rotational angle position of a specific portion, such as the mounting portion 14b or 14d, or the flange 14c, may be detected as the first rotor rotational angle θR1, and the rotational angle position of a specific portion, such as the flange 15b or the connecting portion 15c may be detected as the second rotor rotational angle θR2.

Further, in the embodiments, the rotational angle sensor 32 is of an electromagnetic induction type, but it may be of an optical type. Further, although in the first to third embodiments, the second rotor rotational angle θR2 is calculated and in the fourth embodiment, the first rotor rotational angle θR1 is calculated, based on the detected crank angle rotational angle, the first and second rotor rotational angles θR1 and θR2 may be directly detected by sensors or the like. In this case, it is to be understood that there may be used a desired type, including an electromagnetic induction type and an optical type, for the sensor. Further, in the embodiments, the magnetic field electrical angular position θMFR used for the control of the rotating magnetic field is calculated using the first and second rotor rotational angles θR1 and θR2 detected (calculated) by the crank angle sensor 31 and the crank angle sensor 32 by the equation (39), this is not limitative, but it may be determined by a method disclosed in Japanese Laid-Open Patent Publication (Kokai) No. 2009-112101. More specifically, a planetary gear unit in which the ratio between the number of teeth of a sun gear and that of teeth of a ring gear is equal to the ratio between one of the number of armature magnetic poles and that of magnet magnetic poles and the other of the same, and a single rotational angle sensor are provided, and one of the sun gear and the ring gear is connected to the first rotor 14 and a carrier is connected to the second rotor 15. Then, the rotational angle position of the other of the sun gear and the ring gear with respect to a specific one of the U-phase coils 13c is detected by a rotational angle sensor. In this case, when the number of armature magnetic poles is larger than the number of magnet magnetic poles, the sun gear is connected to the first rotor 14.

From the above, assuming that the ratio of the number of magnet magnetic poles to that of armature magnetic poles is represented by γ, the rotational angle position detected by the aforementioned rotational angle sensor is represented by $(1+\gamma)\theta R2 - \gamma \cdot \theta R1$. As is clear from this, the magnetic field rotational angle position θMFR used for the control of the rotating magnetic field can be determined by the planetary gear unit and the single rotational angle sensor, without detecting respective rotational angle positions of the first and second rotors 14 and 15 separately by two sensors, respectively.

Further, although in the embodiments, as the control system that controls the operations of the rotating machines 11 and 11A, the ECU 25 and the PDU 26 are used, this is not limitative, but there may be used an electric circuit incorporating a microcomputer, for example. Further, although the compressor rotational speed NA is calculated based on the first rotor rotational angle θR1 in the first to third embodiments, and based on the second rotor rotational angle θR2 in the fourth embodiment, it may be directly detected by a sensor or the like. In this case, as the sensor, there may be used a desired type, such as an electromagnetic induction type or an optical type.

Furthermore, although in the embodiments, the prime mover in the invention is a gasoline engine for an automotive vehicle, it may be a desired prime move having an output shaft for outputting mechanical power. For example, there may be employed any of various industrial internal combustion engines including a diesel engine, and a ship propelling engine, such as an onboard engine having a crankshaft vertically disposed, or there may be employed an external combustion engine, an electric motor, a water turbine, a windmill, or the like.

It is further understood by those skilled in the art that the foregoing are preferred embodiments of the invention, and that various changes and modifications may be made without departing from the spirit and scope thereof.

We claim:

1. An accessory drive system that is connected to a prime mover having an output shaft for outputting mechanical power, and drives an accessory, comprising:
   a rotating machine including a first rotor that is connected to one of the output shaft of the prime mover and the accessory and is rotatable in a circumferential direction, and a second rotor that is connected to the other of the output shaft of the prime mover and the accessory and is rotatable in the circumferential direction, and a stator that is unmovable,
   wherein said first rotor has a magnetic pole row that is formed by a predetermined plurality of magnetic poles arranged in the circumferential direction, and has each two adjacent magnetic poles so disposed as to have polarities different from each other;
   wherein said stator has an armature row that is formed by a plurality of armatures arranged in the circumferential direction, and is disposed in a manner opposed to said magnetic pole row, for generating a rotating magnetic field rotating in the circumferential direction between said armature row and said magnetic pole row by a predetermined plurality of armature magnetic poles generated at said plurality of armatures;

wherein said second rotor has a soft magnetic material element row that is formed by a predetermined plurality of soft magnetic material elements arranged in the circumferential direction in a manner spaced from each other, and is disposed such that said soft magnetic material element row is positioned between said magnetic pole row and said armature row, and wherein a ratio between a number of the armature magnetic poles, a number of the magnetic poles, and a number of said soft magnetic material elements is set to $1:m:(1+m)/2 (m \neq 1.0)$.

2. An accessory drive system as claimed in claim 1, further comprising:

relative rotational angle positional relation-detecting means for detecting a relative rotational angle positional relation between said stator and said first and second rotors; and control means for controlling the rotating magnetic field based on the detected relative rotational angle positional relation between said stator and said first and second rotors.

3. An accessory drive system as claimed in claim 2, wherein said relative rotational angle positional relation-detecting means detects electrical angular positions of said first and second rotors with respect to said stator, respectively, as the relative rotational angle positional relation between said stator and said first and second rotors, and wherein said control means controls the rotating magnetic field based on a difference between a value obtained by multiplying the detected electrical angular position of said second rotor by $(1+m)$, and a value obtained by multiplying the detected electrical angular position of said first rotor by m.

* * * * *